(12) United States Patent
Ougi et al.

(10) Patent No.: US 7,110,548 B1
(45) Date of Patent: Sep. 19, 2006

(54) CRYPTOGRAPHIC COMMUNICATION METHOD, ENCRYPTION ALGORITHM SHARED CONTROL METHOD, ENCRYPTION ALGORITHM CONVERSION METHOD AND NETWORK COMMUNICATION SYSTEM

(75) Inventors: Hirokazu Ougi, Yokohama (JP); Hideo Takashima, Kanagawa (JP); Hidenobu Taniguchi, Yokohama (JP); Munetoshi Kouchi, Yokohama (JP); Hiroshi Hayami, Tokyo (JP); Hajime Asada, Yokohama (JP); Hideki Harazaki, Yachiyo (JP)

(73) Assignees: Hatachi Ltd, Tokyo (JP); Hatachi Advanced Systems Corp, Kanagawa (JP); Hatachi Keiyo Engineering Co, Ltd, Chiba (JP)

( * ) Notice: Subject to any disclaimer, the term of this patent is extended or adjusted under 35 U.S.C. 154(b) by 0 days.

(21) Appl. No.: 09/365,446

(22) Filed: Aug. 2, 1999

(30) Foreign Application Priority Data

Jul. 31, 1998 (JP) ................................ 10-217732

(51) Int. Cl.
*H04L 9/00* (2006.01)
(52) U.S. Cl. .................. 380/278; 380/277; 380/282; 380/285; 713/153; 713/155; 713/176; 713/191
(58) Field of Classification Search ............... 380/277, 380/276, 282, 278, 285; 713/153, 191, 155, 713/176
See application file for complete search history.

(56) References Cited

U.S. PATENT DOCUMENTS

| 4,982,429 A | | 1/1991 | Takaragi et al. ............... 380/28 |
|---|---|---|---|
| 5,103,479 A | | 4/1992 | Takaragi et al. ............... 380/28 |
| 5,155,680 A | * | 10/1992 | Wiedemer .................... 705/52 |
| 5,185,796 A | * | 2/1993 | Wilson ....................... 380/277 |
| 5,222,139 A | | 6/1993 | Takaragi et al. ............... 380/28 |
| 5,355,413 A | * | 10/1994 | Ohno ......................... 713/159 |
| 5,509,072 A | * | 4/1996 | Miura ......................... 380/243 |
| 5,594,798 A | * | 1/1997 | Cox et al. ..................... 380/257 |
| 5,657,390 A | * | 8/1997 | Elgamal et al. ............... 713/151 |
| 5,679,984 A | * | 10/1997 | Talbot et al. ............... 307/10.3 |
| 5,689,566 A | * | 11/1997 | Nguyen ....................... 713/155 |
| 5,781,654 A | * | 7/1998 | Carney ......................... 382/137 |
| 5,812,671 A | * | 9/1998 | Ross, Jr. ..................... 713/153 |
| 5,857,025 A | * | 1/1999 | Anderson et al. ............. 380/28 |

(Continued)

FOREIGN PATENT DOCUMENTS

EP 1276189 1/2003

(Continued)

OTHER PUBLICATIONS

Plans for the world's First High- Definition Digital Television Broadcasting System By Satellites, Ministry of Posts and telecommunications (Feb., 1998).

(Continued)

*Primary Examiner*—Andrew Caldwell
*Assistant Examiner*—Paul E. Callahan
(74) *Attorney, Agent, or Firm*—Sofer & Haroun, LLP

(57) ABSTRACT

An operating encryption algorithm is converted to another encryption algorithm. When different encryption algorithms are operated by a personal computer 100 for use by a group A and a personal computer 200 for use by group B, an encryption algorithm, operated by the personal computer 100 is encrypted by the personal computer 100 with the encryption algorithm operated by the personal computer 200 and transmitted to the personal computer 200.

4 Claims, 25 Drawing Sheets

U.S. PATENT DOCUMENTS

| | | | | |
|---|---|---|---|---|
| 5,898,784 A * | 4/1999 | Kirby et al. | ................ | 713/153 |
| 6,058,478 A * | 5/2000 | Davis | ................ | 713/191 |
| 6,076,167 A * | 6/2000 | Borza | ................ | 713/201 |
| RE36,946 E * | 11/2000 | Diffie et al. | ................ | 380/278 |
| 6,181,814 B1 * | 1/2001 | Carney | ................ | 382/137 |
| 6,182,076 B1 * | 1/2001 | Yu et al. | ................ | 707/10 |
| 6,230,186 B1 * | 5/2001 | Yaker | ................ | 709/206 |
| 6,230,267 B1 * | 5/2001 | Richards et al. | ................ | 713/172 |
| RE38,070 E * | 4/2003 | Spies et al. | ................ | 380/277 |
| 6,590,588 B1 * | 7/2003 | Lincke et al. | ................ | 345/744 |

FOREIGN PATENT DOCUMENTS

| | | |
|---|---|---|
| JP | 64049446 | 2/1989 |
| JP | 10177523 | 6/1998 |

OTHER PUBLICATIONS

Fast Encipherment Scheme using One-Way Functions on Elliptic Curve by Kazuko Takaragi and Hiroyuki Kurumatani, in Technical Roport of IEICE ISEC 97-15(Jul. 1997) with English Abstract.

* cited by examiner (NETWORK COMMUNICATION SYSTEM)

FIG. 3A

NETWORK ENCRYPTION ALGORITHM MANAGEMENT DATA BASE

| USER ID | ENCRYPTION ALGORITHM NAME | ENCRYPTION ALGORITHM VERSION | UPDATING DATE |
|---|---|---|---|
| KEY MANAGEMENT STATION ID | ENCRYPTION ALGORITHM NAME | ENCRYPTION ALGORITHM VERSION | UPDATING DATE |

FIG. 3B

NETWORK KEY MANAGEMENT DATA BASE

| USER ID | ENCRYPTION ALGORITHM NAME | ENCRYPTION ALGORITHM VERSION | KEY INFORMATION | UPDATING DATE |
|---|---|---|---|---|
| KEY MANAGEMENT STATION ID | ENCRYPTION ALGORITHM NAME | ENCRYPTION ALGORITHM VERSION | KEY INFORMATION | UPDATING DATE |

FIG. 4A

ENCRYPTION ALGORITHM MANAGEMENT DATA BASE

| ENCRYPTION ALGORITHM NAME | ENCRYPTION ALGORITHM VERSION | UPDATING DATE |
|---|---|---|
| | | |

FIG. 4B

KEY STRUCTURE MANAGEMENT DATA BASE

| ENCRYPTION ALGORITHM NAME | ENCRYPTION ALGORITHM VERSION | USER KEY INFORMATION | UPDATING DATE |
|---|---|---|---|
| ENCRYPTION ALGORITHM NAME | ENCRYPTION ALGORITHM VERSION | KEY INFORMATION OF KEY MANAGEMENT STATION | UPDATING DATE |

(OUTLINE OF ENCRYPTION ALGORITHM CONVERSION)

(CRYPTOGRAPHIC COMMUNICATION BY COMMON KEY CIPHER)

CASE WHERE THE KEY LENGTH IS SHORTENED

CASE WHERE THE KEY LENGTH IS PROLONGED

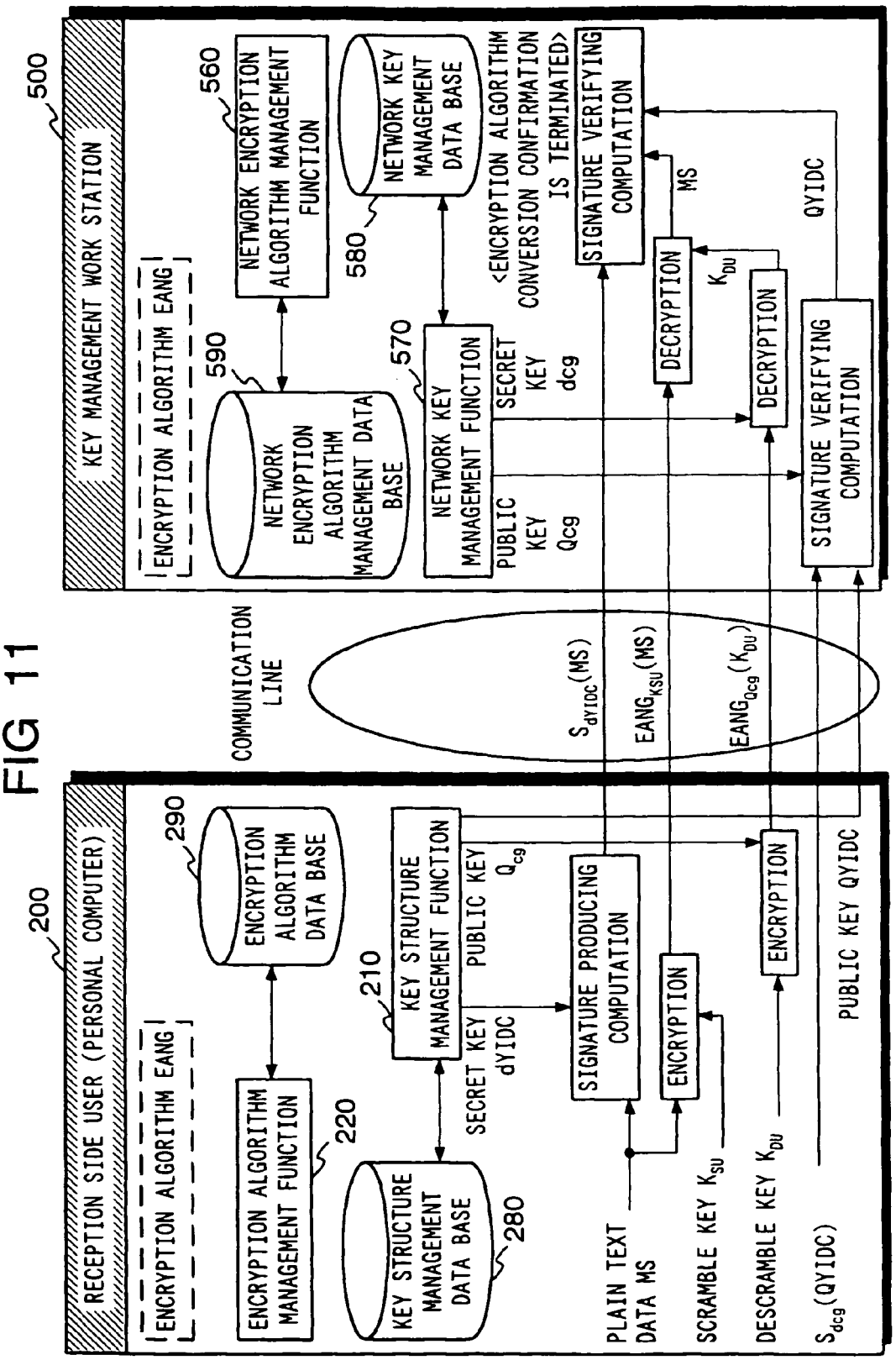

FIG. 17 (ALGORITHM CONVERSION OF PORTABLE INFORMATION PROCESSING UNIT)

FIG. 20 (ENCRYPTION ALGORITHM CONVERSION FOR USER TO GENERATE HIS OWN KEY)

(CRYPTOGRAPHIC COMMUNICATION SYSTEM WITH PUBLIC KEY ENCRYPTION ALGORITHM)

(NETWORK COMMUNICATION SYSTEM
IN WHICH A PLURALITY OF ENCRYPTION ALGORITHMS EXIST)

(KEY RECOVERY FUNCTION (DECRYPTION))

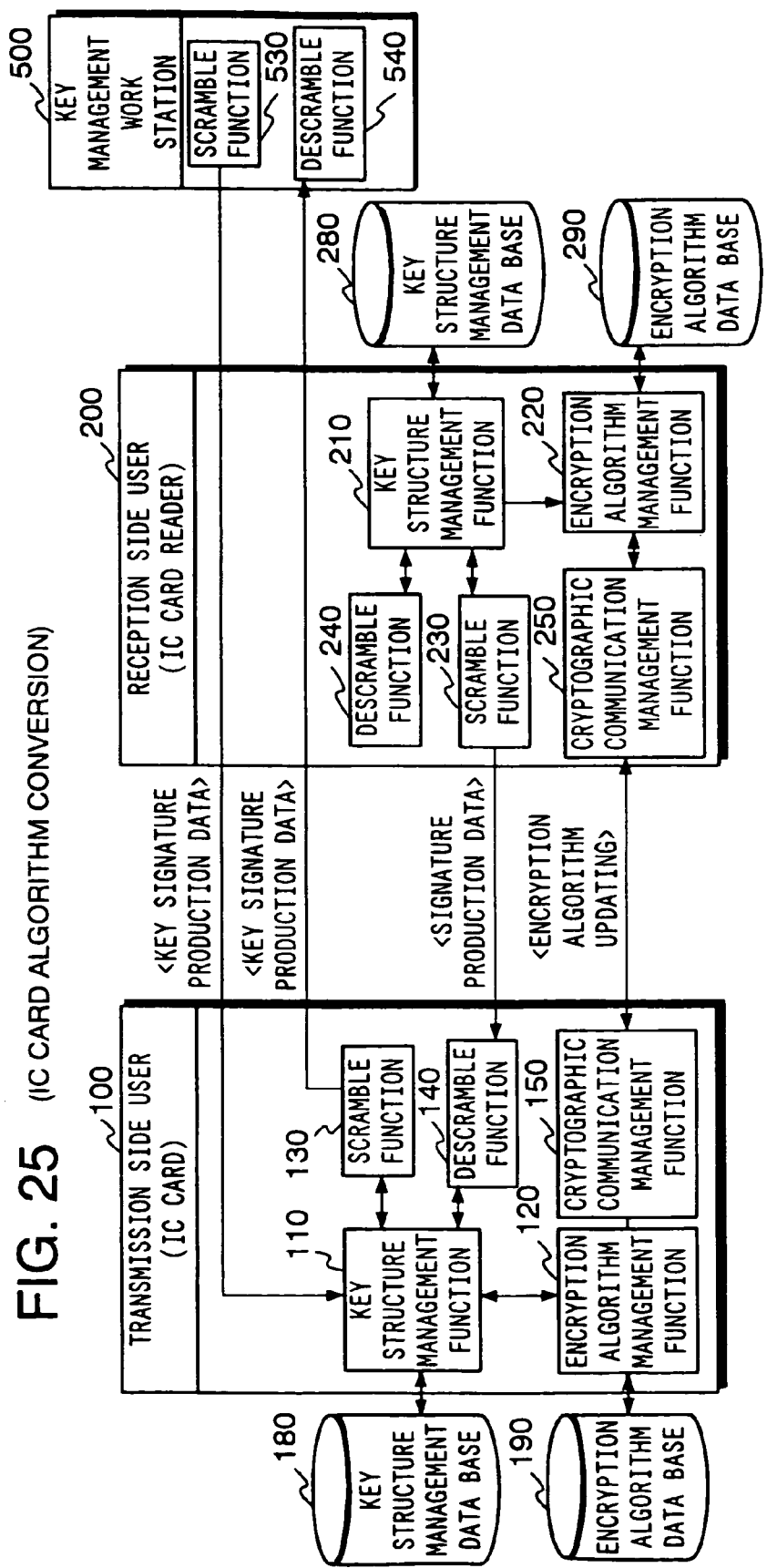
FIG. 25 (IC CARD ALGORITHM CONVERSION)

CRYPTOGRAPHIC COMMUNICATION METHOD, ENCRYPTION ALGORITHM SHARED CONTROL METHOD, ENCRYPTION ALGORITHM CONVERSION METHOD AND NETWORK COMMUNICATION SYSTEM

BACKGROUND OF THE INVENTION

1. Field of the Invention

The present invention relates to cryptographic communication method, encryption algorithm shared control method and network communication system for converting encryption algorithm for cryptographic communication to other encryption algorithm, and more particularly to cryptographic communication method, encryption algorithm shared control method and network communication system suitable for sharing the same encryption algorithm as encryption algorithm operated by a plurality of users and changing the shared encryption algorithm to other encryption algorithm.

2. Description of Related Art

As a means for securing the safety of information transmission, a method of transmitting encrypted information is generally employed. Because of recent advancement of performance of a personal computer, in a case where information to be transmitted is digital information such as document and video, often such information is encrypted on software basis.

If a user U[A] carries out cryptographic communication with a user U[B], the user U[A] encrypts transmission information with an encryption key and transmits that encrypted data. On the other hand, the user U[B] receives this data and decrypts that received data with a decryption key. This cryptographic communication can be established on a presumption that the user U[A] and user U[B] share the same encryption algorithm. Usually, the encryption algorithm is shared by the following manners. The encryption algorithm is recorded in a recording medium such as a floppy disk by an encryption system manager and distributed to each user. Or the encryption algorithm is installed in an information processing unit having encryption processing function such that it can be executed and the information processing unit is distributed.

As for a method for operating the encryption algorithm, to improve the cipher security, not only a scramble key is generated as a key for encrypting information, but also a session key for encrypting this scramble key is generated. Then, duplex encryption method is employed so that user U[A] transmits information encrypted with the scramble key and the scramble key encrypted with the session key to user U[B]. Each time when cryptographic communication occurs, the scramble key is changed.

SUMMARY OF THE INVENTION

However, in the above described encryption method, the following problem arises.

(1) If the transmission side and the reception side use different operating algorithms, cryptographic communication cannot be carried out. Therefore, a necessity of distributing an encryption algorithm of one of the transmission side and the reception side to the other side occurs.

However, the above described method of recording the encryption algorithm in a recording medium and distributing it to each user and method of distributing an information processing unit having an encryption function in which the encryption algorithm is installed so that it can be executed requires time for distribution because the distribution is carried out by transportation or the like. If the encryption algorithm is distributed to each user, an encryption processing unit in which the encryption algorithm is installed is connected to a unit having a communication function so as to construct a system, and whether or not the cryptographic communication is enabled is verified on function basis. Because this functional verification is carried out with communication between users, time and labor are needed.

(2) As a method for improving the encryption security, a method of operating the encryption algorithm by periodically changing it can be considered by this inventor. For example, if the encryption algorithm of the session key in the above mentioned duplex encryption method is changed periodically, the security can be expected to be improved.

However, for this purpose, the encryption algorithm to be changed needs to be distributed to each user. However, if distribution of this encryption algorithm is carried out in the same manner as (1), time and labor are needed thereby the efficiency being lower.

(3) With a recent progress of information appliance such as a personal computer, information processing speed has been improved every year. The intensity of the encryption algorithm needs to be so strong that information is not decrypted within its effective limit even if an attack is made to decrypt with such information appliance.

Therefore, the intensity of the encryption algorithm needs to be set corresponding to the information processing speed of the information appliance of a day in which it is used and changed to an encryption algorithm whose intensity is higher. Thus, a distribution method for an encryption algorithm having an excellent efficiency is needed like above (2).

(4) The inventor of the present invention has considered a method for constructing a cryptographic communication system in which a plurality of users are connected to a station for managing the key for operating the encryption algorithm. However, if a plurality of the encryption algorithms exist in the cryptographic communication system and the encryption algorithms are periodically updated, this system requires such a complicated system operating function for grasping the encryption algorithms of each user, distributing the same algorithm so as to be shared if the algorithms of users about to communicate with each other are different, if the user is changing the algorithm, suspending the cryptographic communication with the user whose algorithm is being changed. If the distribution method for the encryption algorithm of (1) is applied, not only time and labor are needed, but also it is difficult to grasp the condition of the encryption algorithm of each user at real time, so that there is a fear that the cryptographic communication system is disturbed thereby an effective system operation being obstructed.

(5) If the encryption algorithm is changed, a key for use by the user may not correspond to that encryption algorithm to be changed. If a common key encryption algorithm is changed to a public key encryption algorithm or conversely if the public key encryption algorithm is changed to the common key encryption algorithm, there is a problem that the key for use by the user cannot be used for the changed encryption algorithm.

If the encryption algorithm is changed to an encryption algorithm having a high intensity, usually, the key length for use is prolonged. Therefore, if the key for use by the user can be used under the changed encryption algorithm, there is a problem that the intensity of the encryption is not increased if the same key length is used.

Accordingly, the present invention has been made in views of the above problems and therefore, it is an object of the invention to provide a cryptographic communication method, encryption algorithm sharing management method, encryption algorithm conversion method, and network communication system capable of distributing an encryption algorithm with the safety and converting it in a state that time and labor required therefor are reduced.

It is another object of the invention to provide a cryptographic communication method, encryption algorithm sharing management method, encryption algorithm conversion method and network communication system in which encryption algorithms operated by a plurality of users share the same encryption algorithm as a result of the encryption algorithm conversion and preferable for changing the shared encryption algorithm to other encryption algorithm.

To achieve the above object, according to a first aspect of the present invention, there is provided a cryptographic communication method wherein when different encryption algorithms are operated at a transmission side and a reception side, the transmission side encrypts an encryption algorithm operated at the transmission side with an encryption algorithm operated at the reception side and transmits the encrypted algorithm to the reception side.

According to a second aspect of the present invention, there is provided a cryptographic communication method wherein information on encryption algorithm operated at a transmission side and information on an encryption algorithm operated at a reception side are obtained from the transmission side and when different encryption algorithms are operated at the transmission side and the reception side, an encryption algorithm operated at the transmission side is encrypted with an encryption algorithm operated at the reception side and transmitted to the reception side.

According to a third aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; and querying a data base in which a correspondence between the user identifier indicating the user and the encryption algorithm operated by the user is preliminarily described about each user and then retrieving encryption algorithm operated by the user of the transmission side and the encryption algorithm operated by the user of the reception side, wherein if the encryption algorithm operated by the user of the transmission side is different from the encryption algorithm operated by the user of the reception side, data indicating the encryption algorithm operated by the user of the transmission side is encrypted with the encryption algorithm operated by the user of the reception side and transmitted to the user of the reception side.

According to a fourth aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; querying a data base in which a correspondence between the user identifier indicating the user, an encryption algorithm operated by the user and an encryption key thereof is preliminarily described about each user so as to obtain the encryption algorithm operated by the user of the transmission side and the encryption key thereof and the encryption algorithm operated by the user of the reception side and the encryption key thereof, wherein if the encryption algorithm operated by the user of the transmission side is different from the encryption algorithm operated by the user of the reception side, data indicating the encryption algorithm operated by the user of the transmission side and encryption key produced based on the encryption key operated by the user of the reception side corresponding to a key length of the encryption algorithm is encrypted with the encryption algorithm operated by the user of the reception side and transmitted to the user of the reception side.

According to a fifth embodiment of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; and querying a data base in which a correspondence between user identifier indicating the user, an encryption algorithm operated by the user and an encryption key thereof is preliminarily described about each user so as to obtain the encryption algorithm operated by the user of the transmission side and the encryption key thereof and the encryption algorithm operated by the user of the reception side and the encryption key thereof, wherein if the encryption algorithm operated by the user of the transmission side is different from the encryption algorithm operated by the user of the reception side, signature data produced for the encryption key operated by the user of the transmission side is transmitted to the user of the transmission side and data obtained by encrypting the encryption algorithm operated by the user of the transmission side with the encryption algorithm operated by the user of the reception side and signature data produced for an encryption key operated by the user of the reception side are transmitted to the user of the reception side.

According to a sixth aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; and querying a data base in which a correspondence between the user identifier indicating the user, an encryption algorithm operated by the user and an encryption key thereof is preliminarily described about each user so as to obtain an encryption algorithm operated by the user of the transmission side and an encryption key thereof and an encryption algorithm operated by the user of the reception side and an encryption key thereof, wherein if the encryption algorithm operated by the user of the transmission side is different from the encryption algorithm operated by the user of the reception side, signature data produced for the encryption key operated by the user of the transmission side is transmitted to the user of the transmission side and data indicating the encryption algorithm operated by the user of the transmission side and encryption key produced based on the encryption key operated by the user of the reception side corresponding to a key length of the encryption algorithm is encrypted with the encryption algorithm operated by the user of the reception side and transmitted to the user of the reception side with the signature data produced corresponding to the encryption key operated by the user of the reception side.

According to a seventh aspect of the present invention, there is provided Network communication system composed by connecting a plurality of users, comprising at least an encryption key management station to be connected from a user of a transmission side, the encryption key management station obtaining, from the user of the transmission side, information indicating an encryption algorithm operated by the user and information indicating an encryption algorithm operated by a user of a reception side and if different encryption algorithms are operated by the users of the transmission side and the reception side, encrypting the encryption algorithm operated by the user of the transmission side with the encryption algorithm operated by the user of reception side and transmitting it to the user of the reception side.

According to an eighth aspect of the present invention, there is provided network communication system composed by connecting a plurality of users, comprising at least an encryption key management station to be connected from a user of a transmission side, the encryption key management station comprising data base in which a correspondence between a user identifier indicating the user and an encryption algorithm operated by the user is preliminarily described about each user;

wherein when a communication is carried out from the user of the transmission side to a user of a reception side, a user identifier indicating the user and a reception side user identifier are obtained from the user of the transmission side and the data base is queried with the obtained identifier as a key so as to obtain an encryption algorithm operated by the user of the transmission side and an encryption algorithm operated by the user of the reception side, and if the encryption algorithm operated by the user of the transmission side is different from the encryption algorithm operated by the user of the reception side, the encryption algorithm operated by the user of the transmission side is encrypted with the encryption algorithm operated by the user of the reception side and transmitted to the user of the reception side.

According to a ninth aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; querying a data base in which a correspondence between the user identifier indicating the user and an encryption algorithm operated by the user is preliminarily described about each user so as to retrieve an encryption algorithm operated by the user of the transmission side and an encryption algorithm operated by the user of the reception side; and if the encryption algorithm operated by the user of the transmission side is different from the encryption algorithm operated by the user of the reception side, data indicating the encryption algorithm operated by the user of the transmission side is encrypted with the encryption algorithm operated by the user of the reception side and transmitted to the user of reception side.

According to a tenth aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; and querying a data base in which a correspondence between the user identifier indicating the user, an encryption algorithm operated by the user and an encryption key is preliminarily described about each user so as to obtain the encryption algorithm operated by the user of the transmission side and an encryption key thereof and the encryption algorithm operated by the user of the reception side and an encryption key, wherein if the encryption algorithm operated by the user of the transmission side is different from the encryption algorithm operated by the user of the reception side, data indicating the encryption algorithm operated by the user of the transmission side and the encryption key produced based on an encryption key operated by the user of the reception side corresponding to a key length of the encryption algorithm is encrypted with the encryption algorithm operated by the user of reception side and transmitted to the user of the reception side.

According to an eleventh aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; and querying a data base in which a correspondence between the user identifier indicating the user, an encryption algorithm operated by the user and an encryption key is preliminarily described about each user so as to obtain the encryption algorithm operated by the user of the transmission side and the encryption key thereof and the encryption algorithm operated by the user of the reception side and encryption key thereof, wherein if the encryption algorithm operated by the user of the transmission side is different from the encryption algorithm operated by the user of the reception side, signature data produced for an encryption key operated by the user of the transmission side is transmitted to the user of the transmission side and the encryption algorithm operated by the user of the transmission side is encrypted with the encryption algorithm operated by the user of the reception side and transmitted to the user of the reception side with signature data produced for an encryption key operated by the user of the reception side.

According to a twelfth aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; and querying a data base in which a correspondence between the user identifier indicating the user, encryption algorithm operated by the user and encryption key is preliminarily described about each user so as to obtain the encryption algorithm operated by the user of the transmission side and an encryption key thereof and the encryption algorithm operated by the user of the reception side and encryption key, wherein if the encryption algorithm operated by the user of the transmission side is different from the encryption algorithm operated by the user of the reception side, signature data produced for an encryption key operated by the user of the transmission side is transmitted to the user of the transmission side and data indicating the encryption algorithm operated by the user of the transmission side and encryption key produced based on an encryption key operated by the user of the reception side corresponding to a key length of the encryption algorithm is encrypted with the encryption algorithm operated by the user of the reception side and transmitted to the user of the reception side with signature data produced corresponding to the encryption key operated by the user of the reception side.

According to a thirteenth aspect of the present invention, there is provided a network communication system composed by connecting a plurality of users, comprising at least an encryption key management station to be connected from a user of a transmission side, the encryption key management station obtaining, from the user of the transmission side, information indicating an encryption algorithm operated by the user and information indicating an encryption algorithm operated by a user of a reception side, and when different encryption algorithms are operated by the user of the transmission side and the user of the reception side, encrypting the encryption algorithm operated by the user of the transmission side with the encryption algorithm operated by the user of the reception side and transmitted to the user of reception side.

According to a fourteenth aspect of the present invention, there is provided a network communication system composed by connecting a plurality of users, comprising at least an encryption key management station to be connected from a user of a transmission side, the encryption key management station comprising a data base in which a correspondence between a user identifier indicating a user and an encryption algorithm operated by the user is preliminarily described about each user; wherein when a communication is carried out from the user of transmission side to a user of a reception side, a user identifier indicating the user and a reception side user identifier are obtained from the user of the transmission side, and the data base is queried with the obtained identifier as a key so as to obtain an encryption algorithm operated by the user of the transmission side and encryption algorithm operated by the user of the reception side, and if the encryption algorithm operated by the user of the transmission side is different from the encryption algorithm operated by the user of the reception side, the encryption algorithm operated by the user of the transmission side is encrypted with the encryption algorithm operated by the user of the reception side and transmitted to the user of the reception side.

According to a fifteenth aspect of the present invention, there is provided a cryptographic communication method wherein if different encryption algorithms are operated by a transmission side and a reception side, the encryption algorithm operated by the reception side is encrypted with the encryption algorithm operated by the transmission side and transmitted to the transmission side.

According to a sixteenth aspect of the present invention, there is provided a cryptographic communication method wherein information indicating an encryption algorithm operated by a transmission side and information indicating an encryption algorithm operated by a reception side are obtained from the transmission side and when different encryption algorithms are operated by the transmission side and the reception side, the encryption algorithm operated by the reception side is encrypted with the encryption algorithm operated by the transmission side and transmitted to the transmission side.

According to a seventeenth aspect of the present invention, there is provided an encryption algorithm sharing management method for sharing an encryption algorithm for cryptographic communication, comprising the steps of: from a user of a transmission side, obtaining a user identifier indicating the user and a user identifier indicating a user of a reception side; querying a data base in which a correspondence between the user identifier indicating user and encryption algorithm operable by the user is preliminarily described about each user so as to obtain an encryption algorithm operable by the user of the transmission side and an encryption algorithm operable by the user of the reception side; determining whether or not there is an encryption algorithm operable by the user of the transmission side and the user of the reception side commonly; and if the commonly operable encryption algorithm exists, it is notified the user of the transmission side that cryptographic communication at the user of the transmission side and the user of the reception side is enabled.

According to an eighteenth aspect of the present invention, there is provided an encryption algorithm conversion method for converting an operating first encryption algorithm to other second encryption algorithm comprising: querying a data base in which a correspondence between a user identifier indicating a user, an encryption algorithm operated by the user and an encryption key thereof is preliminarily described about each user with a user whose encryption algorithm is to be converted as a key so as to obtain a first encryption algorithm operated by the user and a first encryption key; and supplying first and second signature data written in the first and second encryption keys with a first management secret key preliminarily allocated for management and operated on the first encryption algorithm, public key data obtained by encrypting a second public key corresponding to a second management secret key operated on the second encryption algorithm preliminarily allocated for management with the first encryption algorithm, a second encryption algorithm encrypted with the first encryption algorithm and signature data produced based on the second management secret key to the user.

BRIEF DESCRIPTION OF THE DRAWINGS

FIGS. 3A and 3B are explanatory diagrams showing information to be stored in data base accessed by a key management work station, FIG. 3A indicates information to be stored in a network encryption algorithm control data base and FIG. 3B indicates information to be stored in the network key management data base;

FIGS. 4A and 4B are explanatory diagrams showing information to be stored in data base accessed by a personal computer, FIG. 4A indicates information to be stored in encryption algorithm control data base and FIG. 4B indicates information to be stored in a key structure management data base;

FIG. 10A indicates a case in which the key length is shortened, and FIG. 10B indicates a case in which the key length is prolonged;

FIG. 11 is a data flow diagram showing cryptographic communication by public key cipher to which the present invention is applied;

FIG. 25 is a block diagram showing cryptographic communication system using IC card based on public key cipher algorithm to which the present invention is applied.

DETAILED DESCRIPTION OF THE PREFERRED EMBODIMENTS

Figure 1:
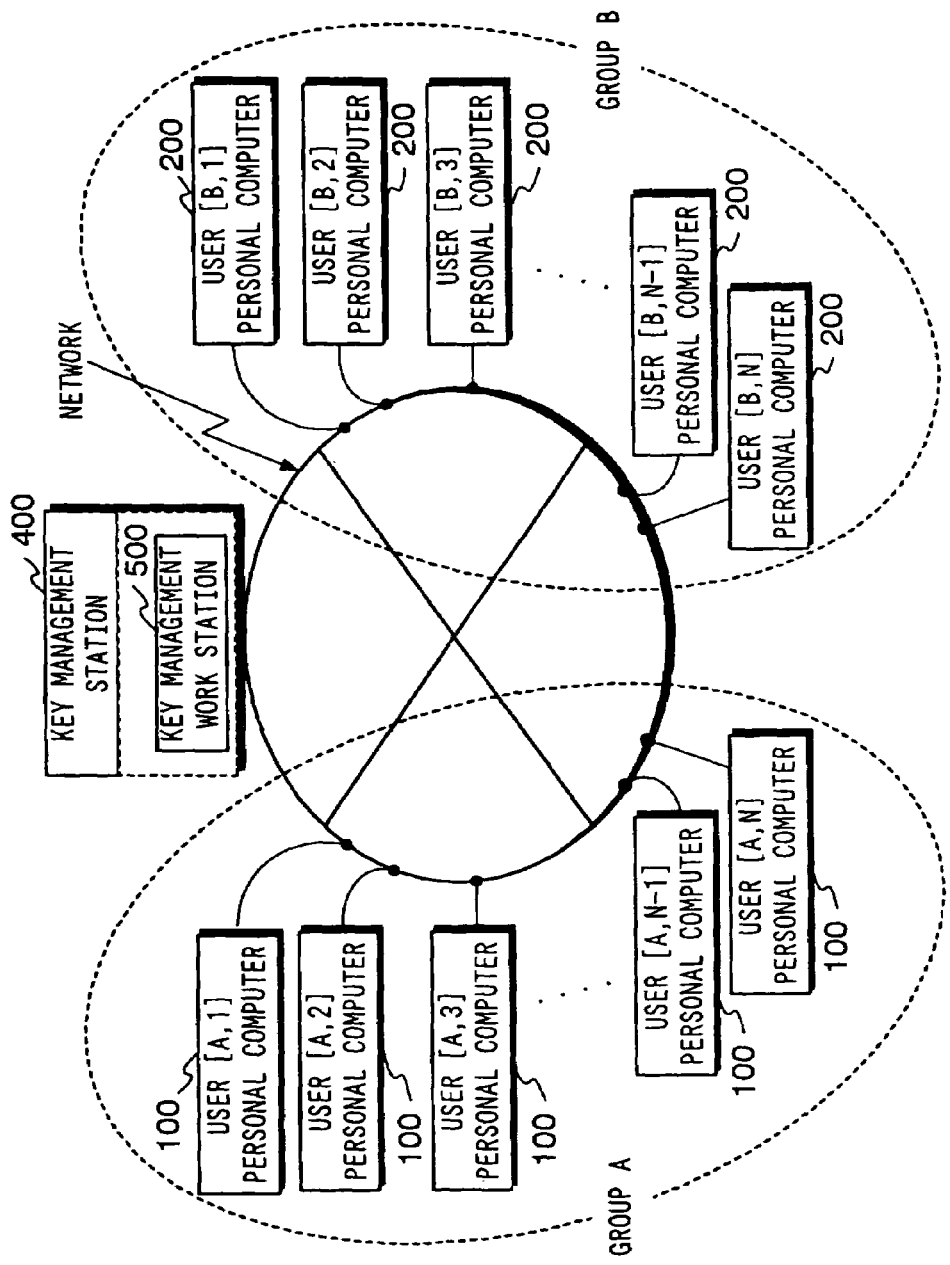
FIG. 1 is an explanatory diagram showing a network communication system.

Hereinafter, the embodiments of the present invention will be described with reference to the accompanying drawings.

First, functions of a network communication system to which the present invention is applied will be described.

In a cryptographic communication system to which the present invention is applied, (1) a key management station for controlling an encryption algorithm is placed, (2) condition of encryption algorithm operated by each user is grasped by the key management station, (3) an encryption algorithm for use by each user is set up and (4) encryption algorithm for use by each user is converted.

The respective functions will be described below.

First, the key management station for controlling the encryption algorithm of (1) will be described. A key management station for controlling encryption algorithm is placed in the cryptographic communication system, so as to register all encryption algorithms used by user and encryption algorithms to be updated in this key management station.

Next, the function for grasping the condition of the encryption algorithm operated by each user of (2) will be described.

Each user carrying out the cryptographic communication and the key management station are connected to each other through such an electronic communication line as a satellite communication line or ground communication line or the like and the key management station always monitors the condition of the encryption algorithm operated by the user through the line. If a necessity of the cryptographic communication arises between users, whether or not the cryptographic communication is possible is determined by judging from the operating condition of the encryption algorithm to be operated by the user.

Further, the key management station grasps the operating condition of the encryption algorithm of each user and information of the key for use by the user. If the encryption algorithm operated by the user is changed, information for converting the key is created so as to be capable of adapting to an encryption algorithm in which the key for use by the user is changed and then transmitted to that user.

Next, the function for setting up the encryption algorithm for use by each user of (3)-will be described about a case (i) in which cryptographic communication is carried out between respective users and a case (ii) in which the intensity of the encryption algorithm for use by each user is converted to an encryption algorithm of the same series having an intensity equivalent to or higher than that encryption algorithm.

First, the case in which the cryptographic communication is carried out between the respective users of (i) will be described.

Possible cases include a case (a) in which the users intending to carry out the cryptographic communication share the same encryption algorithm and a case (b) in which the users intending to carry out the cryptographic communication do not share the same encryption algorithm. Corresponding functions to these cases will be described below.

(a) Case where users intending to carry out cryptographic communication share the same encryption algorithm 1. The key management station determines that cryptographic communication between the users is possible and transmits this determination result to the users.

2. The users receive this result and execute the cryptographic communication by the shared encryption algorithm.

(b) Case where users intending to carry out cryptographic communication do not share the same encryption algorithm 1. The key management station determines that cryptographic communication between the users is impossible.

2. Considering user request, restriction and the like of a registered encryption algorithm, the key management station sets up encryption algorithm for use in cryptographic communication between the users and transmits this encryption algorithm to the users through a communication line.

If there is a necessity of converting a key for use by user so as to be applicable for a new set encryption algorithm, information for this key conversion is created and transmitted to the user through a communication line.

3. The user converts the transmitted encryption algorithm and as required, the key for use and executes cryptographic communication.

Next, the case in which the intensity of the encryption algorithm for use by each user of (ii) is converted to encryption algorithm of the same series having an intensity equivalent to or higher than that encryption algorithm will be described.

To convert the intensity of the encryption algorithm to an encryption algorithm of the same series having an intensity equivalent to or higher than that encryption algorithm, for example, it can be considered that (a) with respect to the encryption algorithm used by the user, the user supplies an encryption algorithm of the same series having an intensity equivalent to or higher than the encryption algorithm used by the user, and (b) with respect to the encryption algorithm used by the user, the key management station possesses an encryption algorithm generating apparatus for the encryption algorithm for use by the user and supplies an encryption algorithm of the same series having an intensity equivalent to or higher than that encryption algorithm. The function of each case will be described below.

(a) Case where with respect to the encryption algorithm used by the user, the user supplies an encryption algorithm of the same series having an intensity equivalent to or higher than the encryption algorithm used by the user 1. An encryption algorithm of the same series having an intensity equivalent to or higher than the encryption algorithm used by the user is produced and transmitted to the key management station and registered therein.

2. The key management station sets up a user using an encryption algorithm except the registered encryption algorithm of the same series having an intensity equivalent to or higher, as required, produces information for converting a key for use by the user and then transmits the aforementioned encryption algorithm of the same series having an intensity equivalent to or higher and information for key conversion to this user.

3. The user receiving the encryption algorithm of the same series having an intensity equivalent to or higher and information for key conversion converts the key for use using the transmitted information for key conversion as required and then carries out cryptographic communication according to the transmitted encryption algorithm.

(b) Case where with respect to the encryption algorithm used by the user, the key management station possesses an encryption algorithm generating apparatus for the encryption algorithm for use by the user and supplies an encryption algorithm of the same series having an intensity equivalent to or higher than that encryption algorithm.

1: the key management station produces an encryption algorithm of the same series having an intensity equivalent to or higher than the encryption algorithm used by the user and registers the produced encryption algorithm.

2: The key management station sets up user using an encryption algorithm other than the registered encryption algorithm of the same series having an intensity equivalent to or higher, as required produces information for converting a key used by the user and then transmits the encryption algorithm of the same series having an intensity equivalent to or higher and information for key conversion to this user.

3. The user receiving the encryption algorithm of the same series having an intensity equivalent to or higher and information for key conversion converts the key for use by using the received information for key conversion as required and carries out cryptographic communication according to the received encryption algorithm.

Next, a function for converting the encryption algorithm for use by user of (4) will be described.

1: The key management station produces the encryption algorithm for conversion by user and as required, information for conversion of the key for use by each user according to the above (3).

2: The key management station encrypts the encryption algorithm for conversion by each user and key conversion information produced as required by using the encryption algorithm operated by the user and transmits it to each user through communication line.

3: Each user decrypts data transmitted from the key management station using the operated encryption algorithm so as to obtain the encryption algorithm for conversion and key conversion information.

4: Each user changes the operated encryption algorithm and key for use according to the aforementioned decrypted data.

5. Each user encrypts a statement "encryption algorithm change completed" using the changed encryption algorithm and transmits it to the key management station through communication line.

6: The key management station decrypts the encrypted and transmitted data and obtains the statement "encryption algorithm change completed" and confirms that user's encryption algorithm has converted and the encryption function operates properly.

Next, a first embodiment of the present invention will be described with reference to FIGS. 1–5. In this embodiment, an outline of encryption algorithm conversion to which the present invention is applied will be described.

First, a network communication system to which the present invention is applicable will be described with reference to FIG. 1. Here, an example of a structure in which a plurality of personal computers (information processing apparatuses) 100, 200 used by users are connected to the key management station 400, will be described.

The encryption algorithms operated by this system are assumed to be A[1]–A[n], B[1]–B[m] and these encryption algorithms are controlled by the key management station. The encryption algorithms A[l]–A[n] are encryption algorithms belonging to the same series A having an intensity equivalent or different. The key management station updates security by changing encryption algorithm to a new encryption algorithm of the same series having an intensity equivalent to or higher than the encryption algorithm concerned.

The key management station manages the encryption algorithm operated by the user and user ID with correspondence therebetween assuming that the user ID of user operating the encryption algorithm A[1] is $U[A_1, 1_1]$–$U[A_1, N_1]$, user ID of user operating the encryption algorithm A[2] is $U[A_2, 1_2]$–$U[A_2, N_2]$, user ID of user operating the encryption algorithm A[n] is $U[A_n, 1_n]$–$U[A_n, N_n]$, user ID of user operating the encryption algorithm B[1] is $U[B_1, 1_1]$–$U[B_1, M_1]$, user ID of user operating the encryption algorithm B[2] is $U[B_2, 1_2]$–$U[B_2, M_2]$, user ID of user operating the encryption algorithm B[m] is $U[B_n, 1_n]$–$U[B_n, M_m]$.

Referring to FIG. 1, personal computers 100 used by a user operating one of the encryption algorithms belonging to series A (hereinafter referred to as encryption algorithm A), personal computers 200 used by a user operating one of the encryption algorithms belonging to series B (hereinafter referred to as encryption algorithm B), and the key management station 400 provided with a key management work station 500 are connected through a network.

In this network communication system, cryptographic communication, encryption algorithm conversion and the like are carried out by means of software processing of the personal computers 100, 200 such as an information processing unit used by the users and key management work station 500.

Figure 22:
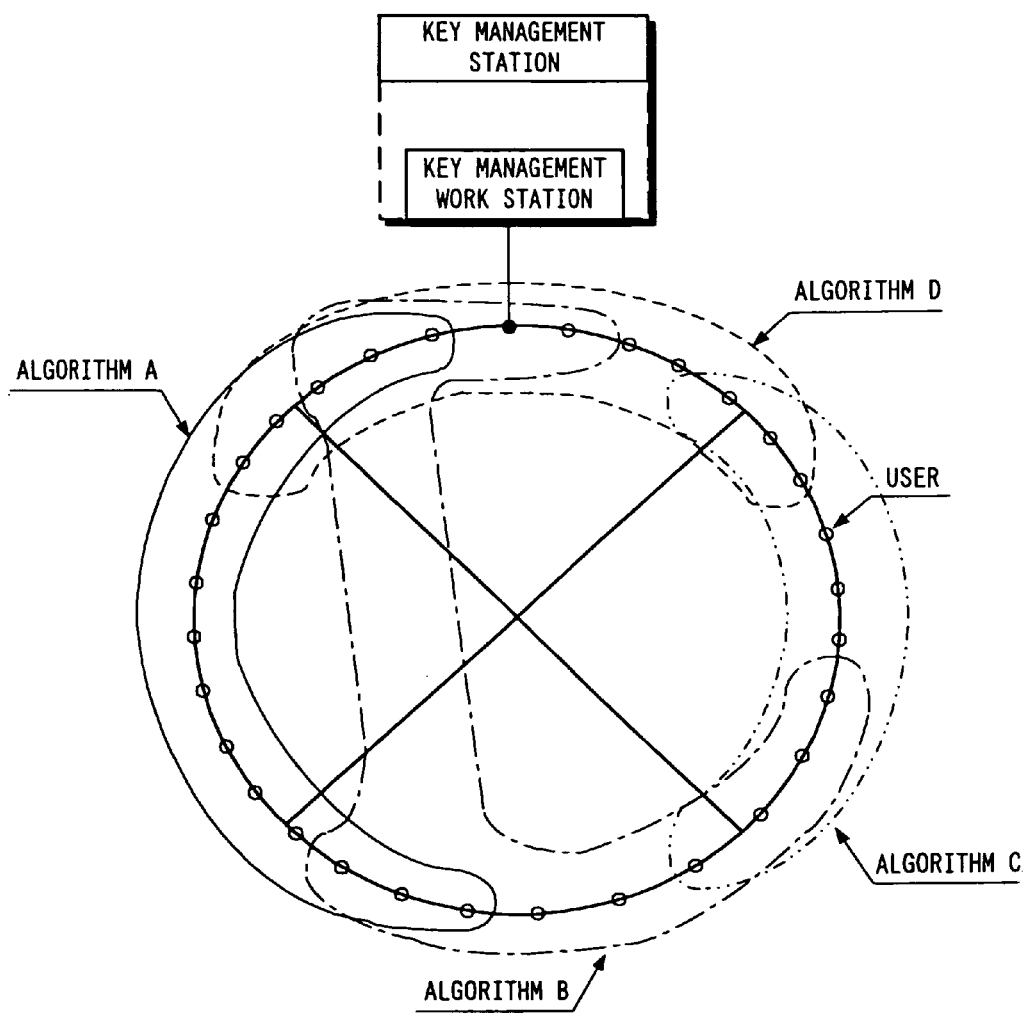
FIG. 22 is an explanatory diagram showing other embodiment of network communication system.

FIG. 22 shows a different embodiment from FIG. 1 of the network communication system in which a plurality of encryption algorithms exist. In this embodiment of the network communication system, algorithm A, algorithm B, algorithm C and algorithm D exist as the encryption algorithm.

Usually, the encryption algorithm for use is determined by user's selection.

There are some encryption algorithms which user don't want to use because of the characteristic of the encryption algorithm.

In the network communication system shown in FIG. 22, the aforementioned four encryption algorithms A, B, C and D are used. In this Figure, a range of users using the encryption algorithm A is indicated with a solid line, a range of users using the encryption algorithm B is indicated with a dot and dash line, a range of users using the encryption algorithm C is indicated with two dots and dash line and a range of users using the encryption algorithm D is indicated with broken line.

Users located in a region in which the encryption algorithms overlap can use plural encryption algorithms.

The key management station stores users capable of using each encryption algorithm in data base.

If a request for cryptographic communication occurs between users, the key management work station grasps the operating condition of the encryption algorithm of the transmission side and reception side according to the aforementioned data base.

If the transmission side and reception side share the same encryption algorithm, cryptographic communication between the both is continued.

If the same encryption algorithm is not shared, whether or not the same encryption algorithm can be held by the transmission side and reception side is determined according to the aforementioned data base. If the sharing is impossible, it is notified the both that the cryptographic communication is disabled.

Whether or not the encryption algorithm can be shared between the users is determined depending on user's convenience. The range of users using each encryption algorithm is changed by user's convenience.

The key management work station changes information stored in data base for indicating users using each encryption algorithm by notification from the user.

Next, software processing function of each information processing unit (personal computer, key management work station) in this network communication system will be described with reference to FIG. 2.

Figure 2:
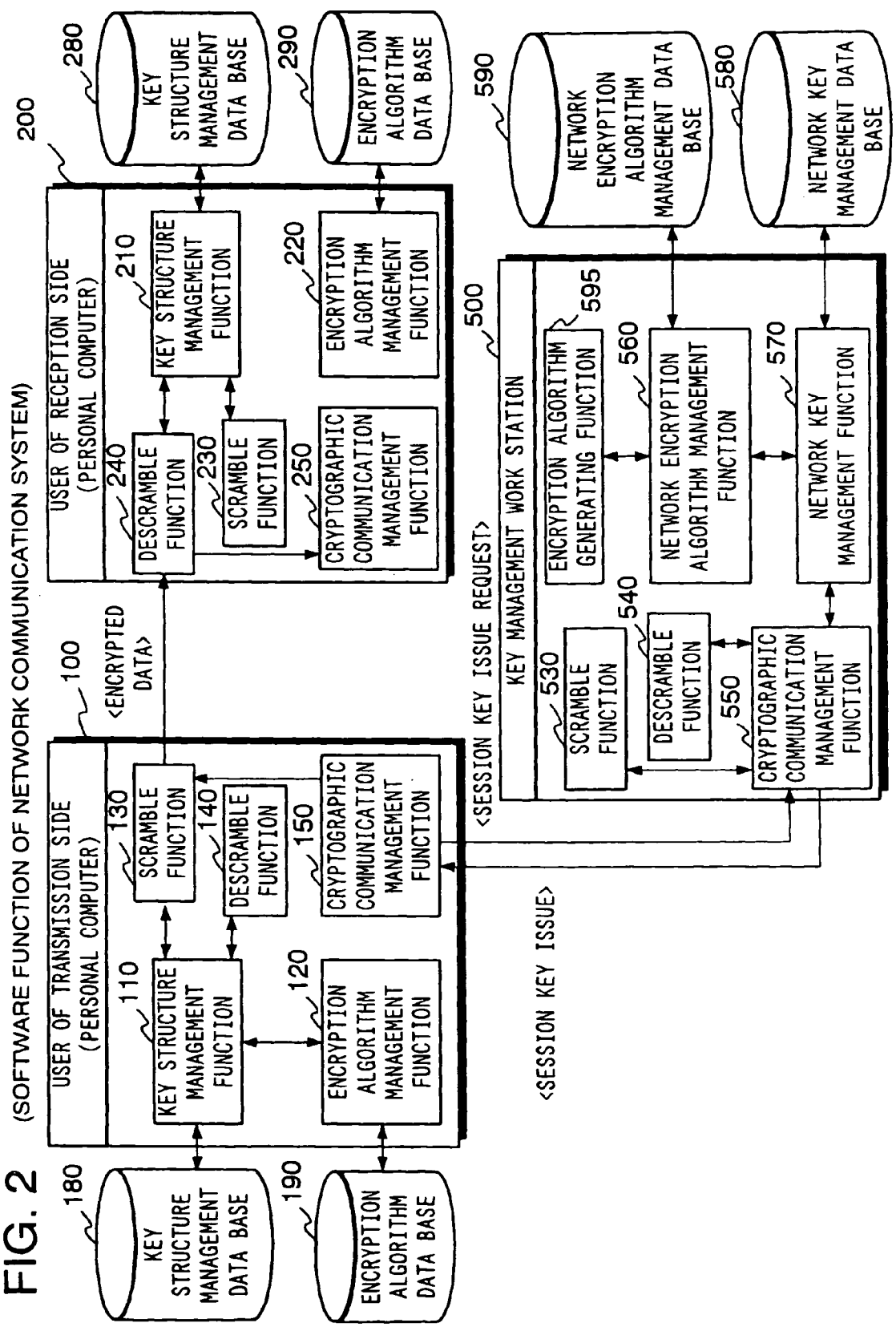
FIG. 2 is a functional block diagram showing a functional structure of respective portions of the network communication system.

In FIG. 2, the personal computers 100 and 200 are connected to each other so as to construct a network. Hereinafter, a case where the personal computer 100 is used by a transmission side user and the personal computer 200 is used by a reception side user will be described. It is needless to say that because the personal computers 100, 200 have the same structure, they can be used for both. The key management work station 500 is connected to the personal computer 100 for use by at least the transmission side user.

The personal computer 100 (200) for use by the transmission side (reception side) user includes key structure control function 110 (210), encryption algorithm control function 120 (220), scramble function 130 (230), descramble function 140 (240) and cryptographic communication control function 150 (250). A key structure control data base 180 (280) and encryption algorithm data base 190 (290) are connected to the personal computer 100 (200) so as to be accessible therefrom.

These data bases may be provided separately from the personal computers 100, 200 or may be provided integrally therewith. The aforementioned data bases may be shared by plural personal computers.

The aforementioned key management work station 500 includes scramble function 530, descramble function 540, cryptographic communication control function 550, encryption algorithm generating function 595, network encryption control function 560, and network key management function 570, and is connected to network encryption algorithm control data base 590 and network key management control data base 580 so as to be accessible therefrom. These data bases may be provided separately of the key management work station 500 or may be provided integrally with the key management work station 500.

Next, the function of the key management work station 500 will be described with reference to FIG. 2.

A user ID of each user and encryption algorithm are registered in the network encryption algorithm control data base DB590 with correspondence therebetween.

The network encryption algorithm control function 570 controls the data bases for the aforementioned two kinds of data, and carries out registration, updating and deletion of the encryption algorithm for use by each user.

The encryption algorithm generating function 595 has a function for generating the encryption algorithm of series A.

As for the encryption intensity of the encryption algorithm, the longer the length of an operating key, the more difficult decryption becomes so that the encryption intensity increases thereby improving the security.

Further, if even in the encryption algorithm having the same key length, the operating encryption algorithm is changed periodically, a period in which a cipher is attacked can be limited thereby improving the security on communication.

The encryption algorithm generating function 595 generates different encryption algorithms belonging to series A in which the key length for use is the same as or longer than current encryption algorithms belonging to series A.

The network key structure control function 570 controls the key to be operated by this system and stores information of the key to be used by the user in the network key structure control data base.

The scramble function 530 is a function for encrypting data to be transmitted by the key management station 400 (see FIG. 1) to the user and the descramble function 540 is a function for decrypting the encoded data received by the key management station 400 (see FIG. 1) from the user.

The network key management function 570 controls the key to be used for encrypting and decrypting and stores information about the key for use by the user with a correspondence to the encryption algorithm operated for the key structure control data bases 180, 280.

Next, the software function of the personal computers 100 (200) which are information processing units for use by the user will be described.

The encryption algorithm control function 120 (220) controls the encryption algorithm operated by the user.

The operating encryption algorithm converts the encryption algorithm according to an instruction from the key management work station 500. The encryption algorithm control data base stores the encryption algorithms to be distributed by the key management station 400 (see FIG. 1).

The scramble function 130 (230) is a function for encrypting data to be transmitted by the user and the descramble function 140 (240) is a function for decrypting the encrypted data received by the user.

The key structure control function 110 (210) controls the key for use for encrypting and decrypting and stores the keys with a correspondence to the encryption algorithm to be operated by the key structure control data base 180 (280).

Next, the content of information to be stored in data base to be accessed from the aforementioned key management work station will be described with reference to FIGS. 3A and 3B.

In FIG. 3A, user ID for identifying a user, name of the encryption algorithm to be operated by the user, a correspondence to the encryption algorithm version, updating date, key management station ID for identifying the key management station, name of the encryption algorithm to be operated by the key management station, a correspondence with the encryption algorithm version and its updating date are stored in the network encryption algorithm control data base.

In FIG. 3B, user ID for identifying a user, name of the encryption algorithm to be operated by the user, a correspondence between encryption algorithm version and key information indicating the encryption key to be operated, its updating date, key management station ID for identifying the key management station, name of the encryption algorithm to be operated by the key management station, a correspondence between the encryption algorithm version and key information indicating the encryption key to be operated, and its updating date are stored in the network key management data base.

Next, the content of information to be stored in the data base accessible from the personal computer for use by user will be described with reference to FIGS. 4A and 4B.

In FIG. 4A, a name of the encryption algorithm, a correspondence of the encryption algorithm version, and its updating date are stored in the encryption algorithm control data base.

In FIG. 4B, a name of the encryption algorithm, encryption algorithm version, a correspondence to user key information indicating user's encryption key, and its updating date, and a name of the encryption algorithm, encryption algorithm version, a correspondence to key information of the key management station indicating the encryption key of the key management station, and its updating date are stored in the key management data base.

Figure 7:
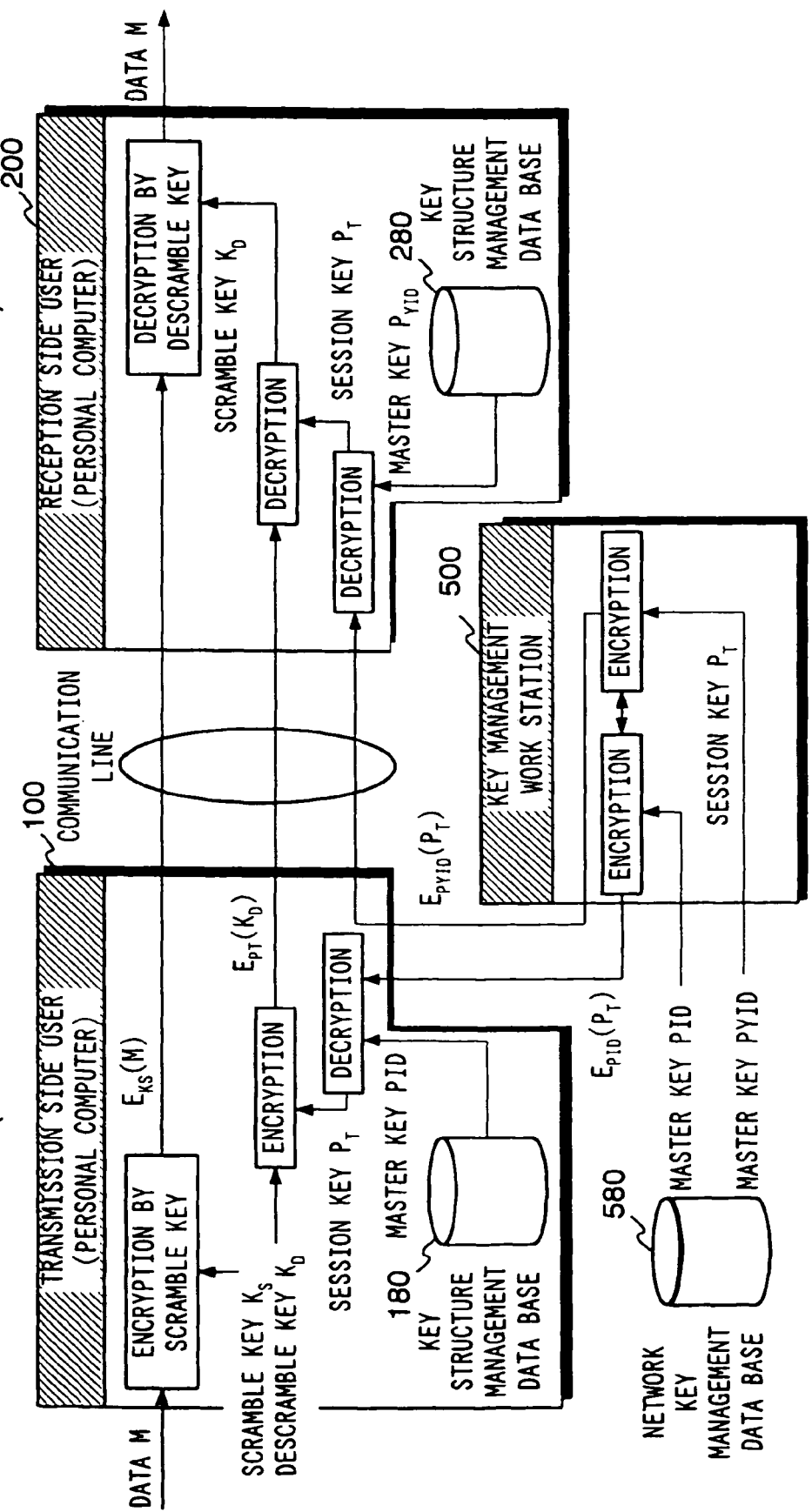
FIG. 7 is a data flow diagram showing cryptographic communication by common key cipher to which the present invention is applied.

Referring to FIG. 7, an outline of cryptographic communication of a case where both the transmission side and reception side users share the same encryption algorithm (assuming that a common key cipher is operated here) will be described. In this case, it is assumed that the transmission side user is A, the reception side user is B and the transmission data to be transmitted therebetween is M.

The user U[A] specifies the user U[B] relative to the key management work station 500 and requests to issue a session key for use in cryptographic communication.

The key management work station 500 receives this request and issues the user U[B] with a session key which enables cryptographic communication to the user U[A].

If the user U[A] receives this session key, by using it with the scramble function 130 of the personal computer for use, data M is encrypted and transmitted to user U[B] as an encrypted statement.

The user U[B] stores the same encryption algorithm as the user U[A] in the encryption algorithm data base 190. As a result, the user U[B] decrypts the encrypted statement transmitted from the user U[A] by the descramble function 140 to obtain data M.

On the other hand, as a case where the operating encryption algorithm differs between the transmission side and reception side users, for example, in the operating encryption algorithms A[1]–A[n], B[1]–B[m], sometimes a plurality of encryption algorithms in which methods of the common key encryption algorithm and public key encryption algorithm are different exist.

If the user U[A] carries out cryptographic communication for the user U[B], in case where both the users share the same encryption algorithm, the cryptographic communication can be carried out without any special treatment. However, if the same encryption algorithm is not shared, the encryption algorithm possessed by user is converted so as to make both the users share the same encryption algorithm thereby achieving the cryptographic communication.

This encryption algorithm conversion is carried out depending on the condition of the encryption algorithm possessed by the user as follows.

(1) The encryption algorithms of the same series are controlled based on the version number. The encryption algorithm is converted to the other encryption algorithm of the same series having the same or a different encryption intensity.

(2) The common key encryption algorithm is converted to other common key encryption algorithm.

(3) The public key encryption algorithm is converted to other public key encryption algorithm.

(4) The common key encryption algorithm is converted to other public key encryption algorithm.

(5) The public key encryption algorithm is converted to other common key encryption algorithm.

The encryption algorithm mentioned here means a procedure for converting a series of data. The encryption mentioned here means data conversion and the decryption means inverse conversion of converted data.

For example, it is assumed that K is binary data string and M is another binary data string. Consider the following $\pi$ function which is determined by K.

$$\pi(M) = M \text{ xor } K$$

where xor indicates exclusive OR between M and K. The data string M has been converted by $\pi(M)$. If $\pi(M)$ xor K is obtained with respect to this converted data, $$\pi(M) \text{ xor } K = (M \text{ xor } K) \text{ xor } K$$
$$= M \text{ xor } (K \text{ xor } K)$$
$$= M$$

The data M is obtained by inversely converting the converted data $\pi(M)$. The procedure for data conversion and inverse conversion like this $\pi$ function is called encryption algorithm.

Next, assuming N data ($K_1$, $K_2$, $K_3$, ... $K_N$), a function corresponding to data $K_i$ is assumed to be $\pi_i$. From this N $\pi$ functions, the following two pairs of the functions f, g are considered.

$$f = \pi_1 \circ \pi_2 \circ \pi_3 \circ \circ \circ \pi_N$$

$$g = \pi_N \circ \pi_{N-1} \circ \pi_{N-3} \circ \circ \circ \pi_1$$

These two pairs of the functions f, g are obtained by computation on the n π functions sequentially. Therefore, f(M) and g(M) indicate a procedure for conversion of data M and the converted data f (M) is inversely converted by the function g to introduce data M.

Therefore, it can be considered that the functions f, g are a single encryption algorithm, so that it can be considered that the function f corresponds to encrypting of data and the function g corresponds to decrypting of data.

If the computation order of N π functions or the value of parameter $K_i$ is changed, another encryption algorithm can be obtained.

The encryption algorithm of the same series mentioned in the aforementioned encryption algorithm conversion means an encryption algorithm obtained by changing an order of a part of the data conversion or assembling by changing the values of parameters for use. Hereinafter, the encryption algorithm of the same series is referred to as encryption algorithm of a different version.

If such encryption algorithm conversion is carried out, the key possessed by the user is also converted corresponding to the converted encryption algorithm.

Next, an outline of the encryption algorithm conversion operated in network communication to which the present invention is applied will be described with reference to FIG. 5.

Here, it is assumed that the transmission side user is U[A] and the encryption algorithm operated by the U[A] is encryption algorithm EANG. On the other hand, it is assumed that the reception side user is U[B] and encryption algorithm operated by the U[B] is encryption algorithm EBF.

The encryption algorithm EANG and encryption algorithm EBF are stored in the network encryption algorithm control data base 590 of the key management work station 500 by making the former correspond to the user ID of the user U[A] and the latter correspond to the user ID of the user U[B].

Further, it is assumed that a key for the key management work station 500 to carry out cryptographic communication with the user U[A] based on the encryption algorithm EANG is $K_A$ and a key for the key management work station 500 to carry out cryptographic communication with the user U[B] based on encryption algorithm EBF is $K_B$.

The key $K_A$ is stored in the key structure control data base 180 of the user U[A] and the key $K_B$ is stored in the key structure control data base 280 of the user U[B]. Further, the key $K_A$ is stored in the network key management data base 580 of the key management work station 500 with a correspondence to the user ID of the user U[A] and the key $K_B$ is stored therein with a correspondence to the user ID of the user U[B].

By taking a case where the user U[A] carries out cryptographic communication with the user U[B] under the above described environment, an outline of the encryption algorithm conversion to be operated in this network communication system will be described.

1: The user U[A] specifies a reception side person by the user ID of the user U[B] by the cryptographic communication control function 150 and sends "a request for session key issue" to the cryptographic communication control function 550 of the key management work station 500.

2: The "request for session key issue" is sent to the network encryption algorithm control function 560 of the key management work station 500. The network encryption algorithm control function 560 retrieves in the network encryption algorithm data base 590 based on the user ID of the user U[A] and user ID of the user U[B].

The encryption algorithm to be operated by the user U[A] is encryption algorithm EANG and the encryption algorithm to be operated by the user U[B] is encryption algorithm EBF. Thus, it is determined that the same encryption algorithm is not shared and this result is transmitted to the cryptographic communication control function 550.

3: Receiving this result, the cryptographic communication control function 550 starts conversion of the encryption algorithm of the user U[B] from EBF to EANG.

First, the key $L_B$ is generated to carry out cryptographic communication with the user U[B] with encryption algorithm EANG and "descramble function confirmation end" is specified in plain text data MD.

Next, the encryption algorithm EANG and key $L_B$ are encrypted by the encryption algorithm EBF and key $K_B$ so as to create the cipher statement $EBF_{KB}$ (EANG) and $EBF_{KB}$ ($L_B$) Further, the plain text data MD is encrypted with the encryption algorithm EANG and key $L_B$ SO as to create the encrypted statement $EANG_{LB}$ (MD). The aforementioned three encrypted statements are created by the scramble function 530 of the key management work station 500.

These three encrypted statements are sent to the user U[B] as "encryption algorithm updating request".

4: The user U[B] receiving these three encrypted statements $EBF_{KB}$(EANG), $EBF_{KB}$(LB) and $EANG_{LB}$(MD) decrypts these encrypted statements by the descramble function 240.

First, the encrypted statement $EBF_{KB}$ (EANG) and encrypted statement $EBF_{KB}$(LB) are decrypted by the key $K_B$ stored in the key structure control data base 280 so as to obtain the encryption algorithm EANG and key $L_B$.

The encryption algorithm control function 220 stores the obtained encryption algorithm EANG in the encryption algorithm data base 290 and updates the operating condition of the encryption algorithm from the encryption algorithm EBF to the encryption algorithm EANG. The key structure control function 210 stores the obtained key $L_B$ in the key structure control data base 280.

In this manner, the encryption algorithm and key are updated.

Next, by using the updated encryption algorithm EANG and key $L_B$, the encrypted statement $EANG_{LB}$ (MD) is decrypted so as to obtain a plain text data MD. It is confirmed that the obtained plain text data MD is written as "descramble function confirmation is terminated" and then it is confirmed that the descramble function 240 by the converted encryption algorithm EANG is operated properly.

5: Next, the plain text data MS is written as " scramble function confirmation is terminated" and by operating the scramble function 230, the encrypted statement $EANG_{LB}$ (MS) is created using the encryption algorithm EANG and key $L_B$.

This created encrypted statement is distributed to the key management work station 500 as the "encryption algorithm updating report".

6: Receiving the "encryption algorithm updating report", the key management work station 500 decrypts the encryption algorithm EANG and key $L_B$ so as to obtain the plain text data MS. It is confirmed that the obtained plain text data MS is written as "scramble function confirmation is terminated" and then it is confirmed that the scramble function 230 by the encryption algorithm EANG converted by the user U[B] is operated properly. As a result, it is confirmed that the encryption algorithm conversion, the scramble function 230 and descramble function 240 for carrying out encrypting and decrypting are operated properly and then the encryption algorithm conversion is terminated.

7: As a result of the above procedure, the user U[A] and user U[B] become capable of sharing the same encryption algorithm EANG. The users U[A] and U[B] restart cryptographic communication and the key management work station carries out "session key issue" based on the algorithm EANG to the user U[A].

In the above description, the procedures for distribution of the encryption algorithm upon encryption, conversion of the key to be operated and confirmation of the operation of the converted encryption algorithm have been described.

A detail of the encryption algorithm conversion has been described. Here, an attention is paid to which the operating cipher is public key cipher or common key cipher and then, the encryption algorithm conversion (second embodiment of the present invention) in a case where the cryptographic communication system is constructed of the common key cipher will be described and secondly, the encryption algorithm conversion (third embodiment of the present invention) in a case where the cryptographic communication system is constructed of public key cipher will be described. Because the basic composition of these embodiments is the same as the aforementioned first embodiment, in the following description, mainly a different point therefrom will be stated and a detail of the encryption algorithm conversion of each case will be described.

First, the second embodiment of the present invention will be described with reference to FIGS. 6–10. Here, the encryption algorithm conversion in the cryptographic communication system constructed of the common key cipher will be described. That is, the encryption algorithm conversion in a case where the operating encryption algorithms A[1]–A[n] and B[1]–B[m] are all common key encryption algorithms in the cryptographic communication system of FIG. 1 will be described.

The cryptographic communication based on the common key encryption algorithm will be described with reference to FIGS. 6 and 7.

As a presumption for carrying out cryptographic communication, user ID and a secret key as master key are allocated to each user using information processing unit such as a personal computer from the key management station 500. Then, the master key allocated to each user is registered and controlled in the network key management data base 580 of the key management work station 500 with a correspondence to the user ID. Likewise, the secret key $P_{CID}$ is allocated to the key management station 500 as the master key. This embodiment uses duplex encryption method in which the encryption algorithm of the scramble key ks for use in data encryption and the encryption algorithm of the session key for use in dispatch of the descramble key $K_D$ are composed of different encryption algorithms, thereby intending to improve the security as compared to the case where the same encryption algorithm is used. In this embodiment, it is assumed that the encryption algorithm for operating the session key and master key uses the same encryption algorithm.

Hereinafter, by taking a case where cryptographic communication is carried out from the user u[A] to the user U[B], a content of the cryptographic communication will be described.

(1) In case where the user U[A] carries out cryptographic communication with the user U[B], the user U[A] requests the key management station 500 for issue of the session key. Here, it is assumed that the user U[A] is a transmission side user and the user U[B] is a reception side user. Receiving this session key issue request, the network encryption algorithm control function 560 of the key management work station 500 retrieves in the network encryption algorithm data base 590 and determines whether or not the encryption algorithm used by the user U[A] is the same as that used by the user U[B].

(2) When it is determined that the user U[A] and user U[B] use the same encryption algorithm, the network key management function 570 of the key management work station 500 generates a session key $P_T$ with that encryption algorithm. Next, the master key PID of the transmission side user and the master key $P_{YID}$ of the reception side user are fetched out from the network key management data base 580 and a plain text of the session key $P_T$ is encrypted so as to create the encrypted statements $E_{PID}$ ($P_T$), $E_{PYID}$ ($P_T$). This encrypted statement is transmitted to such an information processing unit as a personal computer used by the transmission side user.

(3) In the personal computer for use by the transmission side user, the master key $P_{ID}$ of that user controlling the computer is fetched out from the key structure control data base 180. Using this key, the transmitted session key encrypted is decrypted so as to obtain the session key $P_T$.

(4) On the other hand, receiving the data M input by the user, the scramble key $k_s$ for encrypting this data M and descramble key $K_D$ for decrypting it are generated.

(5) Next, the data M input by the user is encrypted by the scramble key $k_s$ so as to create an encrypted statement $E_{ks}$(M). Likewise, the descramble key $K_D$ is encrypted with the session key PT so as to create the encrypted statement $E_{PT}$ ($k_D$). These two encrypted statements and the transmitted encrypted statement $E_{PYID}$($P_T$) are transmitted to such information processing unit as a personal computer for use by the reception side user.

(6) The personal computer of the reception side user fetches the master key $P_{YID}$ of this user from the key structure control data base 280 and the encrypted session key $E_{PYID}$($P_T$) by this key is decrypted so as to obtain the session key $P_T$. Next, the transmitted encrypted descramble key $E_{PT}$($K_D$) is decrypted with the session key PT so as to obtain the descramble key $K_D$.

Finally, the encrypted statement $E_{ks}$ (M) of data transmitted with this descramble key $K_D$ is decrypted so as to obtain the data M.

If the network encryption algorithm control function of the key management work station 500 determines that the user U[A] and user U[B] do not use the same encryption algorithm, it carries out conversion of the encryption algorithm of the user U[B] for the users U[A] and U[B] to be able to operate the same encryption algorithm.

Next, the procedure for encryption algorithm conversion of this embodiment will be described with reference to FIGS. 6, 8 and 9.

(1) If the network encryption algorithm control function 560 receives a session key issue request containing user ID of the transmission side user and user ID of the reception side user from the transmission side user and retrieves in the network encryption algorithm data base 590 with the transmitted user ID as a key, so as to grasp the operating condition of the encryption algorithm operated by the transmission side user and reception side user. As shown in FIG. 6, the cryptographic communication system applies duplex encryption method by the common key cipher, so that two kinds of encryption algorithms, that is, encryption algorithm for use in encrypting of data and encryption algorithm for use in operating the session key are used. If the two kinds of the encryption algorithms operated by the transmission side user and reception side user do not agree with each other, cryptographic communication between both the parties cannot be achieved.

If no coincidence occurs as a result of retrieval in the network encryption algorithm data base 590, the encryption algorithm EANG operated by the transmission side user is fetched out. The fetched encryption algorithm is supplied with an identifier for identifying whether it will be used for encrypting of data or operating the session key. If the two kinds of the encryption algorithms do not coincide with each other, the two kinds of the encryption algorithms are fetched out.

Assuming that the encryption algorithm operated by the reception side user is EBF, this encryption algorithm EBF is converted to the encryption algorithm EANG fetched out.

(2) The network key management function 570 of the key management work station 500 generates the session key PTA with the encryption algorithm EBF prior to conversion and generates the session key $P_{TB}$ with the encryption algorithm EANG after the conversion. If there is no change in the algorithm for operating the session key, the PTA is equal to the $P_{TB}$. Next, the user ID key of the reception side user is retrieved in the network key management data base 580 and the master key $P_{YID}$ of the reception side user is fetched out.

If the encryption algorithm is converted, the key length of the key to be used for cryptographic communication or bit length increases or decreases. Therefore, in this case, it is demanded that a change of the key length of the encryption key is carried out with a conversion of the encryption algorithm.

Figure 10A:
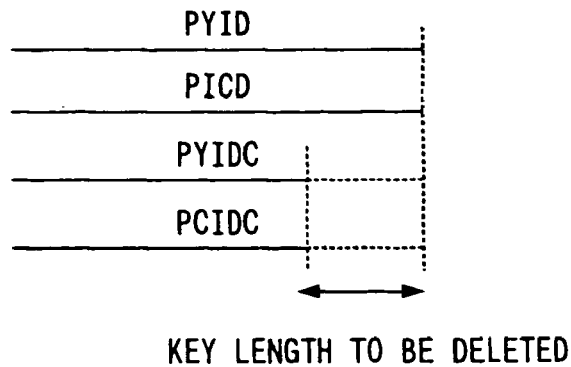
FIGS. 10A and 10B are explanatory diagrams showing a change of an encryption key of common key cipher to which the present invention is applied.
Figure 10B:
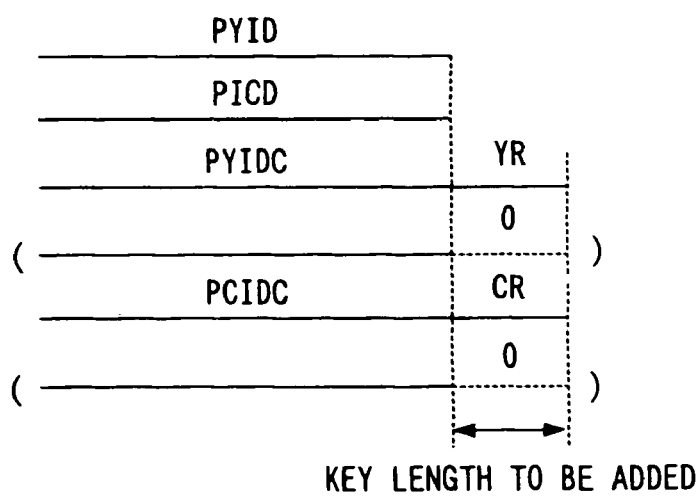

Conversion of the encryption key accompanied by a conversion of the encryption algorithm will be described with reference to FIG. 10A and FIG. 10B.

A case where the bit number of the key decreases is as follows. As shown in FIG. 10A, redundant bit numbers after the master key $P_{YID}$ of the reception side user and after the master key $P_{CID}$ of the key management station 500 are deleted so as to obtain new master key $P_{YIDC}$ for the reception side user and master key $P_{CIDC}$ for the key management station 500.

On the other hand, a case where the bit number of the key increases is as follows. As shown in FIG. 10B, random numbers YR, CR are generated corresponding to short bit numbers, so that a new master key $P_{YIDC}$ ($P_{YIDC}=P_{YID}\|YR$) for the reception side user is obtained by connecting a random number YR to the $P_{YID}$ and a new master key $P_{CIDC}$ ($C_{CIDC}=C_{CID}\|CR$) for the network key management work station 500 is obtained by connecting the random number CR to the $P_{CID}$.

Because there is a possibility that the updated master keys $P_{YIDC}$, $P_{CIDC}$ of the users are equal to the master keys of the other users, by retrieving the network key management data base 580, it is confirmed if there is same master key or not and if there is a user of the same master key, a new master key of a required length is generated.

(3) The following encrypted statement is produced using the encryption algorithm EBF prior to conversion at the key management work station 500.

1: The session key PTA is encrypted with the encryption algorithm EBF prior to conversion and master key $P_{YID}$ so as to create the encrypted statement $EBF_{PYID}$ (PTA)

2: The encryption algorithm EANG is encrypted with the encryption algorithm EBF prior to the conversion and the session key $P_{TA}$ so as to create the encrypted statement $EBF_{PTA}$ (EANG).

3: The master key $P_{YIDC}$ of the reception side user after the conversion is encrypted with the encryption algorithm EBF prior to the conversion and session key PTA so as to create the encrypted statement $EBF_{PTA}$ ($P_{YIDC}$). If there is no change in the master key of the reception side user, this encrypted statement is not created.

(4) The following encrypted statement is created using the encryption algorithm EANG after the conversion at the key management station 500.

1: The session key $P_T$ to be operated by the encryption algorithm after the conversion is encrypted with the encryption algorithm EANG after the conversion and the master key $P_{YIDC}$ of the reception side user after the conversion so as to create the encrypted statement $EANG_{PYIDC}(P_{TB})$.

If there is no change in the encryption algorithm for operating the session key, this encrypted statement is the same as the $EBF_{PYID}(P_{TA})$.

2. The session key $P_{TB}$ to be operated by the encryption algorithm after the conversion with the encryption algorithm EANG after the conversion and the master key $P_{CIDC}$ of the key management work station 500 after the conversion has been encrypted so as to create the encrypted statement $EANG_{PCIDC}$ ($P_{TB}$).

If there is no change in the encryption algorithm for operating the session key, this encrypted statement is the same as the encrypted statement $EBF_{PCID}$ ($P_{TA}$) produced by ciphering the session key PTA to be operated based on the encryption algorithm before the conversion with the encryption algorithm EBF before the conversion and the master key $P_{CID}$ of the key management work station 500 before the conversion.

3: The plain text data MD is written as "confirmation of descramble function after algorithm conversion is terminated".

A scramble key $k_{SC}$ for encrypting plain text data MD and a descramble key $K_{DC}$ for decrypting both with the encryption algorithm EANG after the conversion, are generated.

Next, the data MD is encrypted with the scramble key $k_{SC}$ so as to create an encrypted statement $E_{ksc}$ (MD). Likewise, the descramble key $K_{DC}$ is encrypted with the session key $P_{TB}$ to be operated with the encryption algorithm after the conversion so as to create the encrypted statement $EANG_{PTB}(K_{DC})$.

(5) At the key management work station 500, three encrypted statements have been produced in the above (3), $EBF_{PYID}$ ($P_{TA}$), $EBF_{PTA}$(EANG) and $EBF_{PTA}$ ($P_{YIDC}$) and four encrypted statements have been produced in the above (4) $EANG_{PYIDC}(P_{TB})$, $EANG_{PCIDC}(P_{TB})$, $E_{kSC}$ (MD) AND $EANG_{PTB}(K_{dc})$. These statements are sent to a reception side user as "encryption algorithm conversion request". Here, the three encrypted statements produced in the above (3) are information for converting the encryption algorithm of the reception side user and the four encrypted statements produced in the above (4) are information for confirming whether or not the converted encryption algorithm operates properly after the encryption algorithm is converted.

(6) After the encryption algorithm of the reception side user is converted and the master key is updated, the reception side user is operating the EBF as the encryption algorithm and possesses the $P_{YID}$ as the mater key. From an encrypted statement transmitted from the key management work station, 1: the encrypted statement $EBF_{PYID}$ ($P_{TA}$) is decrypted with the PYID as the master key so as to obtain the session key $P_{TA}$.

2: The encrypted statement EBF$_{PTA}$ (EANG) is decrypted with the session key P$_{TA}$ so as to obtain the encryption algorithm EANG.
3: The encrypted statement EBF$_{PTA}$ (P$_{YIDC}$) is decrypted with the session key PTA so as to obtain the master key P$_{YIDC}$.

In the above manner, the reception side user obtains the encryption algorithm EANG and master key PYIDC. Then, the obtained encryption algorithm EANG is registered in the encryption algorithm control data base 290 and the encryption algorithm to be operated by the encryption algorithm control function 220 is converted from EBF to EANG.

If the master key of a reception side user is updated, the master key is changed from P$_{YID}$ to P$_{YIDC}$ by the key structure control function 210.

(7) The descramble function 240 is confirmed by the encryption algorithm converted by the reception side user.

The encrypted statement transmitted from the key management work station 500 is decrypted by the descramble function 240 using the converted encryption algorithm and it is confirmed that the descramble function 240 operates properly.

1: The encrypted statement EANG$_{PYIDC}$(P$_{TB}$) is decrypted with P$_{YIDC}$ as the master key so as to obtain the session key P$_{TB}$.
2: The encrypted statement EANG$_{PTB}$ (k$_{DC}$) is decrypted with the session key P$_{TB}$ so as to obtain the descramble key k$_{DC}$.
3: The encrypted statement E$_{ksc}$(MD) is decrypted with the descramble key k$_{DC}$ so as to obtain a plain text data MD.
4: It is confirmed that the plain text data MD is written as "confirming the descramble function after the algorithm conversion has been terminated" and then it is confirmed that the descramble function 240 operates properly.

(8) Driving the scramble function 230 using the converted encryption algorithm of a reception side user To confirm that the scramble function 230 using the converted encryption algorithm operates properly, plain text data is set and encrypted by the scramble function 230 and then transmitted to the key management work station 500.

1: The plain text data MS is written as "algorithm conversion confirmation test is terminated". A scramble key K$_{su}$ for encrypting this plain text data MS with the encryption algorithm EANG after the conversion and a descramble key K$_{du}$ for decrypting are generated. Next, the data MS is encrypted with the scramble key k$_{su}$ so as to produce an encrypted statement EANG$_{ksu}$(MS). Likewise, the descramble key K$_{du}$ is encrypted with the obtained session key P$_{TB}$ so as to create the encrypted statement EANG$_{PTB}$ (k$_{Du}$).
2: Produced two encrypted statements EANG$_{PTB}$(k$_{DU}$) and EANG$_{ksu}$ (MS) and an encrypted statement EANG$_{PCIDC}$ (P$_{TB}$) transmitted from the key management work station 500 are returned to the key management work station 500 as "encryption algorithm conversion confirmation request".

(9) Confirmation of encryption algorithm conversion at the key management work station 500

The encrypted statement returned from the reception side user is decrypted so as to confirm that the scramble function 230 for the converted encryption algorithm of the reception side user operates properly. Then, it is confirmed that the encryption algorithm after the conversion operates properly.

1: The encrypted statement EANG$_{PCIDC}$(P$_{TB}$) is decrypted with the master key P$_{CIDC}$ of the key management work station 500 so as to obtain the session key P$_{TB}$.
2: The encrypted statement EANG$_{PTB}$ (K$_{DU}$) is decrypted with the session key P$_{TB}$ so as to obtain the descramble key K$_{DU}$.
3: The encrypted statement E$_{ksu}$(MS) is decrypted with the descramble key k$_{Du}$ so as to obtain a plain text data MS.
4: It is confirmed that the obtained plain text data MS is written as "algorithm conversion confirmation test is terminated" and it is confirmed that the scramble function 230 of a reception side user operates properly. Then, it is confirmed that the encryption algorithm after the conversion operates properly.

In the network communication system in which the common key cipher is operated, the algorithm conversion can be carried out.

As a result of this algorithm conversion, it comes that the user U[A] and user U[B] share the same encryption algorithm. As a result, the user U[A] and user U[B] are enabled to carry out cryptographic communication by the steps shown in FIG. 7.

In this embodiment, in case where the user U[A] and user U[B] possess an encryption algorithm of the same series having the same intensity or having a different intensity, it is possible to convert to an encryption algorithm having a high intensity by the network encryption algorithm control function 560.

In this case, if the user U[A] has an encryption algorithm having a higher intensity than the user U[B], the encryption algorithm of the user U[B] is converted to an encryption algorithm of the user U[A]. Conversely if the encryption algorithm of the user U[B] has a higher intensity, the encryption algorithm of the user U[A] is converted to that of the user U[B]. This algorithm conversion can be carried out in the same procedures as shown in FIGS. 6, 8 and 9.

Next, a case in which the security is improved by raising the encryption intensity of an encryption algorithm controlled by the key management work station 500 or by changing the encryption algorithm version without changing the encryption intensity will be described.

As shown in FIG. 1, the encryption algorithms A[1]–A[n] are encryption algorithms controlled by the key management work station 500 of the same A cipher series and the key management work station 500 has a function for generating this encryption algorithm. By changing the encryption algorithm, it is possible to change the encryption intensity or procedure for encryption computation. As compared to use of the same encryption algorithm, the security of the cryptographic communication system can be improved.

The user ID of a user operating the same A series encryption algorithm is U[Ai, j] and the key management work station 500 selects a user which changes the encryption algorithm from these users. Then, by using the function for generating the encryption algorithm, a new encryption algorithm is generated and the newly generated encryption algorithm is distributed to a user determined to change the encryption algorithm.

This distribution can be carried out in the same manner as the above described algorithm conversion of the encryption algorithm.

Cases for distributing an encryption algorithm of a different version and an encryption algorithm having a different encryption intensity have been described above.

The encryption algorithm of each user is converted to an encryption algorithm distributed thereto. The encryption algorithm before the conversion is not deleted but stored in the encryption algorithm data base 190, 290 of each user. The key management work station 500 controls the encryption algorithm stored in the encryption algorithm data base 190, 290 of each user by using the network encryption algorithm control data base 590.

Consequently, in case when a request for cryptographic communication from the user U[A] to the user U[B] occurs, if a common encryption algorithm exists in the encryption algorithm data bases 190, 290 of both the users, the key management work station 500 does not have to distribute any encryption algorithm. If the key management work station 500 dispatches an instruction for changing over to the common encryption algorithm, the cryptographic communication from the user U[A] to the user U[B] is enabled.

The encryption algorithm conversion of a case when the cryptographic communication system is composed of common key ciphers has been described above.

A third embodiment of the present invention will be described with reference to FIGS. 11–15. Here, encryption algorithm conversion of a network communication system in which a public key cipher is operated or a case where the cryptographic communication system is composed of the public key cipher will be described.

In the network communication system shown in FIG. 1, it is assumed that all the encryption algorithms A[1]–A[n], B[1]–B[m] to be operated are public key cipher algorithms.

Cryptographic communication by the public key cipher algorithm will be described with reference to FIG. 12.

As the public key cipher algorithm, for example, elliptical curve cipher algorithm is applicable. It is assumed that a base point of an elliptical curve necessary for describing computation of this elliptical curve cipher key is P. The elliptical curve cipher has been stated in 6+for example, "Quick Encryption Method Using Elliptical Curve" by Kazuo Takaragi and Hiroyuki Kurumaya, in Technical Report of IEICE ISEC 97-15(1997-07).

In case when cryptographic communication is carried out, an issue of the session key is received from the network key management function 570 of the key management work station 500, data received based on this key is encrypted so as to create an encrypted statement and then transmitted to the descramble function 240 of a personal computer of a reception side user.

The descramble function 240 decrypts the transmitted encrypted statement so as to obtain data.

As a presumption for operating the cryptographic communication processing portion, a user ID, a secret key $d_{ID}$ as a master key and a public key $Q_{ID}$ (=P·$d_{ID}$: · is computation on elliptical curve) corresponding to this secret key are allocated by the key management work station 500 to each user using such information processing unit as a personal computer. The public key $Q_{ID}$ allocated to user is registered and controlled in the network key management data base 580 of the key management work station 500 with a correspondence to the user ID. Likewise, a secret key dc as the mater key and a public key $Q_C$ (=P·d: · is computation on elliptical curve) corresponding to this secret key are allocated to the key management work station 500. The public key $Q_C$ of the key management work station 500 is open to all users of this system.

According to this embodiment, data encryption is carried out with the scramble key KS and data decrypting is carried out with the descramble key $K_D$. Distribution of this descramble key $K_D$ is carried out by the elliptical curve cipher which is a public key cipher. As a common key encryption algorithm for operating the scramble key $K_s$, descramble key $K_D$, for example, MULTI2 encryption algorithm can be used. The MULTI2 encryption algorithm (Hitachi, "MULTI2", Registration of cryptographic algorithm, ISO9979/0009, NCC, UK (1994)) is an encryption algorithm which has achieved actual performance in for example, CS digital broadcasting (digital broadcasting using communication satellite).

Hereinafter, a case where cryptographic communication is carried out from the user U[A] to the user U[B] will be described. It is assumed that the user U[A] is transmission side user and the user U[B] is reception side user.

(1) Upon cryptographic communication from the user U[A] to the user U[B], the user U[A] requests the key management work station 500 for session key issue. Receiving this session key issue request, the network encryption algorithm control function 560 of the key management work station 500 retrieves in the network encryption algorithm data base 590 so as to determine whether or not the encryption algorithm used by the user U[A] is equal to the encryption algorithm used by the user U[B].

(2) If it is determined that the user U[A] and user U[B] use the same encryption algorithm, the network key management function 570 of the key management work station 500 retrieves in the network key management data base 580 with the user ID as a key and fetches out a public key $Q_{YID}$ corresponding to a master key of a reception side user and a public key $Q_{ID}$ corresponding to a master key of the transmission side user.

Signature producing computation is carried out with the secret key $d_c$ which is the master key of the key management work station 500 to the fetched out public key $Q_{YID}$ and public key $Q_{ID}$ so as to create signature data $S_{dc}(Q_{YID})$ and signature data $S_{dc}(Q_{ID})$. With this public key $Q_{YID}$ as a session key, the signature data $S_{dc}(Q_{YID})$ and signature data $S_{dc}(Q_{ID})$ are transmitted in combination to the transmission side user so as to issue the session key.

(3) A user receiving the public key $Q_{YID}$, signature data $S_{dc}(Q_{YID})$ and signature data $S_{dc}(Q_{ID})$ carries out signature verifying computation on the signature data $S_{dc}(Q_{YID})$ and $Q_{YID}$ using the public key $Q_C$ of the key management work station 500 so as to confirm that the public key $Q_{YID}$ is a key transmitted from a proper key management work station 500 and a key allocated to a proper reception side user intended to communicate with.

In this manner, the transmission side user receives an issue of a public key for use as a session key.

(4) The transmission side user generates the scramble key $K_s$ for encrypting data M to be transmitted and the descramble key $K_D$ for decrypting.

Next, the data M inputted by the user is encrypted with the scramble key $K_s$ so as to create an encrypted statement $E_{Ks}$(M).

Further, the descramble key $K_D$ is encrypted with the transmitted public key $Q_{YID}$ as a session key so as to generate an encrypted descramble key $E_{QYID}(K_D)$.

To guarantee that the data M to be transmitted has been created by the transmission side user, signature producing computation is carried out to the data M to be transmitted with the secret key $d_{ID}$ as a master key allocated to the transmission side user from the key management work station 500 and the signature data $S_{dID}$(M) is produced.

In case of public key cipher, the transmitted key $Q_{YID}$ can be used as an encryption key as it is.

Five data, that is, two encrypted statements $E_{KS}$(M) and $E_{QYID}(K_D)$, signature data $S_{dID}$(M) about the data M, signature data $S_{dC}(Q_{ID})$ about a public key of transmission side user transmitted from the key management work station 500, and public key $Q_{ID}$ of the transmission side user are sent to the reception side user.

(5) Receiving the five data, the reception side user carries out signature verifying computation on the signature data $S_{dc}(Q_{ID})$ and $Q_{ID}$ using the public key Qc of the key management work station 500, so as to confirm that the public key $Q_{ID}$ has been transmitted from a proper key management work station 500, thereby ensuring that that key is a public key allocated to the transmission side user properly.

Then, the encrypted descramble key $E_{QYID}$ ($K_D$) is decrypted with the secret key $d_{YID}$ as a master key which is allocated to the reception side user from the key management work station 500 so as to obtain the descramble key $K_D$.

Next, the encrypted statement $E_{Ks}(M)$ is decrypted with this descramble key $K_D$ so as to obtain the data M.

Finally, signature verifying computation is carried out on the signature data $S_{dID}(M)$ and data M with the public key $Q_{ID}$ transmitted from the transmission side user so as to ensure that the data M is data transmitted from a proper transmission side user.

Consequently, in the network communication system, the user U[A] is capable of carrying out cryptographic communication with the user U[B].

On the other hand, if the encryption algorithm control function determines that the user U[A] and user U[B] don't use the same encryption algorithm, it converts the encryption algorithm of the user U[B] for both the users U[A] and U[B] to be able to use the same encryption algorithm.

Encryption algorithm conversion in a network communication system operating the public key encryption algorithm will be described with reference to FIGS. 11, 13 and 14.

(1) Receiving a session key issue request containing the user ID of the transmission side user and user ID of the reception side user from the transmission side user, the network encryption algorithm control function 560 retrieves in the network encryption algorithm control data base 590 with a transmitted user ID as a key and grasps a condition of the encryption algorithm operated by the transmission side user and reception side user. As shown in FIG. 11, the network communication system employs cryptographic communication system based on duplex encryption method. A common key encryption algorithm is used for data encryption and a public key encryption algorithm is used for operating the session key.

Unless two kinds of the encryption algorithms operated by the transmission side user and reception side user agree, cryptographic communication between the both cannot be carried out.

If the two kinds of the encryption algorithms do not agree as a result of querying on the network encryption algorithm management data base 590, the encryption algorithm EANG operated by the transmission side user is fetched out. The fetched encryption algorithm is supplied with an identifier for indicating whether it is used for data encryption or operation of the session key. Of course, if each of the two kinds of the encryption algorithms does not agree, the two kinds of the encryption algorithms are fetched out.

Assuming that the encryption algorithm operated by the reception side user is EBF, the encryption algorithm is converted from this encryption algorithm EBF to the fetched out encryption algorithm EANG.

(2) The network key management function 570 of the key management work station 500, with the user ID as a key, retrieves in the network key management data base 580 and fetches out a public key $Q_{YID}$ corresponding to a master key of a reception side user for the encryption algorithm EBF before the conversion.

In case where the encryption algorithm is changed to the encryption algorithm EANG, there is a possibility that the master key cannot be used under the encryption algorithm EBF before the conversion of the reception side user. In this case, the network key management function 570 determines whether the master key of the reception side user is compatible for conversion of the encryption algorithm and if it is determined that there is no compatibility, a new public key is generated for the reception side user.

As the new master key, the secret key $d_{YIDC}$ is generated and a public key $Q_{YIDC}$ corresponding to this secret key is generated.

In the key management work station, both the encryption algorithm EBF before the conversion and encryption algorithm EANG after the conversion are supplied with a corresponding master key.

A secret key as a master key corresponding to the encryption algorithm EBF before the conversion is $d_c$ and a public key corresponding to this secret key is $Q_c$.

It is assumed that the secret key which is a master key suitable for the encryption algorithm EANG after conversion is $d_{cc}$ and a public key corresponding to this secret key is $Q_{CG}$.

(3) The network key management function 570 creates the following encrypted statement and signature data using the encryption algorithm EBF prior to the conversion.

1: A scramble key $K_{SB}$ for encrypting the encryption algorithm EANG and secret key $d_{YIDC}$ with the encryption algorithm EBF prior to the conversion and a descramble key $K_{DB}$ for decrypting are generated.

2: The encryption algorithm EANG and secret key $d_{YIDC}$ is encrypted with the scramble key $K_{SB}$ so as to create the encrypted statement $EBF_{KSB}$ (EANG) and encrypted statement $EBF_{KSB}$ ($d_{YIDC}$). Further, the descramble key $K_{DB}$ is encrypted with the fetched public key $Q_{YID}$ as a master key so as to create the encrypted statement $EBF_{QYID}(K_{DB})$.

3: Signature producing computation is carried out on the generated secret key $D_{YIDC}$ and public key $Q_{YIDC}$ with the encryption algorithm EBF prior to the conversion and the secret key $d_c$ which is a master key of the key management work station 500, so as to create the signature data $Sdc(d_{YIDC})$ and signature data $S_{dc}(Q_{YIDC})$.

4: Signature producing computation is carried out on the encryption algorithm EANG with the encryption algorithm EBF prior to the conversion and the secret key $d_c$ which is a master key of the key management work station 500, so as to create signature data $S_{dc}$ (EANG).

5: Signature producing computation is carried out on the public key $Q_{CG}$ which is a master key of the key management work station 500 to be applied to the encryption algorithm EANG after the conversion, with the encryption algorithm EBF prior to the conversion and the secret key dc which is a master key of the key management work station 500, so as to create signature data $S_{dc}$ ($Q_{CG}$)

(4) The scramble function 530 creates the following encrypted statement and signature data using the encryption algorithm EANG after the conversion.

1: The plain text data MD is written as "confirmation of descramble function after algorithm conversion is terminated".

A scramble key $K_{SC}$ for encrypting the plain text data MD with the encryption algorithm EANG after the conversion and a descramble key $K_{DC}$ for decrypting are generated. Next, the data MD is encrypted with the scramble key $K_{SC}$ so as to create the encrypted statement $EANG_{KSC}$ (MD) and then the descramble key $K_{DC}$ is encrypted with the public key $Q_{YIDC}$ to be operated as a session key in the encryption algorithm after the conversion, so as to create the encrypted statement $EANG_{QYIDC}(K_{DC})$.

2: Signature producing computation is carried out on the generated public key $Q_{YIDC}$ and plain text data MD with the secret key $d_{cg}$ allocated as a master key of the key management work station 500 with the encryption algorithm EANG after the conversion, so as to create signature data $S_{dcg}(Q_{YIDC})$ and $S_{dcg}(MD)$ (5) The three encrypted statements $EBF_{QYID}(K_{DB})$, $EBF_{KSB}$ (EANG), $EBF_{KSB}(d_{YIDC})$ produced in the above (3), four signature data $S_{dc}(d_{YIDC})$, $S_{dc}(Q_{YIDC})$, $S_{dc}(EANG)$ and $S_{dc}(Q_{CG})$, newly generated public key $Q_{YIDC}$, public key $Q_{CG}$ of the key management work station 500, the two encrypted statements $EANG_{KSC}(MD)$, $EANG_{QYIDC}$ $(K_{DC})$ produced in the above (4), and two signature data $S_{dcg}(Q_{YIDC})$, $S_{dcg}(MD)$ are transmitted to a reception side user as "encryption algorithm conversion request". Here, the encrypted statement and signature data produced in the above (3) are information for converting the encryption algorithm of the reception side user and the four encrypted statements and signature data produced in the above (4) are information for recognizing whether or not the converted encryption algorithm functions properly after that encryption algorithm is converted.

The network key management function 570 stores the generated public key QYIDC which is a master key of the reception side user in the network key management data base 580 with a correspondence to the encryption algorithm EANG.

(6) Conversion of the encryption algorithm of the reception side user and updating its master key The reception side user operates EBF as the encryption algorithm and possesses the secret key $d_{YID}$ as its master key and the public key $Q_C$ of the key management work station 500 to be operated by the encryption algorithm EBF.

From the encrypted statement transmitted from the key management work station 500.

1: The encrypted statement $EBF_{QYID}(K_{DB})$ is decrypted with the secret key $d_{YID}$ as the master key so as to obtain the descramble key $K_{DB}$. Next, the encrypted statement $EBF_{KSB}(EANG)$ is decrypted with this descramble key $K_{DB}$ so as to obtain the encryption algorithm EANG. Signature verifying computation is carried out on the signature data $S_{dc}(EANG)$ and the obtained encryption algorithm EANG with the public key $Q_C$ of the key management work station 500 so as to ensure that the obtained encryption algorithm EANG has been transmitted from a proper key management work station 500.

2: The encrypted statement $EBF_{KSB}$ $(d_{YIDC})$ is decrypted using the descramble key $K_{DB}$ and then a secret key $d_{YIDC}$ is obtained as a master key of a given user to be operated on the converted encryption algorithm EANG.

Using the public key Qc of the key management work station 500, signature verifying computation is carried out on the signature data $S_{dc}(d_{YIDC})$ and the obtained secret key $d_{YIDC}$, so as to determine whether or not the obtained secret key $d_{YIDC}$ has been transmitted from a proper key management work station 500. Likewise, signature verifying computation is carried out on the signature data $S_{dc}(Q_{YIDC})$ and the public key QYIDC which is a transmitted master key using the public key Qc of the key management work station 500 so as to determine that the obtained public key QYIDC has been transmitted from a proper key management work station 500.

3: Signature verifying computation is carried out on the signature data $S_{dc}(Q_{CG})$ and the public key $Q_{CG}$ to be operated on the transmitted encryption algorithm EANG converted of the key management work station 500, using the public key $Q_C$ of the key management work station 500, so as to determine whether or not the transmitted public key $Q_{CG}$ is a public key sent from a proper key management work station 500.

In this manner, the reception side user obtains the encryption algorithm EANG, a secret key $d_{YIDC}$ as a master key, a public key $Q_{YIDC}$ corresponding to this secret key, and a public key $Q_{CG}$ to be operated on the converted encryption algorithm EANG of the key management work station 500. Then, the obtained encryption algorithm EANG is registered in the encryption algorithm control data base 290 and the encryption algorithm to be operated by the encryption algorithm control function 220 is converted from the encryption algorithm EBF to the encryption algorithm EANG.

If the master key of a reception side user is changed, the secret key as the master key is updated from $d_{YID}$ to $d_{YIDC}$ by the key structure control function 210.

(7) Confirmation of the descramble function 240 by the converted encryption algorithm of a reception side user An encrypted statement transmitted from the key management work station 500 is decrypted by the descramble function 240 using a converted encryption algorithm so as to determine whether or not the descramble function 240 operates properly.

1: The encrypted statement EANG $Q_{YIDC}(K_{DC})$ is decrypted using the secret key $d_{YIDC}$ as a master key so as to obtain the descramble key $K_{DC}$.

2: The encrypted statement $EANG_{KSC}$ (MD) is decrypted with the descramble key $K_{DC}$ so as to obtain a plain text data MD. Next, signature verifying computation is carried out on the signature data $S_{dcg}(MD)$ and the obtained plain text data MD using the public key $Q_{CG}$ of the key management work station 500, so as to determine that the obtained plain text data MD has been transmitted from a proper key management work station 500.

3: It is confirmed that the plain text data MD is "confirmation of the descramble function after algorithm conversion is terminated". Then, it is confirmed that the descramble function 240 operates properly.

(8) Driving the scramble function by the converted encryption algorithm at a reception side user To ensure that the scramble function 230 of the converted encryption algorithm operates properly, plain text data is set up, encrypted by the scramble function 230 and transmitted to the key management work station 500.

1: The plain text data MS is written as "algorithm conversion confirmation test is terminated". The scramble key $K_{su}$ for encrypting the aforementioned plain text data MS and the descramble key $K_{DU}$ for decrypting are generated with the encryption algorithm EANG after the conversion. Next, the plain text data MS is encrypted by the scramble key $K_{SU}$ so as to create an encrypted statement $EANG_{KSU}$ (MS). Likewise, the descramble key $K_{DU}$ is encrypted with the public key $Q_{CG}$ of the key management work station 500 so as to create the encrypted statement $EANG_{QCG}(K_{DU})$. Further, signature producing computation is carried out on the data MS using the secret key $d_{YIDC}$ as a master key of a reception side user so as to produce the signature data $S_{dYIDC}$ (MS).

2: Two produced encrypted statements $EANG_{QCG}$ $(K_{DU})$, $EANG_{KSU}(MS)$, signature data $S_{dYIDC}(MS)$, signature data $S_{dcg}$ $(Q_{YIDC})$ transmitted from the key management work station 500, and public key $Q_{YIDC}$ of a reception side user are returned to the key management work station 500 as "encryption algorithm conversion confirmation request".

(9) Confirmation of the encryption algorithm conversion at the key management work station 500

An encrypted statement returned from the reception side user is decrypted so as to confirm that the scramble function 230 using the converted encryption algorithm of the reception side user operates properly. Then, it is confirmed that the encryption algorithm after the conversion operates properly.

1: The encrypted statement $EANG_{QCG}(K_{DU})$ is decrypted with the secret key $d_{cg}$ as a master key of the key management work station 500 so as to obtain the descramble key $K_{DU}$.

2: The encrypted statement $EANG_{ksu}$ (MS) is decrypted with the descramble key $K_{DU}$ so as to obtain plain text data MS.

3: Signature verifying computation is carried out on the signature data $S_{dcg}(Q_{YIDC})$ and the transmitted public key $Q_{YIDC}$ of the reception side user using the public key $Q_{cg}$ of the key management work station 500, so as to confirm that the transmitted public key QYIDC of the reception side user has been transmitted from a proper reception side user.

4: Signature verifying computation is carried out on the signature data $Sd_{YIDC}$ (MS) and obtained plain text data MS, using the public key QYIDC of a reception side user, so as to confirm that the obtained plain text data MS has been transmitted from a proper reception side user.

5: It is confirmed that the obtained plain text data MS is "algorithm conversion confirmation test is terminated" and then it is confirmed that the scramble function 230 of the reception side user operates properly. Then, it is confirmed that the encryption algorithm after the conversion operates properly.

The examples of the algorithm conversion of this embodiment have been described in the above (1)–(9). By this encryption algorithm conversion, it comes that the user U[A] and user U[B] share the same encryption algorithm. Consequently, as shown in FIG. 12, cryptographic communication between the user U[A] and user U[B] is enabled.

In case when an encryption algorithm is converted, in this embodiment, the secret key as a master key possessed by user and a public key corresponding to this secret key are generated at the key management work station.

Although these keys may be generated newly, it is possible to generate them based on the keys prior to the conversion. The generation of the key will be described below.

In case of public key cipher also, the key length of the secret key for use in the cryptographic communication, or bit number is increased or decreased by the encryption algorithm conversion like the case of the common key cipher.

To reduce the bit number of the key, redundant bit number of a rear part of the secret key dyID as a master key prior to the conversion of a reception side user is deleted and this is used as the secret key $d_{YIDC}$ as a new master key of the reception side user.

Figure 15:
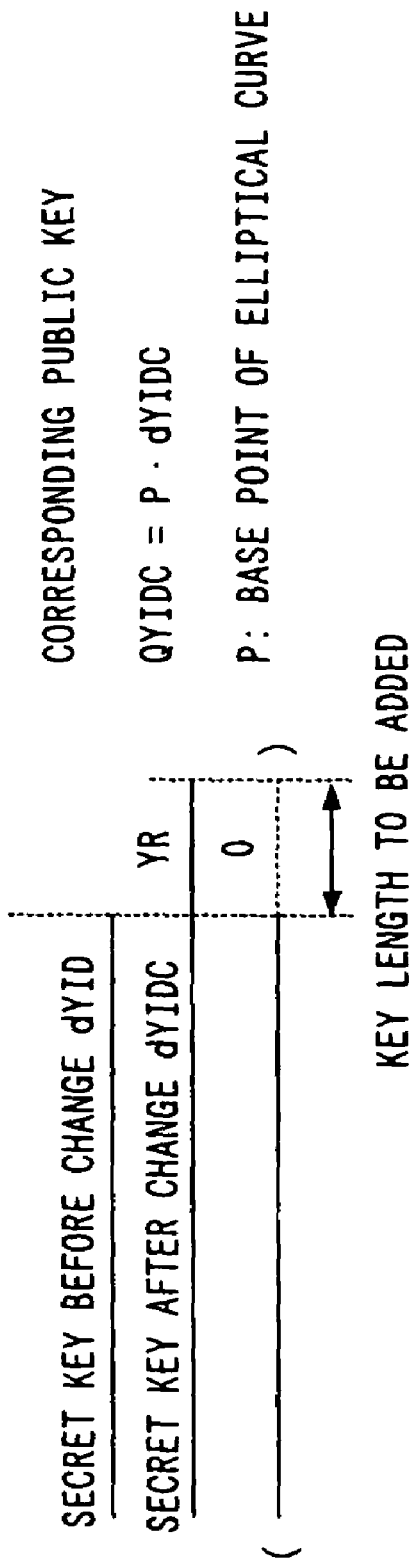
FIG. 15 is an explanatory diagram showing a change of encryption key of public key cipher to which the present invention is applied.

To prolong the bit number of the key, as shown in FIG. 15, a random number YR is generated corresponding to a short bit number and the YR is connected to $d_{PYID}$ so as to obtain the secret key $d_{YIDC}$ ($d_{YIDC}=P_{YIDC}\|YR$) as a new master key of a reception side user. A public key $Q_{YIDC}$ ($=P \cdot d_{YIDC}$; · is computation on an elliptical curve) is determined corresponding to the generated secret key $d_{YIDC}$.

Because there is a possibility that this public key QYIDC is a secret key of other user generated previously, the key management work station 500 retrieves in the network encryption algorithm control data base 590 so as to confirm that there is no same public key. If the same public key exists, a random number is generated again so as to generate a secret key as a master key.

Here, it is always possible to use 0 as YR.

As described, the encryption algorithm for operating the master key and session key employs an elliptical curve encryption algorithm which is different from the common key encryption algorithm. As a result, duplex encryption method is constructed so as to improve the security.

Next, a configuration of a case where the elliptical curve cipher is used as a public key cipher in the network communication system of the present invention will be described. The software function of the case where the public key cipher is used is the same as the software function of the common key cipher shown in FIG. 2. As shown in an example of a case where the aforementioned public key encryption algorithm is used, the master key of each user is the secret key dID and this secret key corresponds to a public key $Q_{ID}$ ($=d_{ID} \cdot P$: · is computation on elliptical curve) on computation of an elliptical curve. The encryption algorithm of the scramble key and descramble key is MULTI2 encryption algorithm as the common key encryption algorithm.

A fourth embodiment of the present invention will be described. Encryption algorithm conversion in encryption function incorporated in a portable information processing unit will be described here.

In the above described first-third embodiments, a plurality of encryption algorithms exist in network communication system as shown in FIG. 1. The key management work station 500 grasps a condition of the encryption algorithm of each user and each time when a request for cryptographic communication occurs, it converts the encryption algorithm of each user as required so as to achieve the cryptographic communication between users.

Recently, an encryption function has been incorporated in a portable information processing unit, for example, portable terminal unit, IC card and the like and it is used for automatic payment of electronic money.

In case where user possesses an IC card as information processing unit in which an encryption function is incorporated and executes automatic payment of electronic money, this IC card is inserted into a reader which is an information processing unit installed on a retailer counter or the like, so that the payment is carried out by information processing between the both.

In this case, if the IC card is connected to the key management work station to carry out encryption processing, a user's procedure becomes complicated so that he or she feels a lot of inconvenience.

Hereinafter, an encryption algorithm conversion method preferable for encryption algorithm conversion to be operated in a portable information processing unit (terminal, IC card and the like) will be described.

Figure 12:
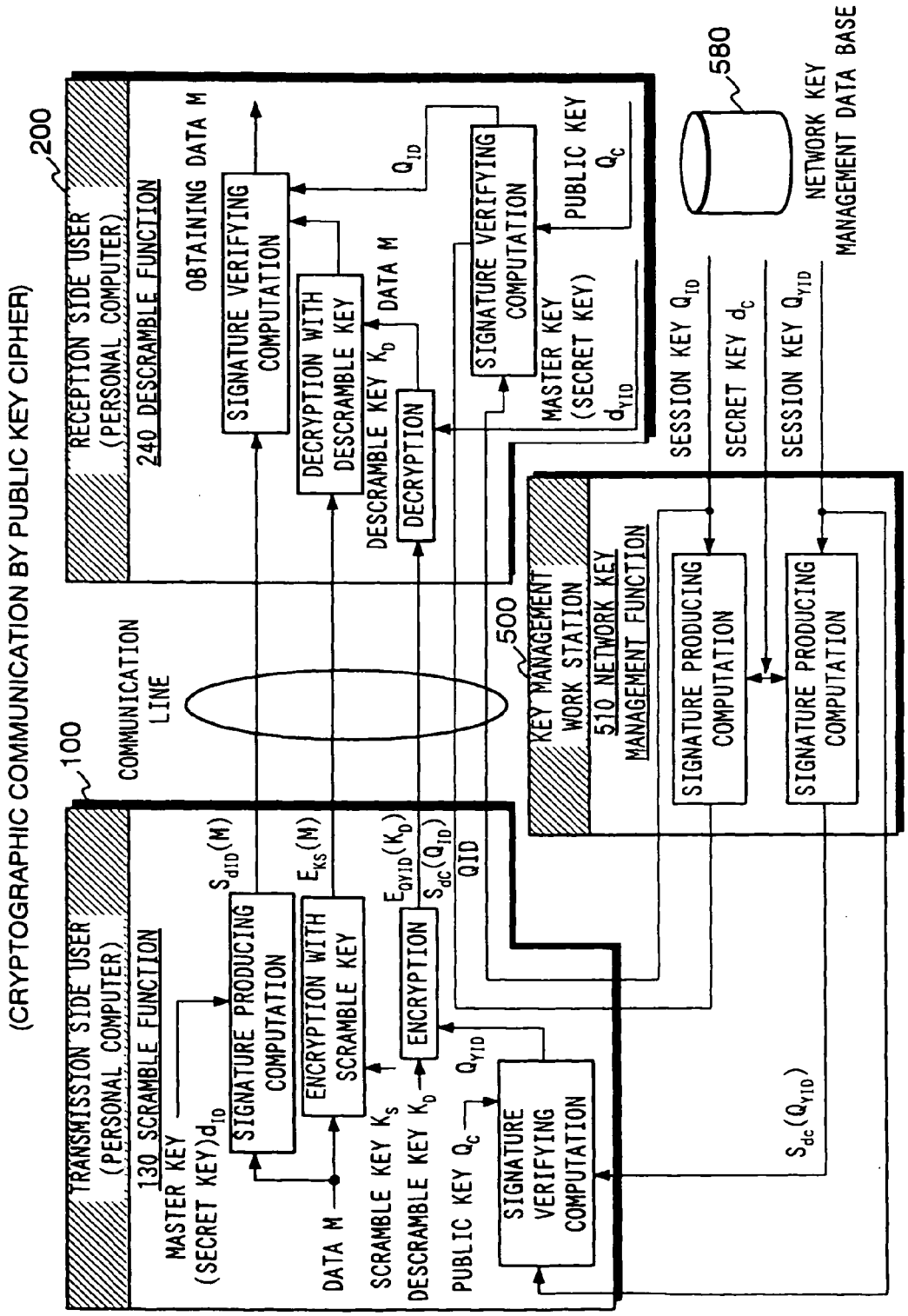
FIG. 12 is a data flow chart showing encryption algorithm conversion by public key cipher to which the present invention is applied.

If cryptographic communication is carried out in an cryptographic communication system operated by the public key encryption algorithm shown in FIG. 12, a transmission side user makes a "session key issue request" to the key management work station 500 as shown in FIG. 2 and receives a public key $Q_{YID}$ of a reception side user, signature data $S_{dc}(Q_{YID})$ of the public key $_{YID}$, its own public key $Q_{ID}$ and signature data $S_{dc}(Q_{ID})$ of that public key $Q_{ID}$ from the key management work station 500.

Figure 16:
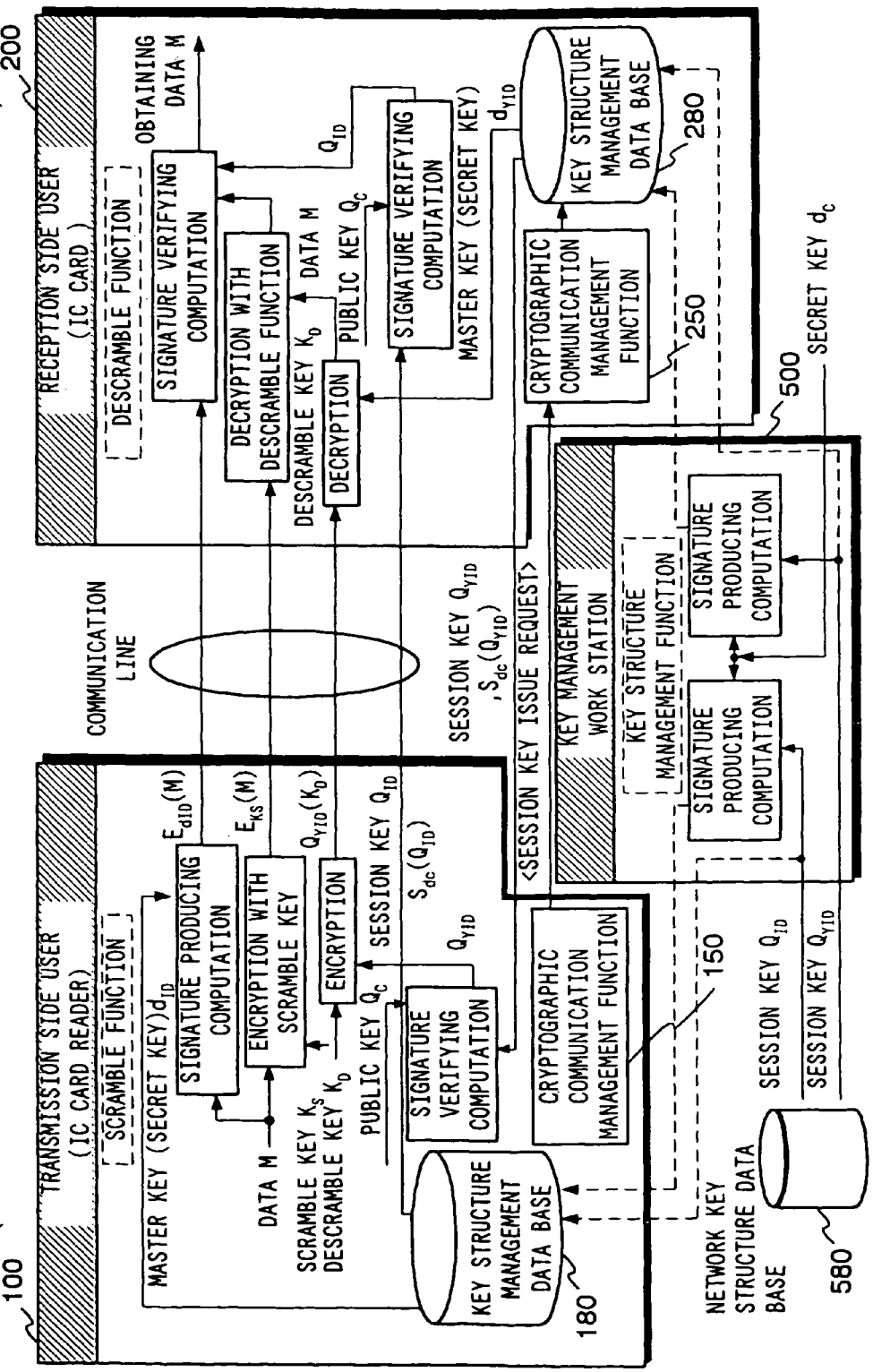
FIG. 16 is a data flow chart showing cryptographic communication system by public key cipher algorithm to which the/present invention is applied.

Here, each user stores its own public key $Q_{ID}$ and signature data $S_{dc}(Q_{ID})$ in the key structure control data base 180, 280. FIG. 16 shows cryptographic communication system operated by the public key encryption algorithm (FIG. 25 shows the functional blocks of this method). Each user receives its own public key $Q_{ID}$ and signature data $S_{dc}(Q_{ID})$ of that public key $Q_{ID}$ from the key management work station 500 through a route indicated by dotted line of FIG. 16 and possesses it in the key structure control data base of each user. In this case, the "session key issue request" for executing cryptographic communication may be made to a reception side user, but not to the key management work station 500.

That is, the "session key issue request" is sent to the reception side user and then, a public key $Q_{YID}$ of that reception side user and signature data $S_{dc}(Q_{YID})$ of this public key are received from the reception side user.

In the method shown in FIG. 16, it can be considered that the secret key $d_{ID}$ as a master key to be allocated to each user is generated by the key management work station 500 or each user.

1: Method in which the secret key is generated by the key management work station 500

If the secret key $d_{ID}$ as a master key and a corresponding public key $Q_{ID}$ are generated by the key management work station 500, user not accustomed to operation of the encryption algorithm feels very convenient.

However, how the generated secret key is distributed to each user is a problem.

In this embodiment, it is stored in such an electronic medium as an IC card and floppy disk and distributed to each user.

As a result, it is made possible for the key management work station 500 to hold the generated secret key dID and for the key management work station 500 to decrypt data encrypted with the public key $Q_{ID}$ corresponding to the user. Because the key management work station 500 prevents grasping of user's information, according to this embodiment, the generated secret key $d_{ID}$ is provided with a key recovery function and stored in the network key structure data base 580 with a correspondence to user ID, thereby disabling user to decrypt a cipher text generated by user except when an unexpected event occurs.

Hereinafter, the key recovery function of this embodiment will be described by taking cryptographic communication in which the key has duplex hierarchical structure as an example. The key recovery function adds information about decryption to an encrypted statement $E_{KS}(M)$ and is capable of decrypting the encrypted statement without the descramble key $K_D$.

First, the key recovery function in cryptographic communication based on common key encryption algorithm will be described. That is, data to be transmitted by the user is assumed to be M. The data is encrypted with the scramble key KS generated by the portable information processing unit so as to generate the encrypted statement $E_{KS}(M)$. The descramble key $K_D$ for decrypting this encrypted statement is encrypted with the session key $P_T$ transmitted from the key management work station 500, so as to generate an encrypted statement $E_{PT}(K_D)$.

Figure 23:
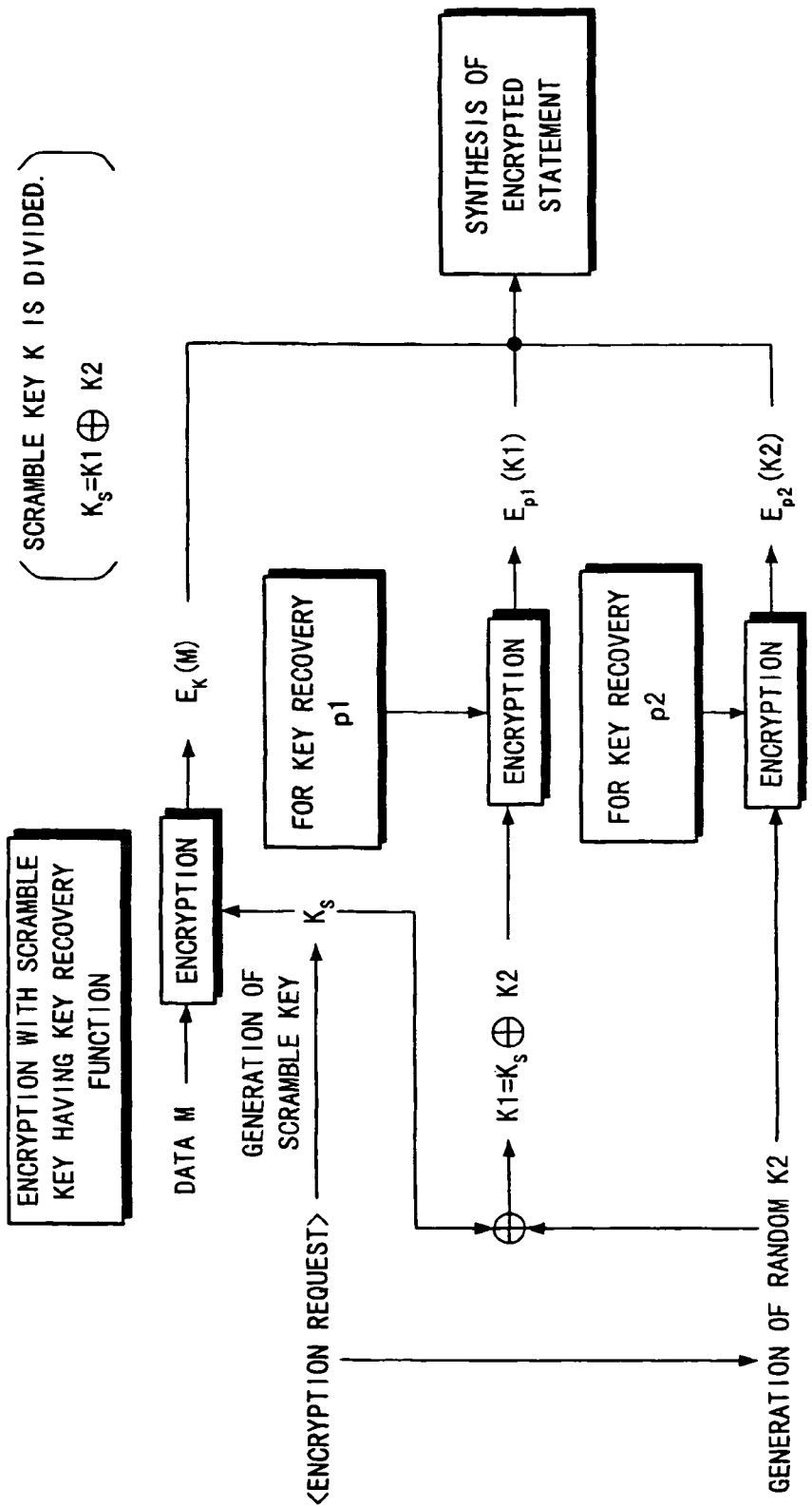
FIG. 23 is an explanatory diagram showing an operation of encryption of key recovery function to which the present invention is applied.

First, a procedure for producing additional data for providing with the key recovery function when data is encrypted with the scramble key $K_S$ will be described with reference to FIG. 23.

(1) A random number is generated when the scramble key $K_s$ is generated and the scramble key is expressed as $K_s$=K1 XOR K2 by exclusive OR between K1 and K2 (XOR is indicated by direct sum symbol in the Figure).

(2) P1, P2 are used as a key for key recovery and stored with the key recovery function of the portable information processing unit and key management work station 500. K1, K2 generated for generating the scramble keys $K_s$ are encrypted with the keys P1, P2 for key recovery so as to produce encrypted statements $E_{p1}$(K1), $E_{p2}$(K2). This data is added to the encrypted statement $E_{KS}$ (M) of data produced with the scramble key $K_s$.

Figure 24:
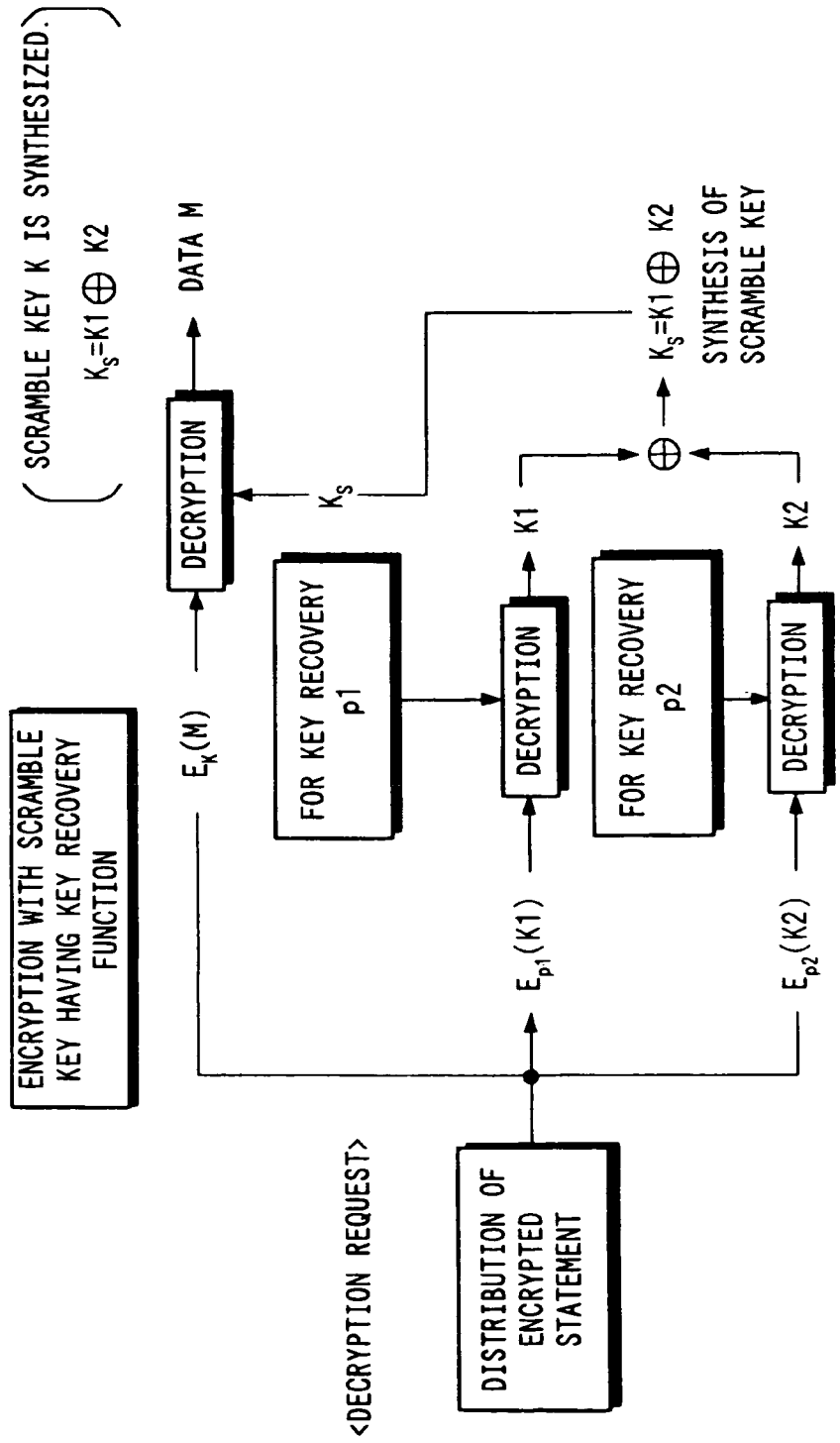
FIG. 24 is an explanatory diagram showing an operation of decryption of key recovery function to which the present invention is applied.

Next, a procedure for decrypting the encrypted statement with this additional data will be described with reference to FIG. 24.

(1) Data $E_{p1}$ (K1), $E_{p2}$(K2) added from the encrypted statement are separated from each other and then K1, K2 are decrypted with the keys P1, P2 for key recovery.

(2) An exclusive OR between K1 and K2 is obtained and with $K_s$=K1 XOR K2, the scramble key Ks is generated. In case of common key cipher, the scramble key $K_s$ and descramble key $K_D$ are the same. The encrypted statement can be decrypted with this scramble key $K_s$.

If a necessity of decrypting the encrypted statement occurs because an unexpected event is generated, the encrypted statement is transmitted to the key management work station 500. Consequently, the encrypted statement can be decrypted with the keys P1, P2 for key recovery in the aforementioned procedure.

Next, the key recovery function in the cryptographic communication based on the public key encryption algorithm will be described. It is assumed that the scramble keys for use in encryption of the data M are $K_s$ and the descramble keys are $K_D$ and the public key as a session key for distributing the descramble key is QYID. Cryptographic communication is carried out by transmission of the encrypted statement $E_{KS}$ (M) and encrypted descramble key $E_{QYID}$ ($K_D$).

Here, a case where elliptical curve cipher is used as a public key cipher will be described. The elliptical curve cipher has been described in for example, "Quick Encryption Method Using Elliptical Curve" by Kazuo Takaragi and Hiroyuki Kurumatani, Technical Report of IEICE ISEC97-15(1997-07).

First, key recovery function in which a threshold value logic is added to encrypted descramble key $E_{QYID}(K_D)$ will be described.

(1) In the key recovery function of the key management work station 500, the public keys for key recovery $Q_A$, $Q_b$, $Q_c$ are allocated and publicized and secret keys $d_A$, $d_B$, $d_c$ ($Q_A$=$d_A$·P, $Q_B$=$d_B$·P, $Q_C$=$d_C$·P) corresponding to the public keys are stored.

A threshold value logic computed by the keys $Q_{YID}$, $Q_A$, $Q_B$, $Q_C$ is added to the encrypted descramble key $E_{QYID}(K_D)$.

(2) Like the case where the common key cipher is used, upon cryptographic communication, data cannot be encrypted with the scramble key $K_s$ until the descramble key $K_D$ is encrypted. The encrypted statement $E_{KS}(M)$ of data and the encrypted descramble key $E_{QYID}(K_D)$ are always generated in pair.

(3) If a necessity of decrypting an encrypted statement occurs because an unexpected event is generated, the encrypted statements $E_{KS}(M)$ and $E_{QYID}(K_D)$ of a pair are transmitted to the key management work station 500.

The key recovery function decrypts with two of the secret keys $d_A$, $d_B$, $d_C$ and the threshold value logic added to the $E_{QYID}(K_D)$ to obtain the descramble key $K_D$.

Next, the encrypted statement $E_{KS}(M)$ is decrypted with this key $K_D$ so as to obtain data M.

An encrypted statement of data M to be transmitted is created by encryption computation with the scramble key $K_s$. Thus, like the key recovery function using the common key cipher (see FIG. 23 for encryption and FIG. 24 for decryption), it is permissible to express the scramble key $K_S$ by exclusive OR between K1 and K2 and carry out key recovery using them. Although the keys P1, P2 for key recovery shown in FIGS. 23, 24 can be operated with the common key encryption algorithm, they can be also operated for key recovery with the public keys $Q_A$, $Q_B$.

In this case, data to be added to the encrypted statement $E_{KS}$ (M) for key recovery are encrypted statements $E_{QA}$(K1), $E_{QB}$(K2) obtained by encrypting K1, K2 with public keys $Q_A$, $Q_B$. The key recovery is carried out by decrypting the added data using the secret keys $d_A$, $d_B$ corresponding to the public keys $Q_A$, $Q_B$ in the key recovery function of the key management work station 500.

2: Method for generation by each user

A user accustomed to operation of the encryption algorithm is capable of generating the secret key $d_{ID}$ as a master key for use by himself or herself and corresponding public key $Q_{ID}$.

In this case, because the secret key $d_{ID}$ as a master key to be possessed by user is possessed only by the user, there is no possibility that an encrypted statement produced by the public key $Q_{ID}$ may be decrypted at the key management work station 500.

The user transmits the public key $Q_{ID}$ generated corresponding to the secret key dID to the key management work station 500.

The key management work station 500 recognizes an identity of a user transmitting the public key $Q_{ID}$, carries out signature producing computation on the transmitted public key $Q_{ID}$ with the secret key $d_c$ possessed by the key management work station 500 and transmits the signature data $S_{dc}$ ($Q_{ID}$) to that user.

According to this embodiment, like the case indicated by 1:, the secret key $d_{ID}$ as a master key possessed by user is provided with key recovery function and stored in the network key structure data base 580 with a correspondence to user ID.

Which the secret key dID as a master key possessed by each user and a corresponding public key $Q_{ID}$ are to be generated by the key management work station 500 or user is selected depending on user condition.

If the above method is applied, cryptographic communication can be achieved between the IC card (as a reception side user) and a reader (as a transmission side user) which is an information processing unit installed on a retailer counter or the like not through the key management work station 500, with the IC card inserted in the reader.

If the encryption algorithms are different between the IC card and reader which is the information processing unit, when user inserts the IC card into the reader, cryptographic communication or payment cannot be achieved until the encryption algorithm of the both are made equal.

In this case, a necessity of converting the encryption algorithm occurs. If this encryption algorithm conversion is possible in the condition that the IC card is inserted in the reader which is the information processing unit installed on a retailer counter, user's procedure is simplified, thereby ensuring a lot of convenience.

Figure 17:
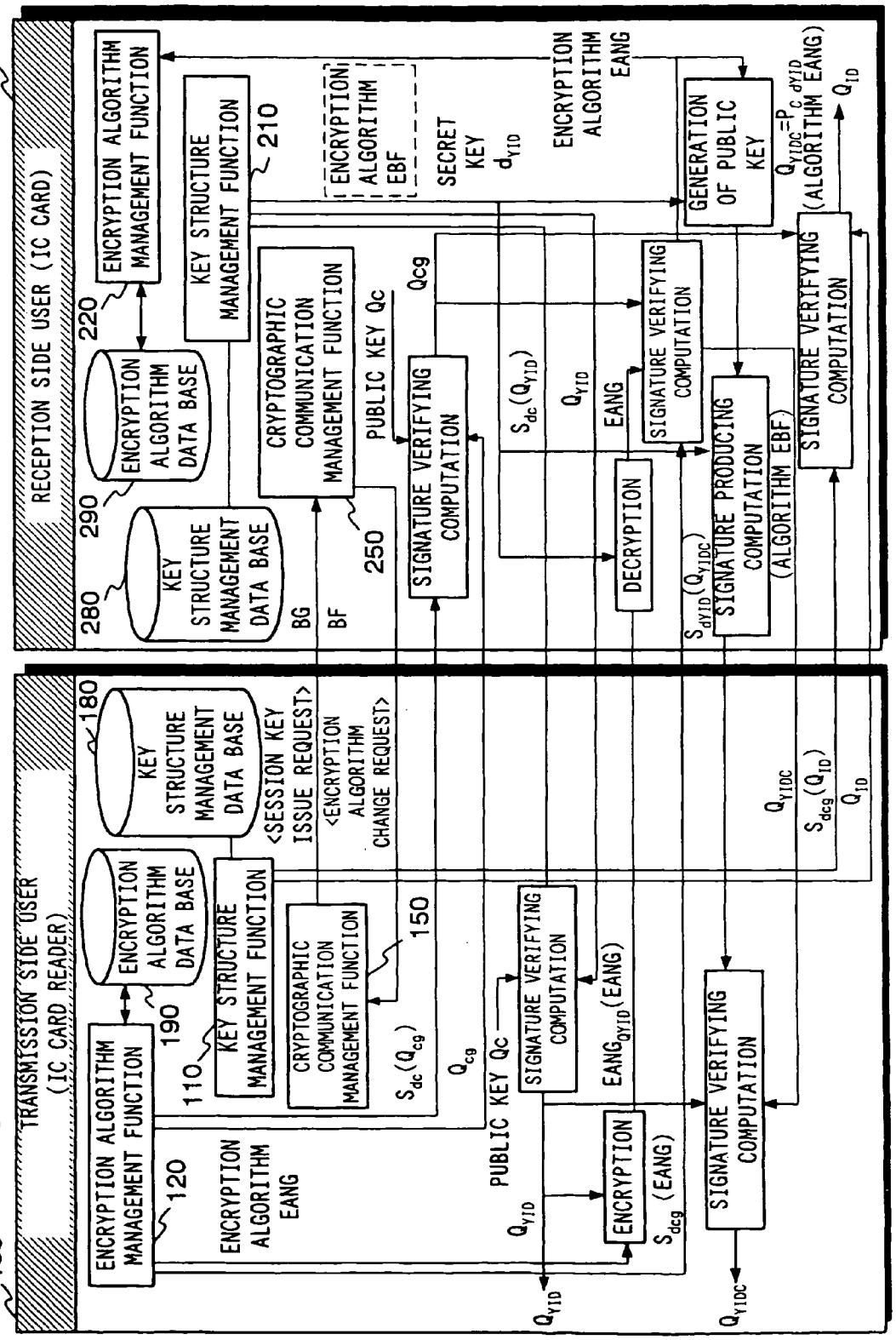
FIG. 17 is a data flow chart showing encryption algorithm conversion by a portable information processing apparatus to which the present invention is applied.
Figure 18:
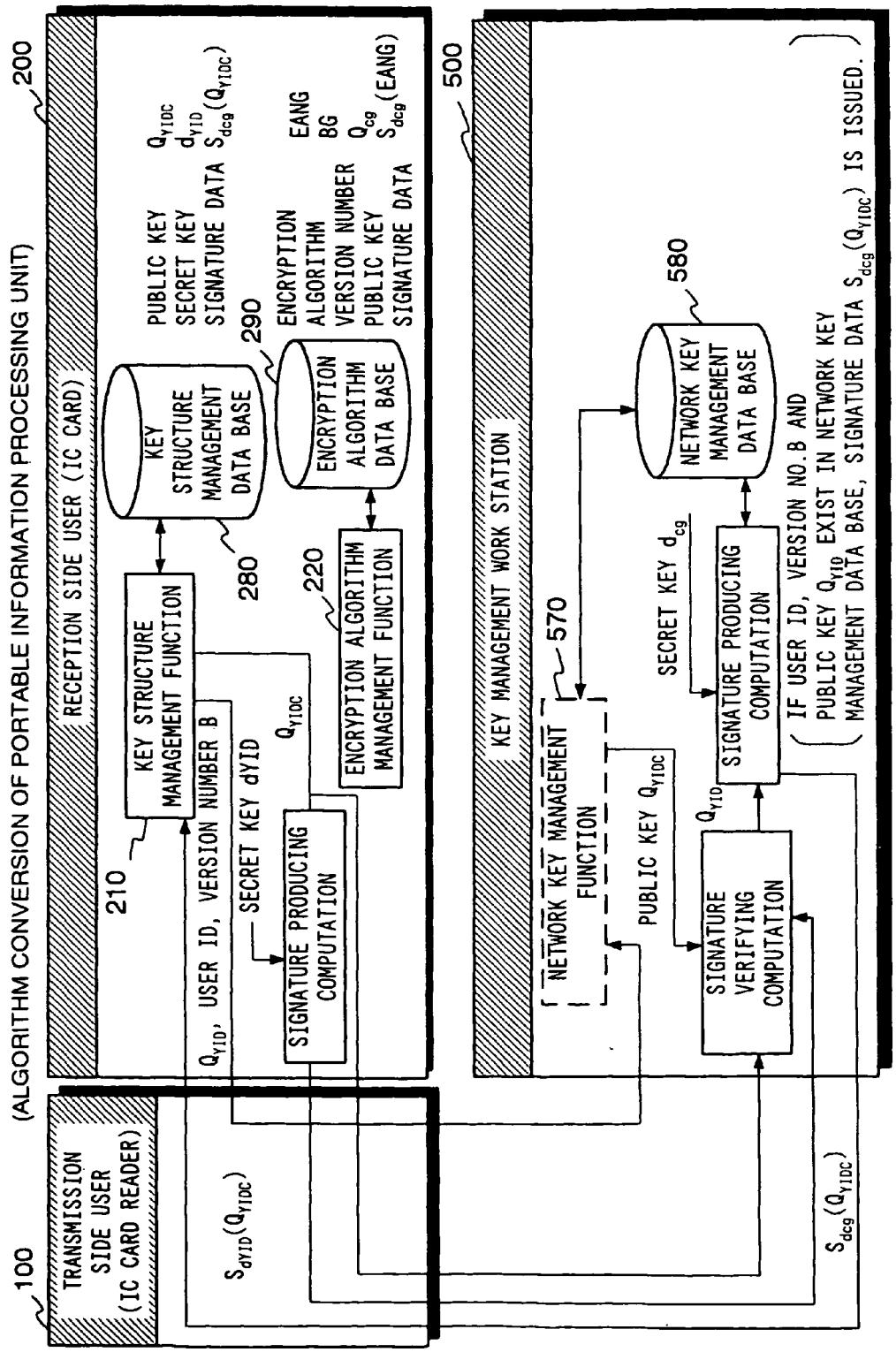
FIG. 18 is a data flow chart showing other embodiment of encryption algorithm conversion by a portable information processing apparatus to which the present invention is applied.

Such encryption algorithm conversion will be described with reference to FIGS. 17 and 18.

In case of elliptical curve cipher, the encryption algorithm is determined by coefficients a and b of the elliptical curve $Y^2=X^3+ax+b$, characteristic p of coefficient, base point P and its order n. This encryption algorithm may be kept secret or public.

The public key Q and secret key d of an elliptical curve cipher are expressed as Q=d·P ( · is computation on an elliptical curve) by the base point P.

Even if the coefficients a and b of the elliptical curve $y^2=X^3+ax+b$ are equal, it is possible to provide different encryption algorithms having the same encryption intensity by changing the base point P. If the coefficients a, b and characteristic p of the coefficient are changed, the elliptical curve is changed, so that a different encryption algorithm is settled.

If the elliptical curve is generated so as to have almost equal key length before and after the coefficients a, b and characteristic p of the coefficient are changed, a plurality of almost the same encryption algorithms having different encryption intensity can be provided.

In case where the coefficients a, b and characteristic p of the coefficient are changed, the encryption intensity or key length can be changed depending on a generation method of the elliptical curve.

Hereinafter, a case assuming that the encryption algorithm used by the IC card is EBF and the encryption algorithm used by a reader as an information processing unit is EANG and the key length of the EANG is longer than that of the EBF will be described about other example of the encryption algorithm conversion.

Figure 21:
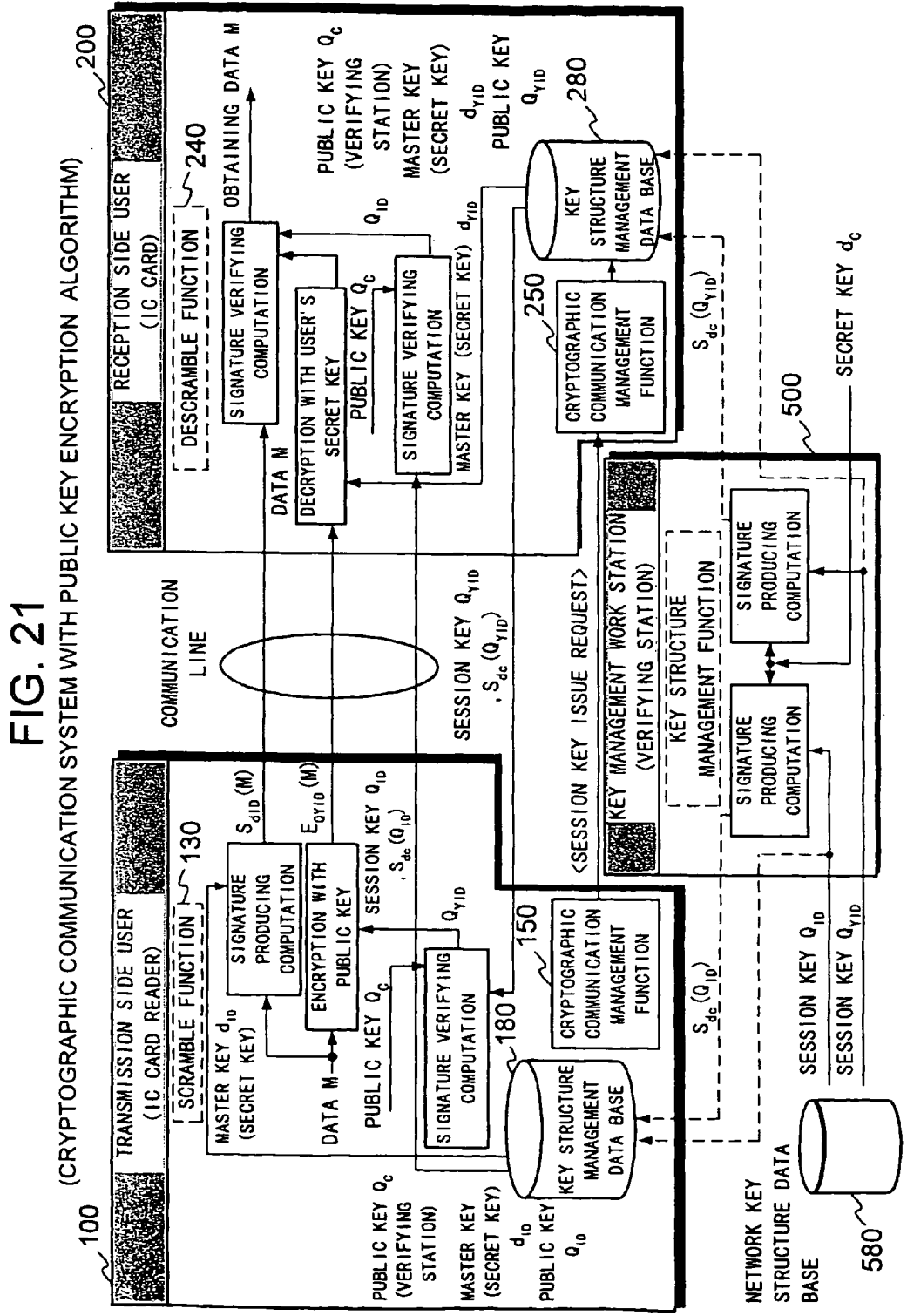
FIG. 21 is a block diagram showing cryptographic communication system by public key cipher algorithm to which the present invention is applied.

Here, cryptographic communication system to which the encryption algorithm conversion is applied will be described with reference to FIG. 21. This cryptographic communication system employs a hierarchical structure having a simplex cipher key. That is, this system does not employ the scramble key and descramble key of the cryptographic communication system shown in FIG. 16.

First of all, data base about the key and encryption algorithm possessed by the transmission side user, reception side user and network management work station will be described with reference to the software function of the network communication system shown in FIG. 3. In this embodiment, the transmission side user corresponds to a reader as the information processing unit and the reception side user corresponds to a portable information processing unit such as an IC card.

Figure 19:
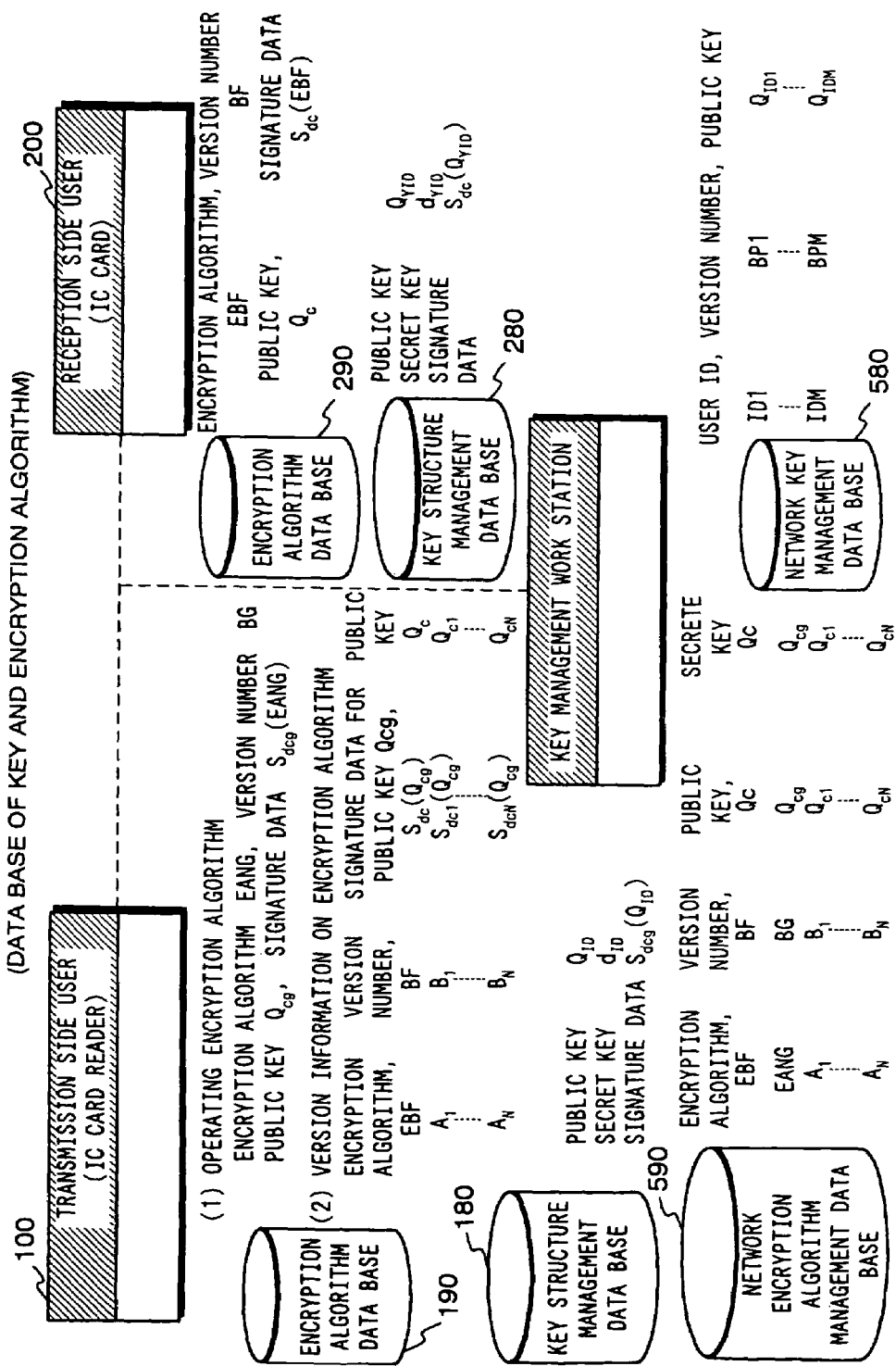
FIG. 19 is an explanatory diagram showing a data base relating to encryption key and encryption algorithm to which the present invention is applied.

With reference to FIG. 19, examples of information to be stored in the data base about the key and encryption algorithm will be described.

(1) Data base of the key management work station 500

1: Network encryption algorithm management data base 590

The data base stores encryption algorithms A[1], A[2], . . . A[N] of all the elliptical curves for use by this network communication system, version numbers B[1], B[2], . . . B[N] corresponding to the encryption algorithms, secret keys $d_c$[1], $d_c$[2], . . . $d_c$[N] as a master key for use by the key management work station 500 corresponding to the encryption algorithms, and public keys $Q_c$[1], $Q_c$[2], $Q_c$[N] corresponding to the secret keys.

In the encryption algorithm EBF of this embodiment, the version number BF, the secret key $d_c$ as the master key and the public key $Q_c$ corresponding to this secret key are stored corresponding to the encryption algorithm EBF. Likewise, in the encryption algorithm EANG of this embodiment, the version number BG, the secret key $d_{cg}$ as the master key and the public key $Q_{cg}$ corresponding to this secret key are stored corresponding to the encryption algorithm EANG.

2: Network key management data base 580

The network key management data base 580 stores user ID of user of an IC card or a reader which is an information processing unit, ID[1], ID[2], . . . ID[M], version numbers of the encryption algorithm for use by this user, BP [1], BP[2], –BP[M], and the public keys for use by the user with this encryption algorithm, $Q_{ID}[1]$, $Q_{ID}[2]$, . . . $Q_{ID}[M]$ corresponding to the user ID.

The secret keys $d_{ID}[1]$, $d_{ID}[2]$, . . . $d_{ID}[M]$ as the master key for use by each user corresponding to the encryption algorithm are supplied with the key recovery function and stored corresponding to each user ID.

(2) Data base of the transmission side user 100 (reader which is an information processing unit)

1: encryption algorithm data base 190

(i) As information of the encryption algorithm operated by the user, the encryption algorithm data base 190 stores encryption algorithm EANG, version number BG, public key $Q_{cg}$ for use by the key management work station 500 under this encryption algorithm and signature data $S_{dcg}$ (EANG) of the key management work station 500 corresponding to the encryption algorithm EANG.

Here, the signature data $S_{dcg}$(EANG) is obtained by carrying out signature producing computation on the encryption algorithm EANG with the secret key dcg as the master key for use by the key management work station 500 under the encryption algorithm EANG.

(ii) As information about the encryption algorithm operated by the network communication system, the encryption algorithms A[1], A[2], . . . A[N], corresponding version numbers B[1], B[2], . . . B[N], the public keys for use by the key management work station 500, $Q_C[1]$, $Q_C[2]$, . . . $Q_C[N]$, and signature data of the key management work station corresponding to the public key $Q_{cg}$, $S_{dc}[1] (Q_{cg})$, $S_{dc}[2](Q_{cg})$, . . . $S_{dc}[N] (Q_{cg})$ are stored corresponding to the encryption algorithms.

Here, the signature data $S_{dc}[i](Q_{cg})$ is obtained by carrying out signature producing computation on the public key $Q_{cg}$ with the secret key $d_c[i]$ as the master key for use by the key management work station 500 under the encryption algorithm A[i].

Specifically in the encryption algorithm EBF of this embodiment, the version number BF, public key $Q_c$ and signature data $S_{dc} (Q_{cg})$ are stored corresponding to the encryption algorithm EBF.

Here, the signature data $S_{dc}(Q_{cg})$ is obtained by carrying out signature producing computation on the public key Qcg with the secret key dc as the master key for use by the key management work station 500 under the encryption algorithm EBF.

2: Key structure management data base 180

The key structure management data base 180 stores the encryption algorithm to be operated by user, namely in this embodiment, the secret key $d_{ID}$ as the master key for use by the user under the encryption algorithm EANG, public key $Q_{ID}$ corresponding to this secret key and signature data $S_{dcg}(Q_{ID})$ obtained by carrying out signature producing computation on the public key $Q_{ID}$ with the secret key $d_{cg}$ as the master key for use by the key management work station 500 under the encryption algorithm EANG.

(3) Reception side user (IC card) 200 data base 1: encryption algorithm data base 290

As information about the encryption algorithm operated by the user, the encryption algorithm EBF, version number BF, public key $Q_c$ for use by the key management work station 500 under this encryption algorithm and signature data $S_{dc}$(EBF) of the key management work station 500 relative to the encryption algorithm EBF are stored.

Here, the signature data $S_{dc}$(EBF) is obtained by carrying out signature producing computation on the encryption algorithm EBF with the secret key $d_c$ as the master key for use by the key management work station 500 under the encryption algorithm EBF.

2: Key structure management data base 280

The key structure management data base 280 stores the encryption algorithm to be operated by user, namely in this embodiment, the secret key $d_{YID}$ as the master key for use by the user under the encryption algorithm EBF, public key QYID corresponding to this secret key and signature data $S_{dc}(Q_{YID})$ obtained by carrying out signature producing computation on the public key $Q_{YID}$ with the secret key dc as the master key for use by the key management work station 500 under the encryption algorithm EBF.

Above, the data base about the key and encryption algorithm which are a presumption for the encryption algorithm conversion has been described.

A public key for use by the key management work station 500, signature data produced with the secret key as a master key for use by the key management work station 500, an encryption algorithm and a version number corresponding thereto are stored in the transmission side user and reception side user data bases.

These data are distributed by the key management work station 500.

Next, an example of encryption algorithm conversion to be carried out between a transmission side user (reader which is an information processing unit) and a reception side user (IC card) will be described with reference to FIGS. 17 and 18.

Although for encryption algorithm conversion, the elliptical curve encryption algorithm may be sent in open state, according to this embodiment, it is sent in encryption state.

Here, assuming that as described previously, the key length of the EANG is longer than that of the EBF, a case where the encryption algorithm EBF of an IC card is converted to the encryption algorithm EANG will be described.

1: User possessing an IC card purchases at a shop or the like and inserts the IC card into a reader as the information processing unit to pay for purchased goods.

The cryptographic communication control function of the reader as the information processing unit adds a version number BG to the operating encryption algorithm EANG and sends a "session key issue request" to cryptographic communication control function 250 of the IC card.

2: If the version number of the encryption algorithm operated by the IC card agrees with the BG, the IC card issues the public key possessed by himself and the signature data of the public key and carries out cryptographic communication with the reader as the information processing unit according to a procedure shown in FIG. 21.

However, the version number of the encryption algorithm EBF operated by the IC card is BF, which is different from the transmitted version number BG.

After recognizing that the version number is different, the cryptographic communication control function 250 adds BF to this version number and sends an "encryption algorithm updating request" to the cryptographic communication control function 150 of a reader which is an information processing unit.

3: Under the version number BF, the reader as the information processing unit retrieves in the encryption algorithm data base 190 and fetches out the public key $Q_{cg}$ of the key management work station 500 operated with the encryption algorithm EANG and signature data $S_{dc}(Q_{cg})$ obtained by carrying out signature producing computation on the public key Qcg with the secret key dc as a master key for use by the key management work station 500 under the encryption algorithm EBF and transmits this public key $Q_{cg}$ and the signature data $S_{dc}(Q_{cg})$ to the IC card.

4: The IC card carries out signature verifying computation on the transmitted public key $Q_{cg}$ and signature data $S_{dc}(Q_{cg})$ using the public key $Q_c$ of the key management work station 500 operated under the encryption algorithm EBF, so as to verify that the public key $Q_{cg}$ has been transmitted from the reader as a proper information processing unit.

5: Next, the IC card carries out signature producing computation on the public key $Q_{YID}$ with the public key QYID of an IC card operated under the encryption algorithm EBF from the key structure management data base 280 and the secret key $d_c$ as a master key for use by the key management work station 500 under the encryption algorithm EBF and fetches out the signature data $S_{dc}(Q_{YID})$ distributed from the management work station 500, and then transmits this public key $Q_{YID}$ and signature data $S_{dc}$(QYID) to the reader as an information processing unit.

6: The reader as the information processing unit carries out signature verifying computation on the received public key $Q_{YID}$ and signature data $S_{dc}(Q_{YID})$ using the public key $Q_c$ of the key management work station 500 operated under the encryption algorithm EBF, so as to verify that the public key $Q_{YID}$ has been transmitted from a proper IC card.

7: The reader as the information processing unit encrypts the encryption algorithm EANG with the public key $Q_{YID}$ by operating the encryption algorithm EBF so as to create the encrypted statement $EBF_{QYID}$ (EANG).

At the same time, signature producing computation is carried out on the encryption algorithm EANG with the secret key $d_{cg}$ as a master key for use by the key management work station 500 under the encryption algorithm EANG. Then, the signature data $S_{dcg}$(EANG) distributed from the management work station 500 is fetched out and the encrypted statement $EBF_{QYID}$(EANG) and signature data $S_{dcg}$(EANG) are transmitted to the IC card.

8: The IC card decrypts the transmitted encrypted statement $EBF_{QYID}$ (EANG) using the secret key $d_{YID}$ possessed by the IC card operated under the encryption algorithm EBF so as to obtain the encryption algorithm EANG.

Next, the IC card converts the operating encryption algorithm from EBF to the obtained EANG, and carries out signature verifying computation on the obtained encryption algorithm EANG and received signature data $S_{dcg}$(EANG) using the public key $Q_{cg}$ of the key management station 500 obtained in 4: so as to verify that this is an encryption algorithm distributed from a reader as a proper information processing unit. As a result, updating of the encryption algorithm to this EANG is completed.

9: Because the key length of the encryption algorithm EANG is longer than the encryption algorithm EBF, the secret key $d_{YID}$ as the master key of the IC card is used as a secret key of the encryption algorithm EANG as it is and a corresponding public key $Q_{YIDC}$ (=P·$d_{YID}$; is computation on an elliptical curve) is generated from the base point P of the received encryption algorithm EANG.

The IC card returns the encryption algorithm to EBF temporarily and carries out signature producing computation on the public key $Q_{YIDC}$ using the secret key $d_{YID}$ under the encryption algorithm EBF so as to produce signature data $S_{dYID}$ ($Q_{YIDC}$).

The IC card transmits the generated public key $Q_{YIDC}$ and signature data $S_{dYID}$ ($Q_{YIDC}$) to the reader as an information processing unit.

10: The reader as the information processing unit converts the encryption algorithm to EBF temporarily and carries out signature verifying computation on the received signature data $S_{dYID}$($Q_{YIDC}$) and public key $Q_{YIDC}$ using the public key $Q_{YID}$ obtained in 6:, so as to verify that it is a public key QYIDC of an IC card distributed from a proper IC card.

After that, the encryption algorithm is converted to the encryption algorithm EANG again.

11: The reader as the information processing unit carries out signature producing computation on the public key $Q_{ID}$ with the public key $Q_{ID}$ for use by the reader as the information processing unit operated under the encryption algorithm EANG sent from the key structure management data base 180 and the secret key $d_{cg}$ as a master key for use by the key management work station 500 under the encryption algorithm EANG. Then, the signature data $S_{dcg}(Q_{ID})$ distributed from the management work station 500 is fetched out and this public key $Q_{ID}$ and the signature data $S_{dcg}(Q_{ID})$ are transmitted to the IC card.

12: The IC card carries out signature verifying computation on the received signature data $S_{dcg}(Q_{ID})$ and public key $Q_{ID}$ using the public key $Q_{cg}$ of the key management work station 500 obtained in 4: under the encryption algorithm EANG, so as to verify that it is a public key $Q_{ID}$ for the reader as an information processing unit, transmitted from the reader as a proper information processing unit.

13: Consequently, the IC card and the reader as the information processing unit share the encryption algorithm EANG and verifies the validities of the public keys (public key $Q_{ID}$ of a reader as the information processing unit and public key QYIDC of the IC card). By carrying out data encryption with this public key, cryptographic communication, signature producing computation and signature verifying computation can be executed between the IC card and the reader as the information processing unit, thereby enabling payment.

The key management work station 500 does not do anything in the above described procedure.

However, because the IC card has no signature data of the key management work station 500 regarding the converted public key QYIDC, it cannot be used just as it is, but after the payment is settled, the encryption algorithm needs to be returned from EANG to EBF.

Next, an example for obtaining signature data of the key management work station by the public key QYIDC converted by the IC card will be described with reference to FIG. 18.

1: The signature data $S_{dYID}$ ($Q_{YIDC}$) produced with the secret key $d_{YID}$ under the encryption algorithm EBF for the public key $Q_{YIDC}$ of an IC card operated by the encryption algorithm EANG whose validity is verified, is transmitted from the IC card to the reader as the information processing unit.

This signature data $S_{dYID}$ ($Q_{YIDC}$), public key $Q_{YIDC}$, public key $Q_{YID}$ of an IC card operated with the encryption algorithm EBF, version number BF of the encryption algorithm EBF, version number BG of the encryption algorithm EANG, and user ID of the IC card are transmitted to the key management work station 500.

2: With the user ID of the IC card as a key, the key management work station 500 retrieves in the network key management data base 580 and verifies that the public key $Q_{YID}$ of a received IC card exists.

Signature verifying computation is carried out on the signature data $S_{dYID}(Q_{YIDC})$ and public key $Q_{YIDC}$ using the public key $Q_{YID}$ of the IC card so as to verify that it is a public key $Q_{YIDC}$ of a proper IC card.

In the above procedure, it is verified that the public key QYIDC is a public key of the IC card.

3: Signature producing computation is carried out on this public key QYIDC using the secret key $d_{cg}$ of the key management work station 500 operated with the encryption algorithm EANG so as to create signature data $S_{dcg}(QYIDC)$ and it is returned to the reader as the information processing unit.

The key management work station 500 updates a version number of the encryption algorithm stored corresponding to the user ID of the IC card in the network key management data base 580 and the public key to BG and QYIDC respectively.

4: The reader as the information processing unit transmits this signature data $S_{dcg}(Q_{YIDC})$ to the IC card.

In the above processing, the IC card is capable of obtaining the signature data $S_{dcg}(Q_{YIDC})$ of the key management work station 500 for the public key QYIDC.

In the above described embodiment, the key management work station 500 verifies an existence of the public key $Q_{YID}$ before the conversion and signature data of the public key $Q_{YIDC}$ after the conversion thereby preventing an access of a false IC card.

The IC card possesses the public key QYIDC operated under the encryption algorithm EANG and signature data $S_{dcg}(Q_{YIDC})$ of the key management work station 500 and is capable of operating the encryption algorithm EANG.

The key management work station only has to carry out signature production and signature verifying computation on a public key generated with respect to the converted encryption algorithm. Thus, with the IC card inserted into the reader as the information processing unit, encryption algorithm conversion can be carried out.

In this encryption algorithm conversion, user (IC card in this case) generates its own secret key and public key for a new encryption algorithm.

In this embodiment, it is specified that the secret keys possessed by the user are the same for the encryption algorithm before the conversion and encryption algorithm after the conversion.

Such a secret key setting method is effective when the key lengths of the encryption algorithms mixing in a system vary and it cannot be specified which key length encryption algorithm the user is using.

It can be considered that conversion of encrypting algorithm is carried out to one which has a longer key which any user does not use.

In this case, if the key length of a secret key used by each user is the same as before the conversion, the key length used by every user is not increased although a key length permitted by the encryption algorithm is extended. In this case, a cipher attacker can attack with a range of the key length to be attacked limited to an original key length. That is, it does not come that substantially the encryption intensity is increased, even if the allowable key length is prolonged.

To avoid this event, a method in which the key length is prolonged as shown in FIG. 15 can be considered effective.

In this case, even if every user increases the key length based on a random number, key management is made easier because the same key length does not exist.

An attention has to be paid to only a user newly participating in the system so that the same key may not exist.

Figure 13:
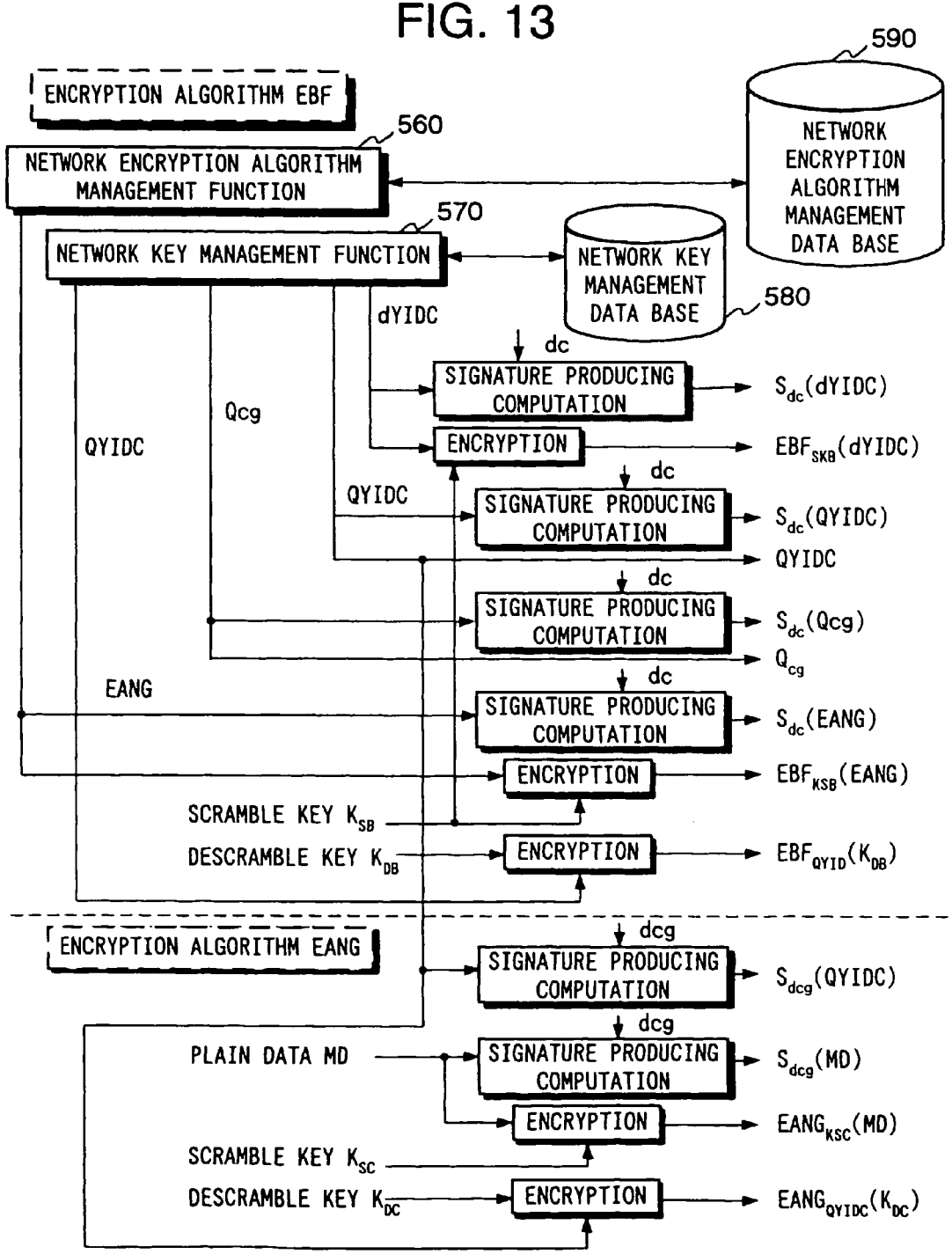
FIG. 13 is a flow chart showing a former half portion of encryption algorithm conversion procedure by public key cipher to which the present invention is applied.
Figure 14:
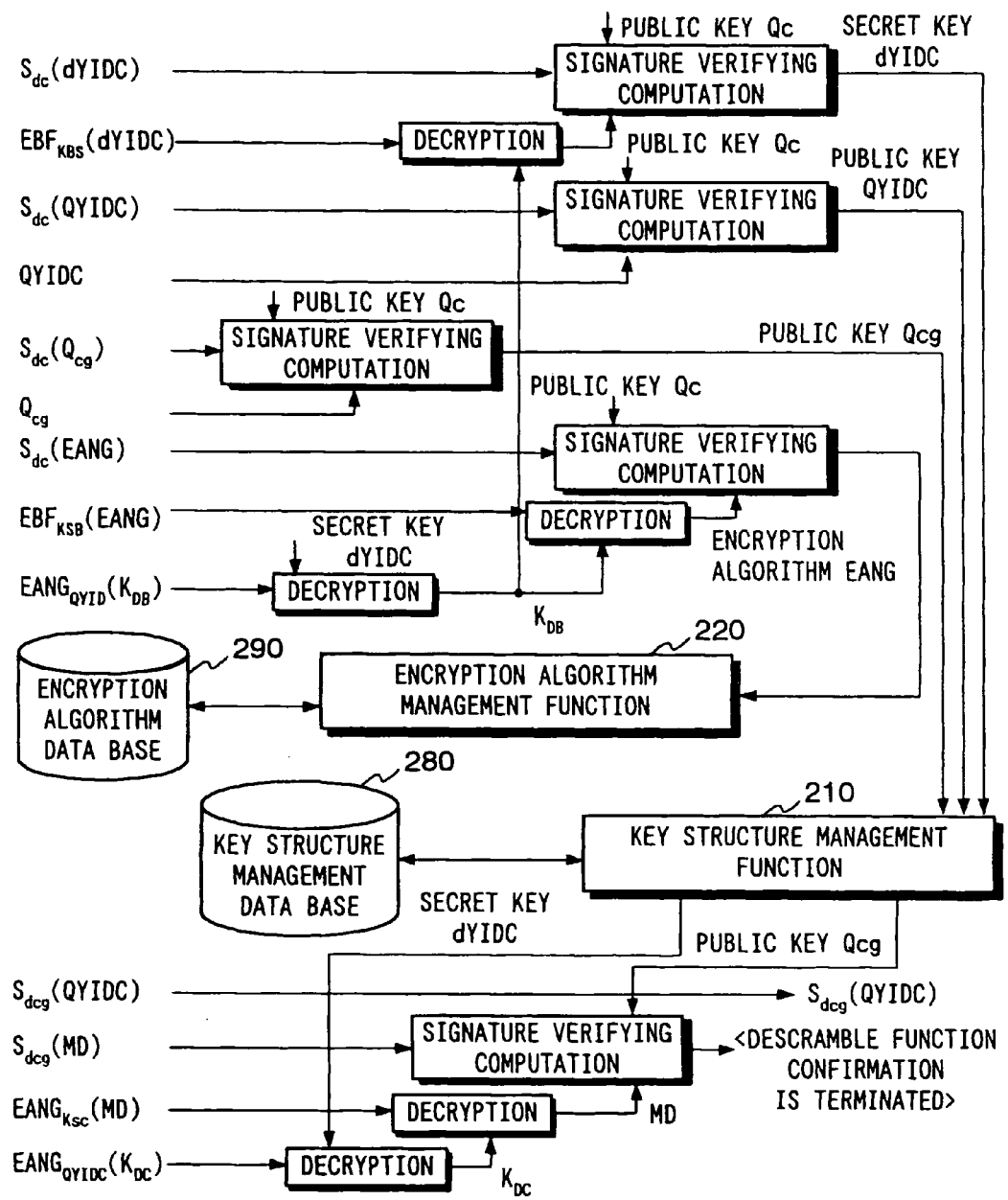
FIG. 14 is a flow chart showing a latter half portion of encryption algorithm conversion procedure by public key cipher to which the present invention is applied.

The method for user to generate his or her own secret key and public key for a new encryption algorithm is applicable to ordinary encryption algorithm conversion described in FIGS. 13, 14 and 11. If user generates his or her own secret key, a possibility that the secret key may be decrypted by the key management work station can be avoided. Hereinafter, an example for generating his or her own secret key with respect to the encryption algorithm conversion will be described with reference to FIG. 20.

Although in the encryption algorithm conversion of this case, it is necessary to verify the scramble function and descramble function, this is the same method as described in FIGS. 13, 14 and 11 and only an encryption algorithm distribution method and a generation method for a secret key to be possessed by user himself will be stated here.

Figure 20:
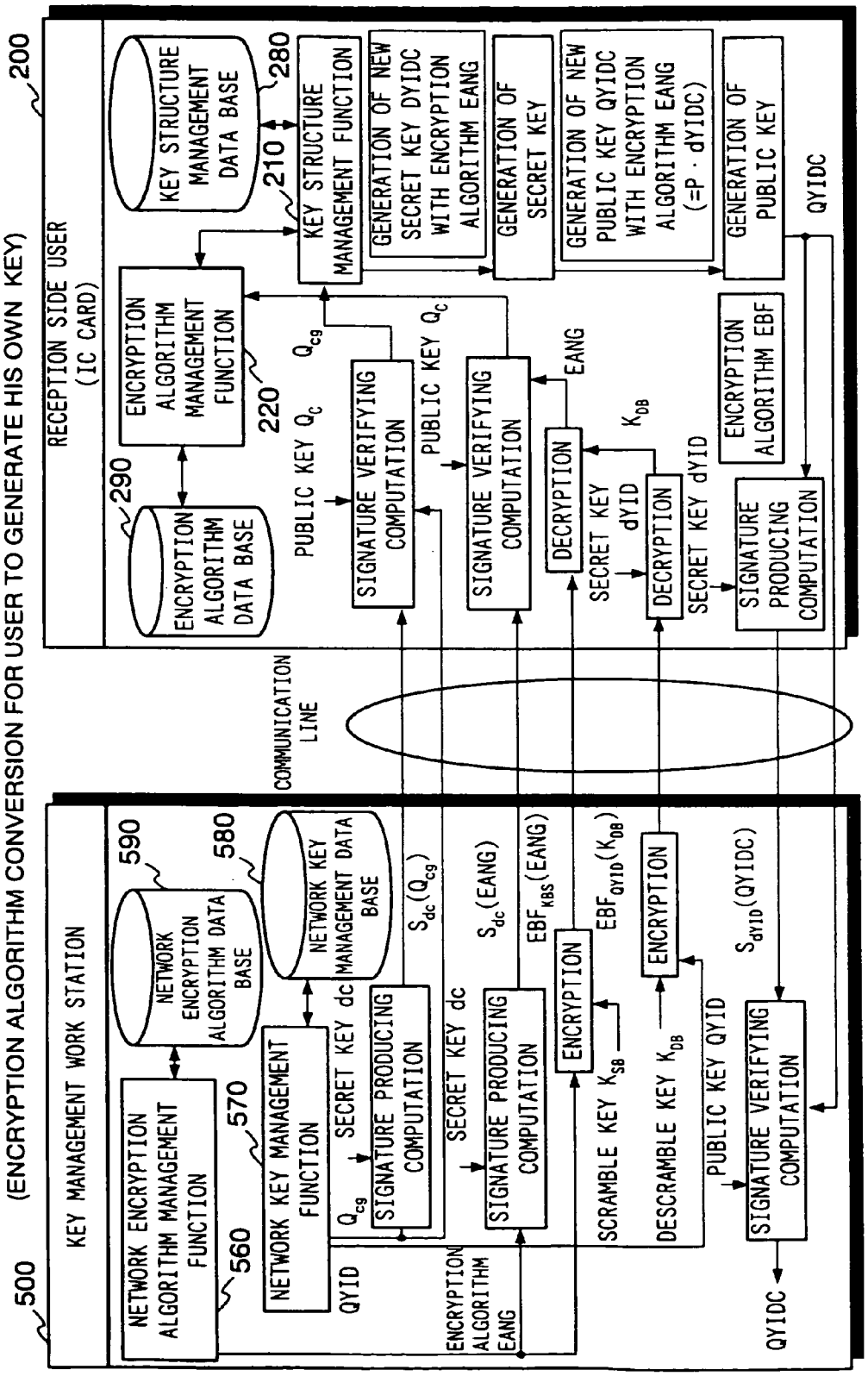
FIG. 20 is a data flow diagram showing a case in which a encryption key is generated by user in encryption algorithm conversion to which the present invention is applied.

An operating condition of the public key encryption method mentioned here employs the cryptographic communication method shown in FIG. 16 and FIG. 20 shows an example of the encryption algorithm conversion in this cryptographic communication method.

In this Figure, it is assumed that the encryption algorithm operated by the reception side user is EBF and the encryption algorithm to be converted is EANG.

As described in FIGS. 13, 14 and 11, it is assumed that a secret key as a master key to be operated by the key management work station relative to the encryption algorithm EBF is dc and a public key corresponding to this secret key is Qc.

Likewise, it is assumed that the secret key as a master key for the key management work station to operate the encryption algorithm EANG is $d_{cg}$ and the public key corresponding to this secret key is $Q_{cg}$.

On the other hand, it is assumed that the secret key as a master key to be operated by the reception side user for the encryption algorithm EBF is $d_{YID}$ and the public key corresponding to this secret key is $Q_{YID}$. The above described presumption is the same as shown in FIGS. 13, 14 and 11 and an embodiment of the encryption algorithm conversion will be described.

(1) The network key management function 570 of the key management work station 500 creates the following encrypted statement and signature data using the encryption algorithm EBF before the conversion.

1: A scramble key $K_{SB}$ for encrypting the encryption algorithm EANG and a descramble key $K_{DB}$ for decrypting are generated with the encryption algorithm EBF before the conversion.

2: The encryption algorithm EANG is encrypted with the scramble key $k_{SB}$ so as to create an encrypted statement $EBF_{KSB}(EANG)$.

Further, the public key $Q_{YID}$ as the master key of the reception side user is fetched out and the descramble key $K_{DB}$ is encrypted so as to create an encrypted statement $EBF_{QYID}(K_{DB})$ 3: Signature producing computation is carried out on the encryption algorithm EANG with the encryption algorithm EBF before the conversion and the secret key $d_c$ which is a master key of the key management work station 500 so as to create signature data $S_{dc}$ (EANG).

4: Signature producing computation is carried out on the encryption algorithm EBF before the conversion and the public key $Q_{cg}$ as a master key of the key management work station 500 which is applied to the encryption algorithm EANG after the conversion with the secret key dc as the master key of the key management work station 500 so as to create signature data $S_{dc}(Q_{cg})$.

5: Two produced encrypted statements $EBF_{QYID}$ ($K_{DB}$), $EBF_{KSB}$(EANG), two signature data $S_{dc}$(EANG), $S_{dc}$ (QCG) and the public key Qcg of the key management work station 500 are transmitted to the IC card (the reception side user) via an IC card reader (not shown in FIG. 20).

(2) Reception side user's obtaining the encryption algorithm

The reception side user operates EBF as an encryption algorithm and possesses the secret key dyID as a master key and a public key Qc of the key management work station 500 operated by the encryption algorithm EBF.

1: An encrypted statement $EBF_{QYID}$ ($K_{DB}$) is decrypted using the secret key $d_{YID}$ as a master key so as to obtain the descramble key $K_{DB}$. Next, the encrypted statement $EBF_{KSB}(E_{ANG})$ is decrypted using this descramble key KDB so as to obtain the encryption algorithm EANG. Signature verifying computation is carried out on the signature data $S_{dc}$ (EANG) and obtained encryption algorithm EANG using the public key $Q_c$ of the key management work station 500 under the encryption algorithm EBF and it is verified whether or not the obtained encryption algorithm EANG has been transmitted from the proper key management work station 500.

2: Under the encryption algorithm EBF, signature verifying computation is carried out on the signature data $S_{dc}$ ($Q_{cg}$) and the public key $Q_{cg}$ to be operated on the received encryption algorithm EANG converted by the key management work station 500 using the public key $Q_c$ of the key management work station 500 so as to verify that the transmitted public key is a public key of a proper key management work station 500.

In the above manner, the reception side user has obtained the encryption algorithm EANG and public key $Q_{cg}$ to be operated on the encryption algorithm EANG of the key management work station 500. Then, the obtained encryption algorithm EANG is registered in the encryption algorithm management data base 290, and the encryption algorithm EANG as well as EBF is made operable by the encryption algorithm management function.

(3) Conversion of the key possessed by the reception side user

1: With respect to the encryption algorithm EANG transmitted from the key management work station 500, the reception side user generates a new secret key $d_{YIDC}$ as a master key which he owns himself.

The following three methods can be mentioned as a method for generating the secret key.

(a) Using the secret key $d_{YIDC}$ operated with the encryption algorithm EBF as a secret key of the encryption algorithm EANG (b) Generating a new secret key $d_{YIDC}$ by adding a random number to the secret key $d_{YID}$ operated with the encryption algorithm EBF as shown in FIG. 15.

(c) Generating a new secret key $d_{YIDC}$ according to information of the encryption algorithm EANG.

The secret key $d_{YIDC}$ to be possessed by the reception side user himself or herself is generated by any of these methods so as to generate the public key QYIDC corresponding to this secret key.

Because the above method (c) has a possibility that the generated secret key may agree with a key of other user as described previously, it is necessary for the key management work station 500 to verify that there is no public key which the other user uses.

In case when an encryption algorithm EANG to be converted is an elliptical curve cipher, with the base point of this algorithm as P, the public key $Q_{YIDC}$ is given as $P \cdot d_{YIDC}$ (is computation on elliptical curve).

2: The reception side user returns the encryption algorithm to EBF temporarily and carries out signature producing computation on the public key $Q_{YIDC}$ using the secret key $d_{YID}$ under this encryption algorithm EBF so as to create signature data $S_{dYID}$((QYIDC). The generated public key $Q_{YIDC}$, signature data $S_{dYID}$ (QYIDC) and the reception side user's ID are transmitted to the key management work station 500 via the IC card reader (not shown in FIG. 20).

3: The key management work station 500 returns the encryption algorithm to EBF and queries the network key management data base 580 with the transmitted user ID as a key so as to fetch out the public key $Q_{YID}$ of a given reception side user. Next, signature verifying computation is carried out on the transmitted public key QYIDC and signature data $S_{dYID}$ ($Q_{YIDC}$) using the public key $Q_{YID}$ of this reception side user so as to verify that this is a public key QYIDC transmitted from a proper reception side user.

Because the key management work station 500 queries the network key management data base 580 and recognizes the public key $Q_{YID}$ of the reception side user, it is possible to prevent a false reception side user from accessing this system.

In the above manner, the key management work station 500 obtains the public key QYIDC operated by the reception side user under the converted encryption algorithm EANG. After that, the key management work station 500 needs a series of procedure related to the encryption algorithm conversion, such as carrying out signature producing computation on the public key QYIDC operated by the reception side user by using the secret key dcg as a master key operated under the encryption algorithm EANG, creating signature data $S_{dcg}(Q_{YIDC})$, sending it to the reception side user, verifying the scramble function and descramble function. These are achieved by carrying out the procedure for the encryption algorithm conversion described in FIGS. 13, 14 and 11.

An example for user to generate his own key himself or herself for a new encryption algorithm has been described. Finally, (1) conversion from a common key encryption algorithm to other public key encryption algorithm and (2) conversion from the public key encryption algorithm to other common key encryption algorithm will be described below.

(1) Conversion from a common key encryption algorithm to other public key encryption algorithm The embodiment of the encryption algorithm conversion from the common key encryption algorithm to other common key encryption algorithm has been described with reference to FIGS. 8, 9 and 6.

In this case, it is assumed that the encryption algorithm before the conversion is EBF and the encryption algorithm after the conversion is EANG.

A case where the encryption algorithm will be converted from the common key encryption algorithm to other public key encryption algorithm will be described assuming that the common key encryption algorithm before the conversion is EBF and the public key encryption algorithm after the conversion is EANG to use the same symbols.

Figure 6:
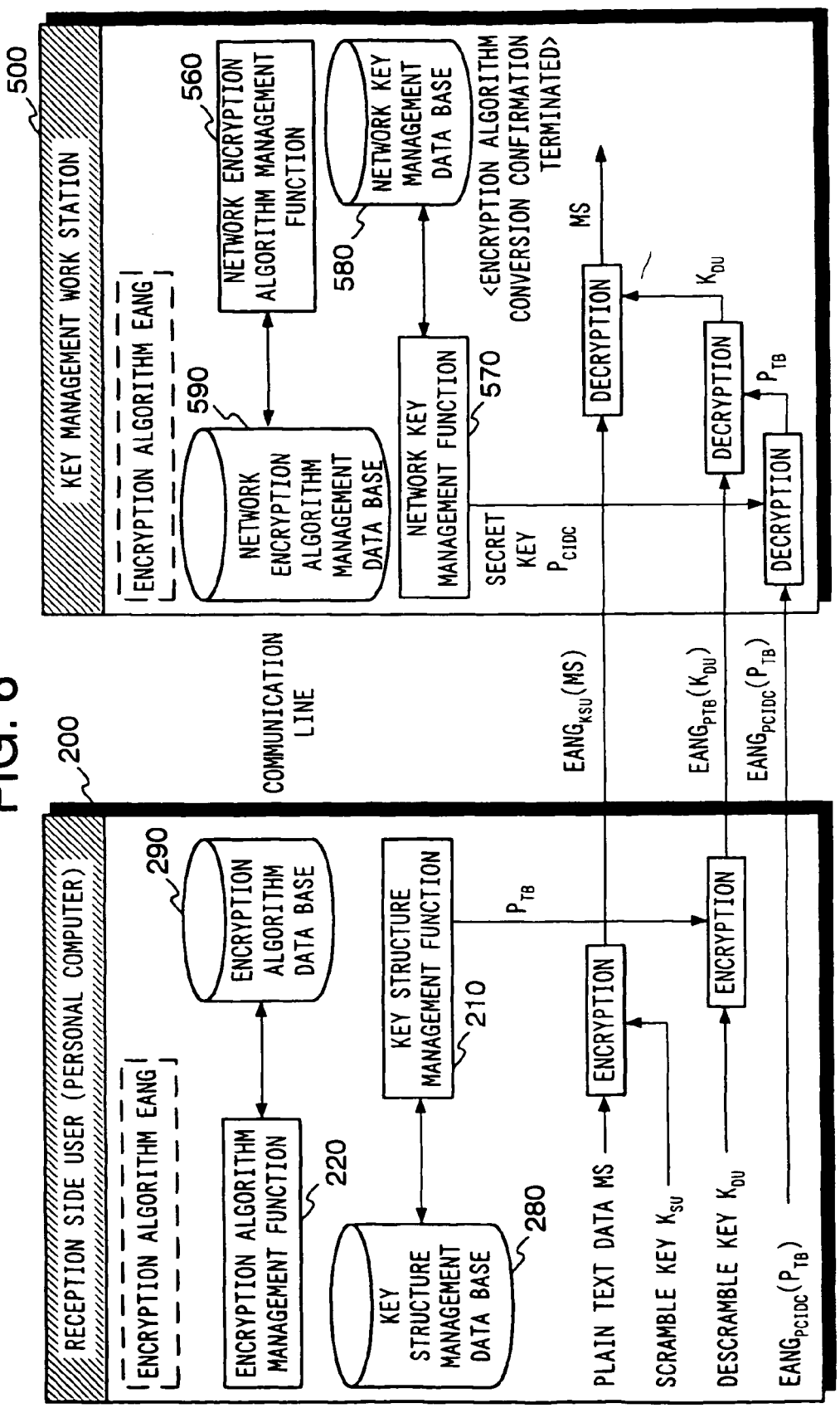
FIG. 6 is a schematic data flow diagram showing encryption algorithm conversion for common key cipher to which the present invention is applied.
Figure 8:
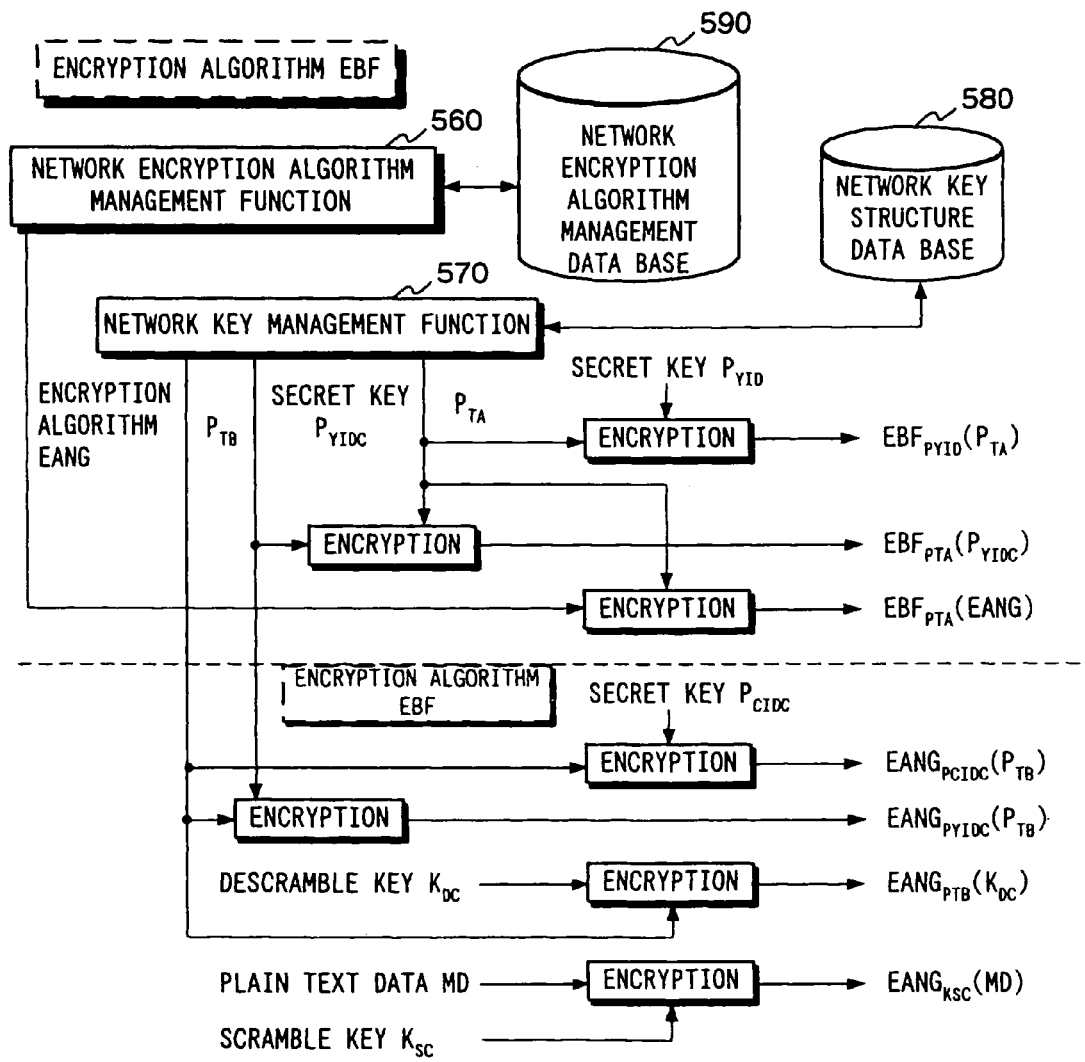
FIG. 8 is a flow chart showing a former half portion of encryption algorithm conversion procedure by common key cipher to which the present invention is applied.
Figure 9:
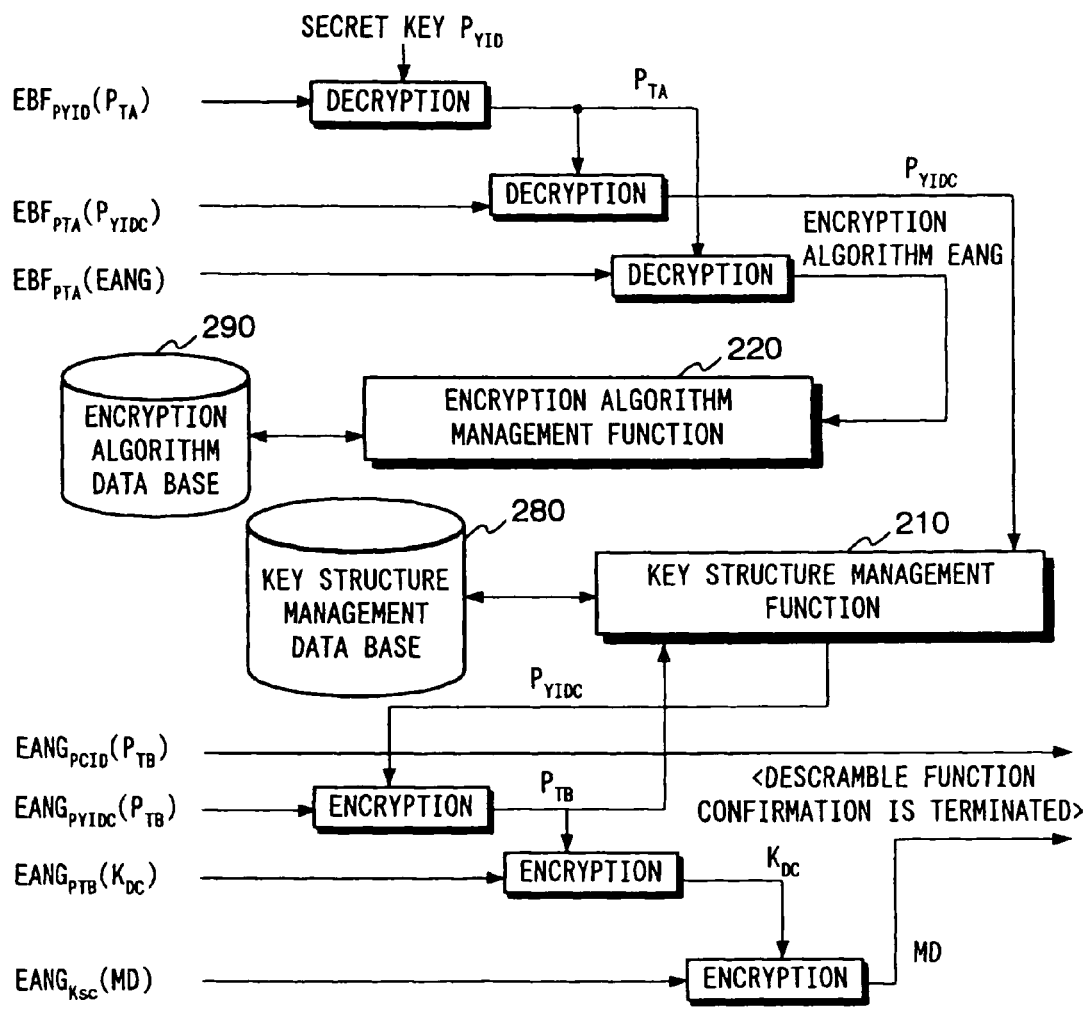
FIG. 9 is a flow chart showing a latter half portion of encryption algorithm conversion procedure by common key cipher to which the present invention is applied.

The public key encryption algorithm EANG after the conversion can be encrypted with the common key encryption algorithm EBF before the conversion according to the embodiment shown in FIGS. 8, 9 and 6 and distributed.

In case where the common key encryption algorithm is converted to the public key encryption algorithm, it is necessary to generate a new secret key and public key and verify the scramble function and descramble function for a converted public key encryption algorithm. This series of key generation and functional verification can be carried out according to the embodiment of the public key encryption algorithm conversion shown in FIGS. 13, 14 and 11.

(2) Conversion from the public key encryption algorithm to other common key encryption algorithm The common key encryption algorithm is different from the public key encryption algorithm in that no signature producing computation or signature verifying computation is carried out.

Therefore, in case where the public key encryption algorithm is converted to other common key encryption algorithm, the encryption algorithm conversion can be carried out in a procedure excluding the signature producing and verifying computations in the embodiment of the public key encryption algorithm conversion shown in FIGS. 13, 14 and 11.

The embodiment of the encryption algorithm conversion has been described above.

Figure 5:
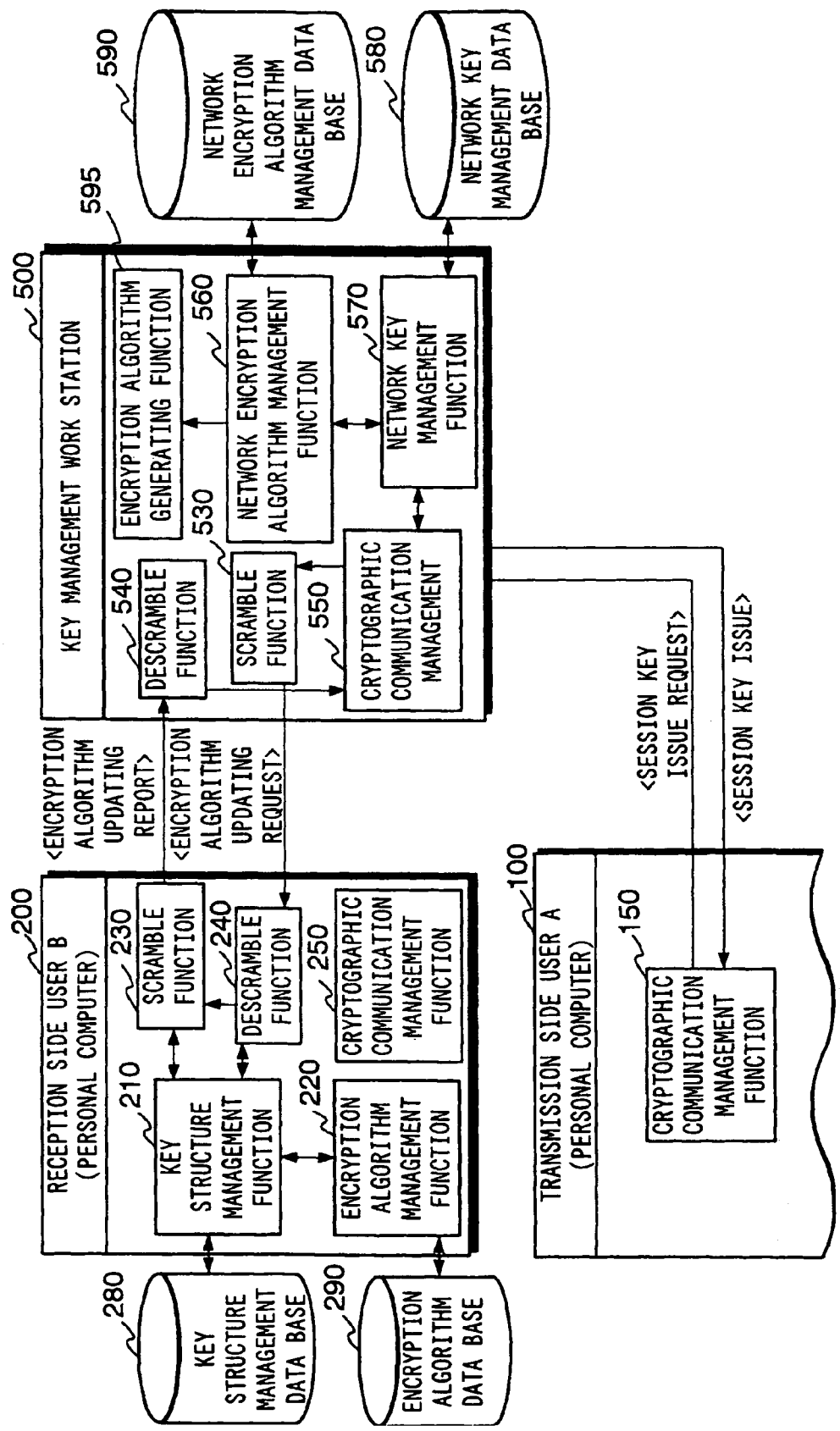
FIG. 5 is a schematic data flow diagram showing conversion of encryption algorithm to which the present invention is applied.

Whether or not the encryption algorithm conversion has been carried out properly in the embodiment of the encryption algorithm conversion shown in FIG. 5, embodiment of the common key encryption algorithm conversion shown in FIGS. 8, 9 and 6 and embodiment of the public key encryption algorithm conversion shown in FIGS. 13, 14 and 11, is verified by operating the scramble function and descramble function of cryptographic communication system, encrypting plain text data MD "confirmation of descramble function after the algorithm conversion is terminated" and plain text data MS "algorithm conversion confirmation test is terminated", transmitting the data and verifying whether or not the data are successfully decrypted.

If a given plain text data MD or plain text data MS is not decrypted in each process for confirmation of this encryption algorithm conversion, a response message to "encryption algorithm conversion operation error" is transmitted and that given process is executed again.

In a process for exchange of encryption algorithm conversion data in the embodiment of the public key encryption algorithm conversion shown in FIGS. 17, 18, 13, 14 and 11, signature verifying computation is carried out on signature production data created under the public key encryption algorithm. If an error occurs in the signature production data as a result of this signature verifying computation, a response message "encryption algorithm conversion operation error" is transmitted and that given process is executed again.

If the plain text data MD or plain text data MS is not decrypted after that reexecution or an error occurs in the signature production data as a result of the signature verifying computation, a response message "encryption algorithm conversion abnormal termination" is transmitted and then the encryption algorithm conversion process is interrupted.

If such a response "encryption algorithm conversion abnormal termination" occurs, cryptographic communication system components are inspected in viewpoints of hardware and software.

Although FIGS. 13, 14 and 11 show the embodiments of the public key encryption algorithm conversion, if the encryption algorithm conversion is not carried out or if the encryption algorithm is the same and therefore, not distributed, the key management station sends a procedure for distributing a key for use by user for key updating, deletion and the like. Although in the embodiment of the public key encryption algorithm conversion shown in FIGS. 17 and 18, the process for encryption algorithm conversion confirmation by the plain text data MD and MS has not been described, the encryption algorithm conversion confirmation can be carried out by encrypting the plain text data MD and MS with the public key based on the encryption algorithm and sending them according to the embodiment shown in FIGS. 13, 14 and 11.

According to the present invention, the encryption algorithm can be distributed with the safety and further, converted in a condition that time and labor required for the distribution are reduced.

Further, by the above-mentioned encryption algorithm conversion, encryption algorithms operated by plural users are capable of sharing the same encryption algorithm or that shared encryption algorithm can be changed to other encryption algorithm.

What is claimed is:

1. An encryption algorithm sharing management method for sharing an encryption algorithm for cryptographic communication, comprising the steps of:

from a user of a transmission side, obtaining a user identifier indicating the user and a user of the transmission side identifier indicating a user of a reception side; and querying a data base in which user identifiers indicating users, corresponding encryption algorithms and encryption keys thereof, are preliminarily described so as to obtain an encryption algorithm operated by the user of the transmission side and an encryption key thereof and an encryption algorithm operated by the user of the reception side and an encryption key thereof, wherein if said encryption algorithm operated by the user of the transmission side is different from said encryption algorithm operated by the user of the reception side, signature data produced for the encryption key operated by the user of the transmission side is transmitted to the user of the transmission side and said encryption algorithm operated by the user of the transmission side is encrypted with said encryption algorithm operated by the user of the reception side and are transmitted to the user of the reception side with signature data produced for the encryption key operated by the user of the reception side.

2. An encryption algorithm sharing management method for sharing the encryption algorithm for cryptographic communication, comprising the steps of:

from a user of a transmission side, obtaining a user identifier indicating the user of the transmission side and a user identifier indicating a user of a reception side; and querying a data base in which user identifiers indicating users, corresponding encryption algorithms and encryption keys thereof, are preliminarily described so as to obtain an encryption algorithm operated by the user of the transmission side and an encryption key thereof and an encryption algorithm operated by the user of the reception side and an encryption key thereof, wherein if said encryption algorithm operated by the user of the transmission side is different from said encryption algorithm operated by the user of the reception side, signature data produced for the encryption key operated by the user of the transmission side is transmitted to the user of the transmission side and data indicating said encryption algorithm operated by the user of the transmission side and an encryption key produced based on the encryption key operated by the user of the reception side corresponding to a key length of said encryption algorithm operated by the user of the transmission side is encrypted with said encryption algorithm operated by the user of the reception side and transmitted to the user of the reception side with signature data produced for the encryption key operated by the user of the reception side.

3. An encryption algorithm sharing management method for sharing an encryption algorithm for cryptographic communication, comprising the steps of:

from a user of a transmission side, obtaining a user identifier indicating the user of the transmission side and a user identifier indicating a user of a reception side; and querying a data base in which user identifiers indicating users, corresponding encryption algorithms and encryption keys thereof, are preliminarily described about each user so as to obtain an encryption algorithm operated by the user of the transmission side and an encryption key thereof and an encryption algorithm operated by the user of the reception side and an encryption key thereof, wherein if said encryption algorithm operated by the user of the transmission side is different from said encryption algorithm operated by the user of the reception side, signature data produced for the encryption key operated by the user of the reception side is transmitted to the user of the reception side and said encryption algorithm operated by the user of the reception side is encrypted with said encryption algorithm operated by the user of the transmission side and transmitted to the user of the transmission side with the signature data produced for the encryption key operated by the user of the transmission side.

4. An encryption algorithm sharing management method for sharing an encryption algorithm for cryptographic communication, comprising the steps of:

from a user of a transmission side, obtaining a user identifier indicating the user of the transmission side and a user identifier indicating a user of a reception side; and querying a data base in which user identifiers indicating users, corresponding encryption algorithms and encryption keys thereof, are preliminarily described about each user so as to obtain an encryption algorithm operated by the user of the transmission side and an encryption key thereof and an encryption algorithm operated by the user of the reception side and an encryption key thereof, wherein if said encryption algorithm operated by the user of the transmission side is different from said encryption algorithm operated by the user of the reception side, signature data produced for the encryption key operated by the user of the reception side is transmitted to the user of the reception side and data indicating said encryption algorithm operated by the user of the reception side and an encryption key produced based on the encryption key operated by the user of the transmission side corresponding to a key length of said encryption algorithm operated by the user of the reception side is encrypted with said encryption algorithm operated by the user of the transmission side and transmitted to the user of the transmission side with signature data produced for to the encryption key operated by the user of the transmission side.

* * * * *